(12) United States Patent
Miyata et al.

(10) Patent No.: US 8,643,764 B2
(45) Date of Patent: Feb. 4, 2014

(54) IMAGE PICKUP APPARATUS USING ZOOM LENS

(75) Inventors: Masato Miyata, Machida (JP); Naoki Fujii, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 218 days.

(21) Appl. No.: 13/333,647

(22) Filed: Dec. 21, 2011

(65) Prior Publication Data

US 2013/0120638 A1   May 16, 2013

(30) Foreign Application Priority Data

Nov. 10, 2011  (JP) .................................. 2011-246425

(51) Int. Cl.
*G02B 13/16*  (2006.01)
*G02B 15/14*  (2006.01)

(52) U.S. Cl.
USPC .......................................... 348/335; 359/676

(58) Field of Classification Search
None
See application file for complete search history.

(56) References Cited

U.S. PATENT DOCUMENTS 7,057,659 B1 *  6/2006  Mihara et al. ................. 348/345
7,085,070 B2 *  8/2006  Mihara ......................... 359/686
7,535,650 B2 *  5/2009  Ohashi ......................... 359/676

FOREIGN PATENT DOCUMENTS

JP   2006-267863   10/2006
JP   2010-217478    9/2010

* cited by examiner

*Primary Examiner* — Justin P Misleh
(74) *Attorney, Agent, or Firm* — John C. Pokotylo; Straub & Pokotylo

(57) ABSTRACT

An image pickup apparatus includes a zoom lens having a first positive lens unit, and a first negative lens unit disposed on an object side of the first positive lens unit. A distance between the first positive lens unit and the first negative lens unit is narrowed at the time of zooming from a wide angle end to a telephoto end. The zoom lens includes an aperture stop disposed between a lens nearest to an image side in the first negative lens unit and a lens nearest to the image side in the first positive lens unit, and a light-amount reducing filter made of a resin material which is disposed on the image side of the lens nearest to the image side in the first positive lens unit, and which can be inserted in an optical path and withdrawn from the optical path. The zoom lens satisfies predetermined conditional expressions.

12 Claims, 28 Drawing Sheets

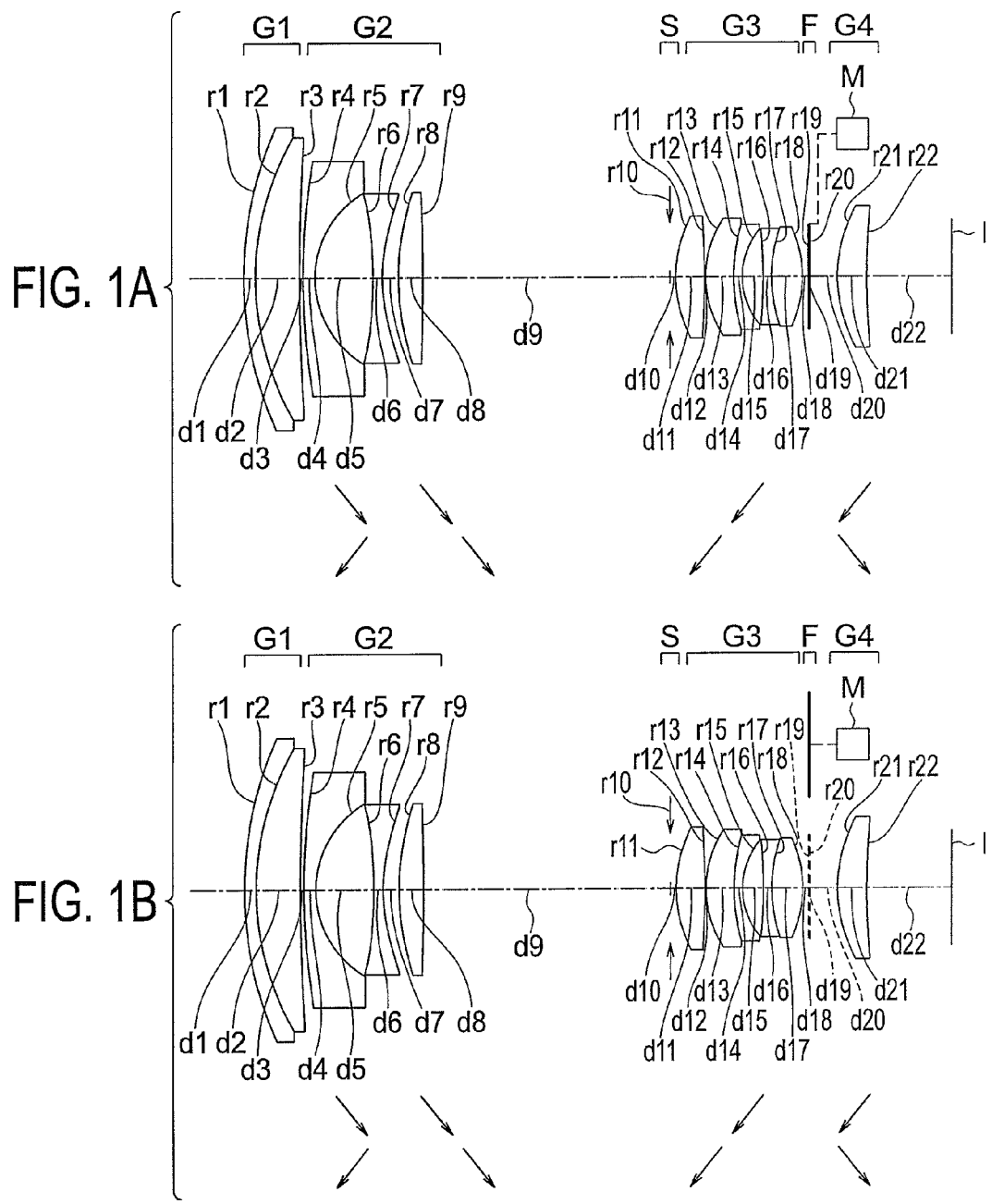

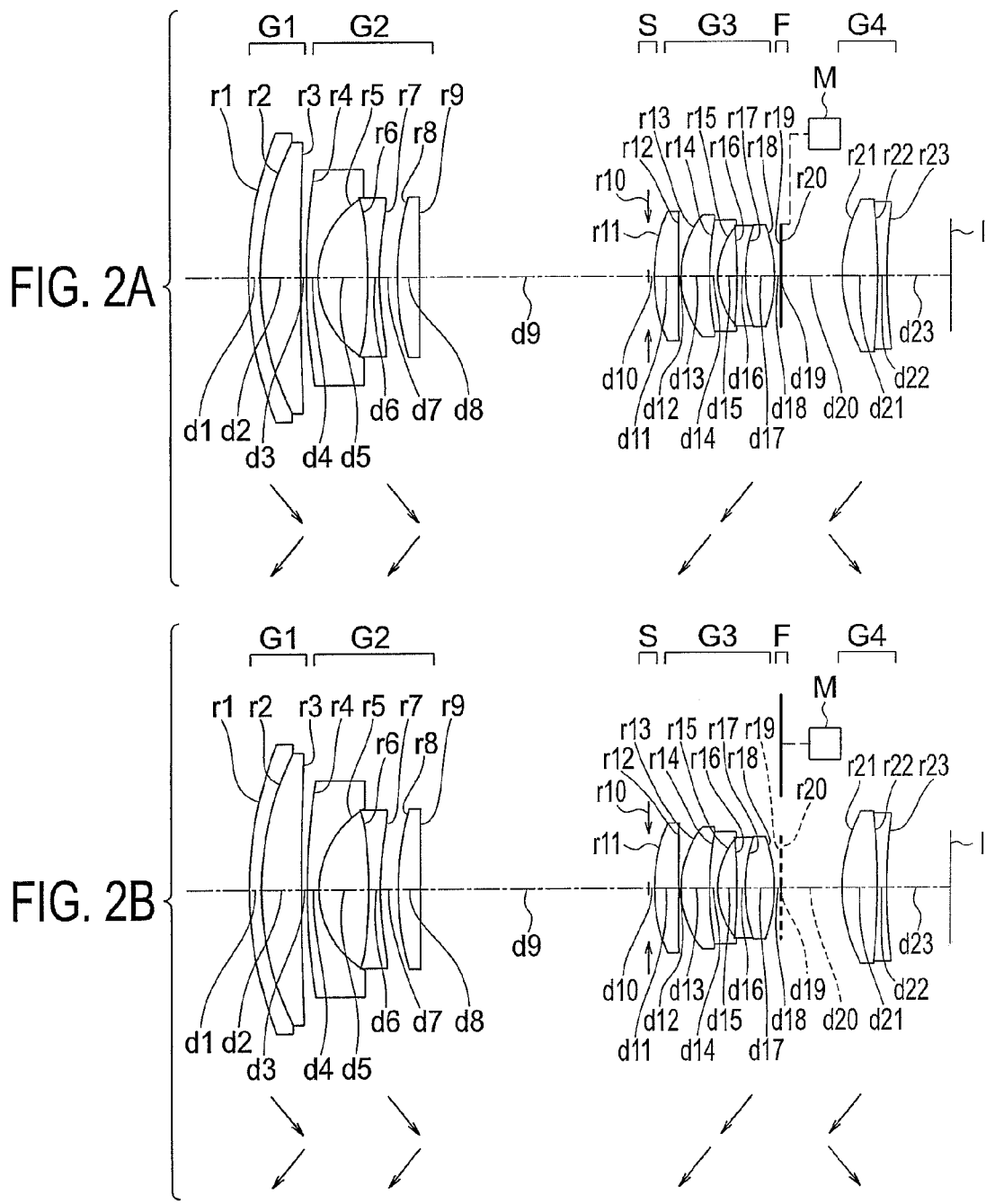

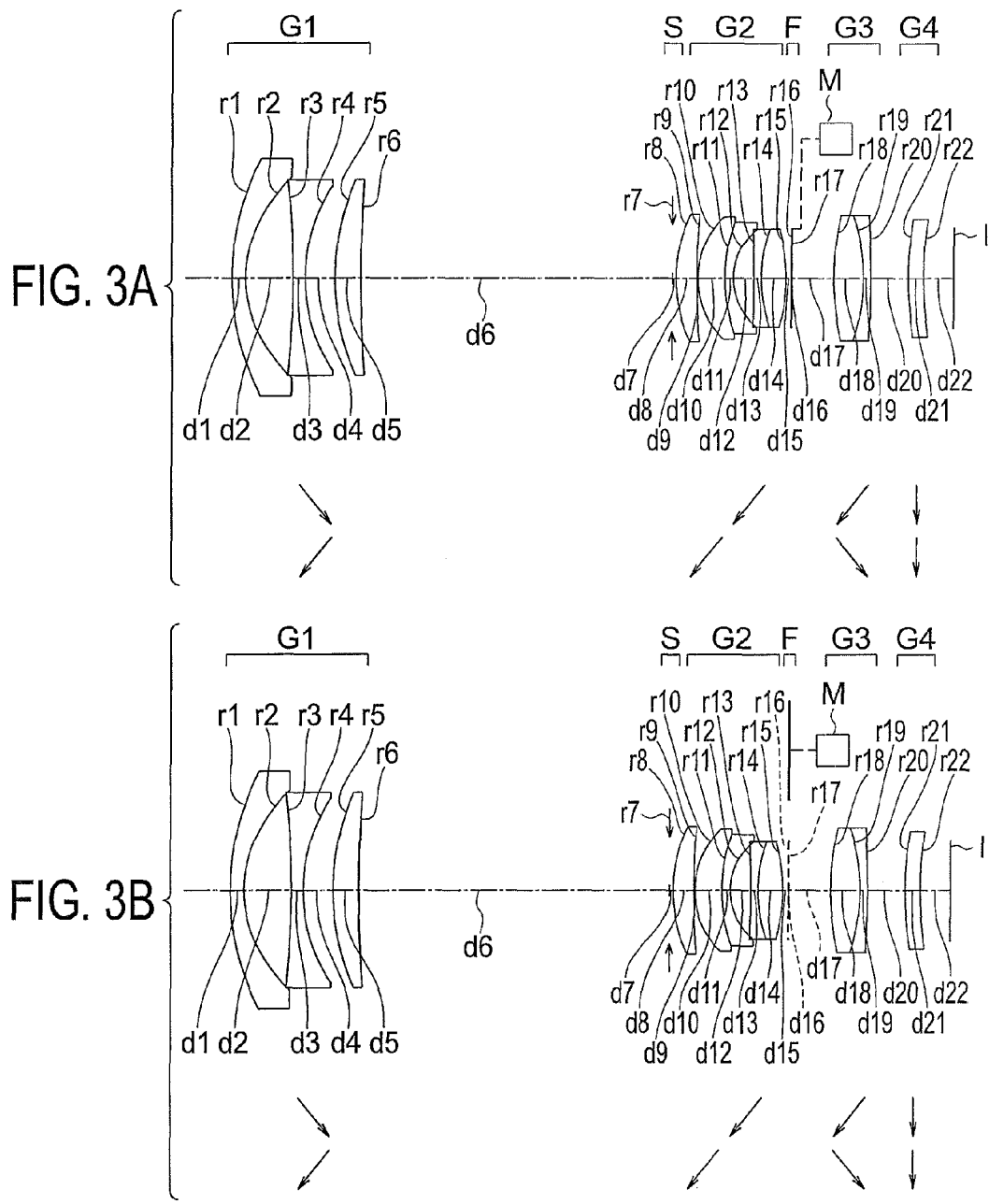

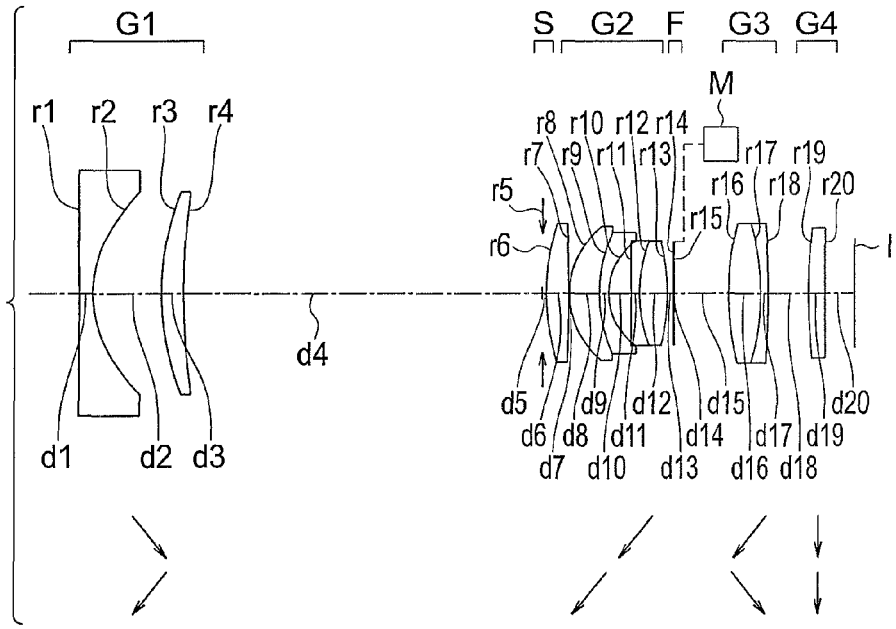
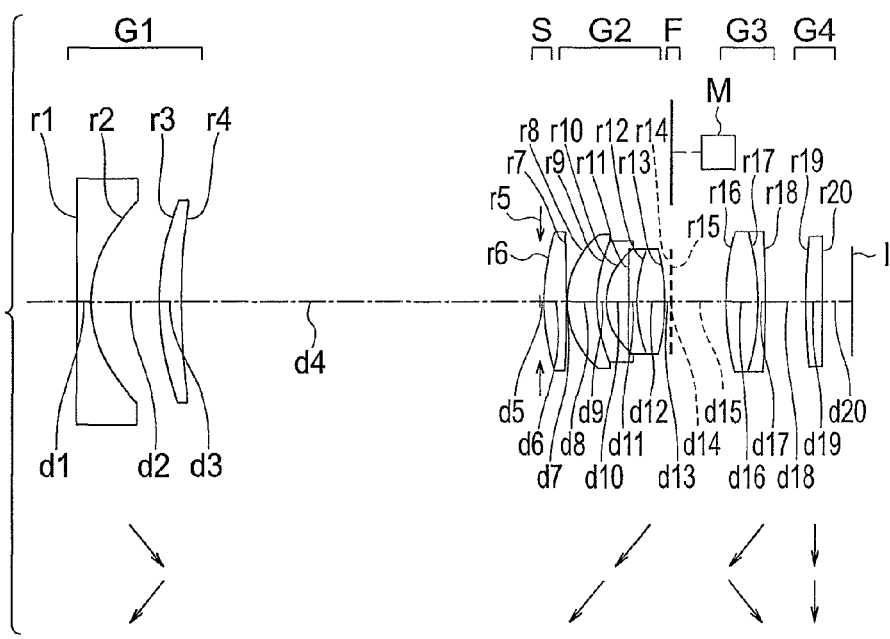

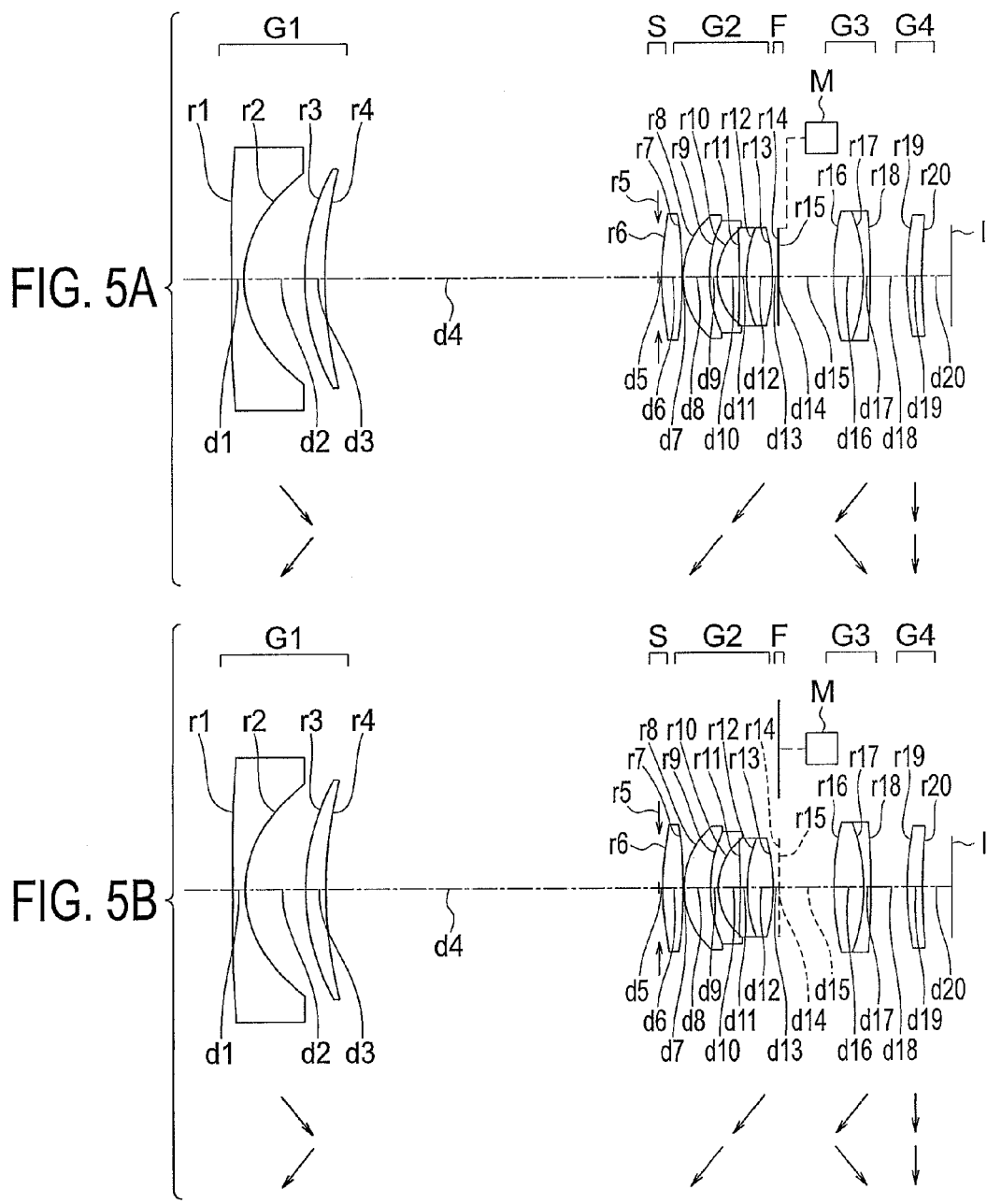

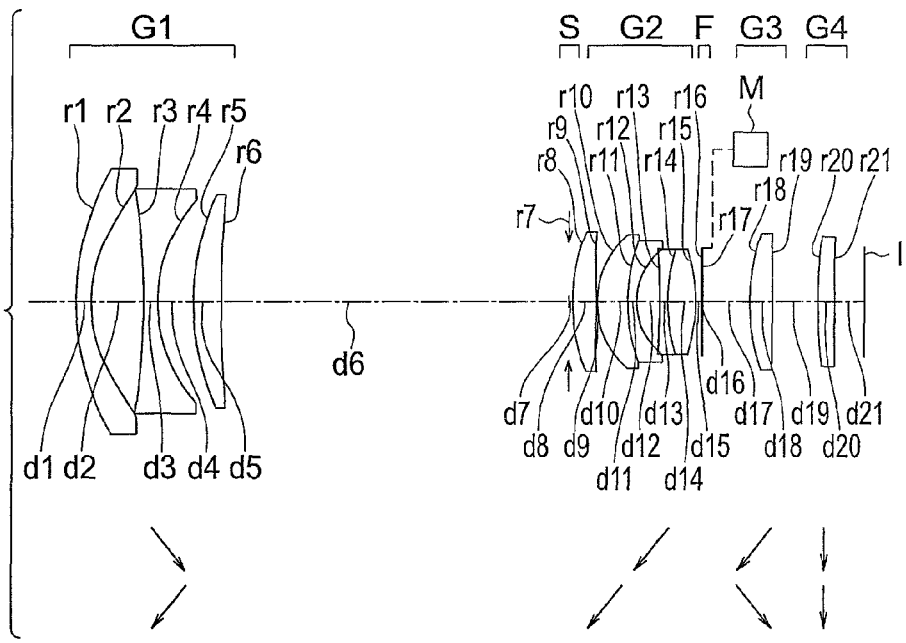
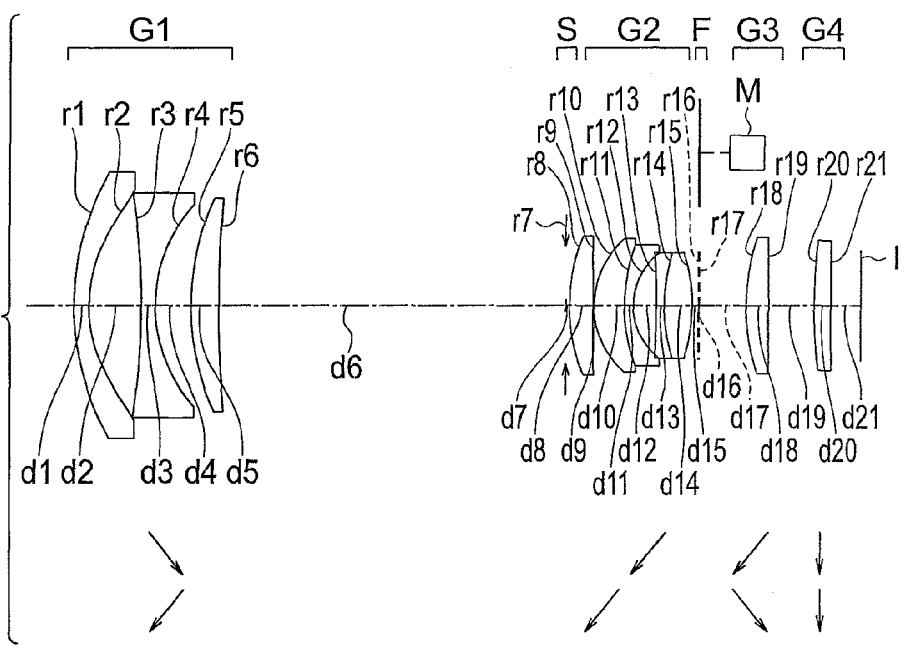

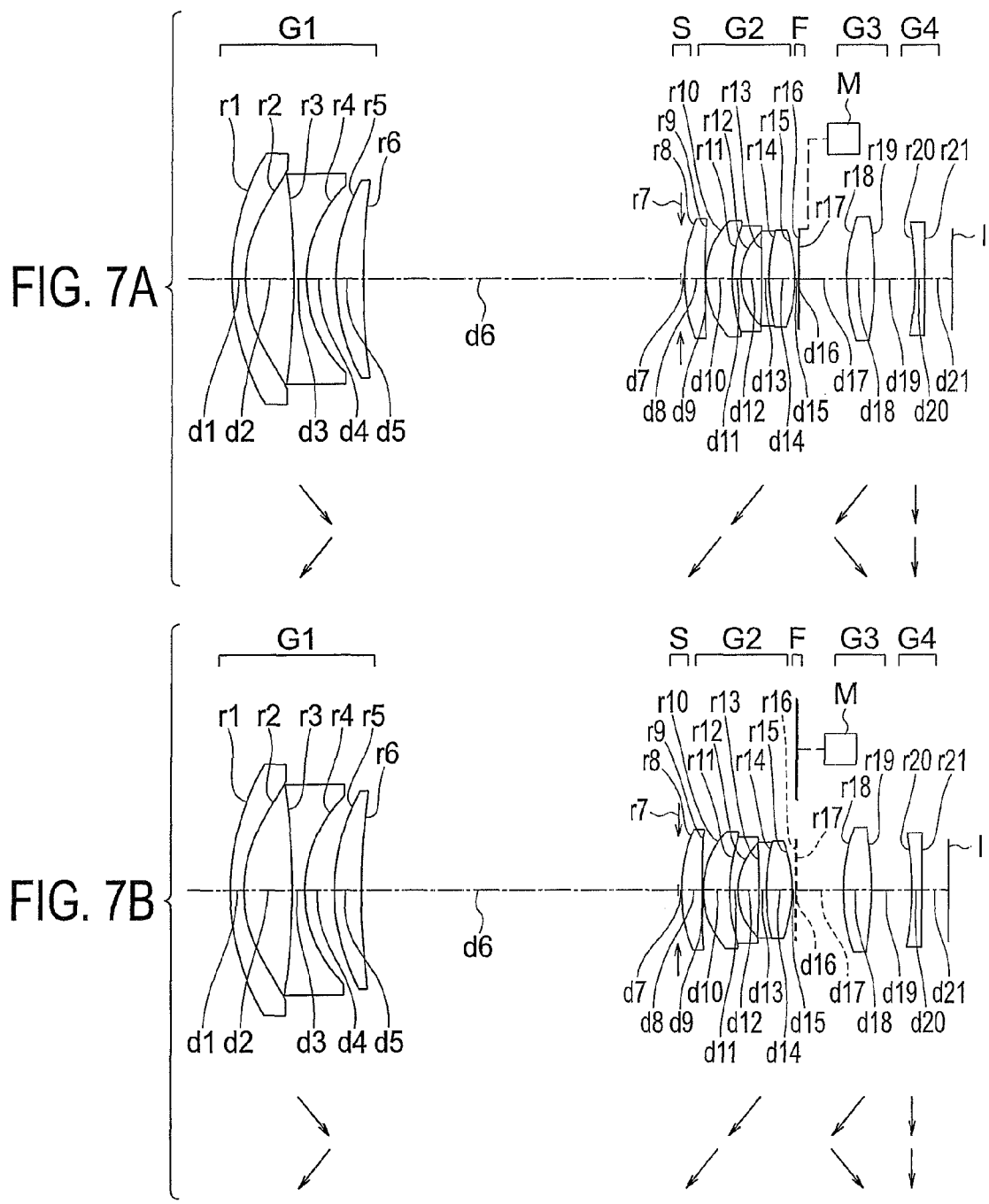

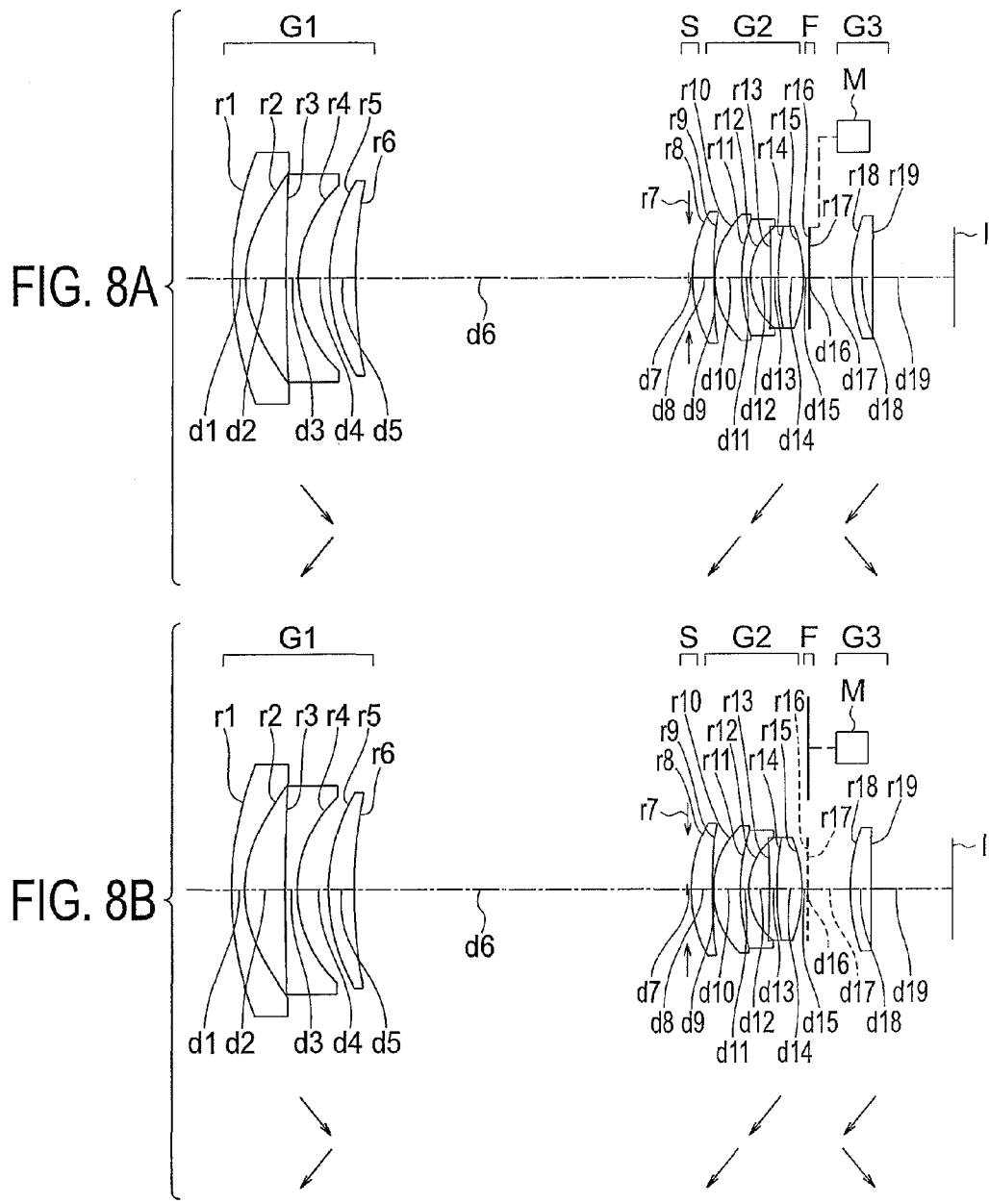

SA
FNO 1.824

AS
ω 39.25

ΔS — ΔM

DT
ω 39.25

CC
ω 39.25

SA
FNO 2.139 d LINE — g LINE

— C LINE

AS
ω 20.00

DT
ω 20.00

CC
ω 20.00

SA
FNO 2.426

AS
ω 10.99

DT
ω 10.99

CC
ω 10.99

435.84 —·—·—
656.27 - - - - - -
587.56 ⎯⎯⎯

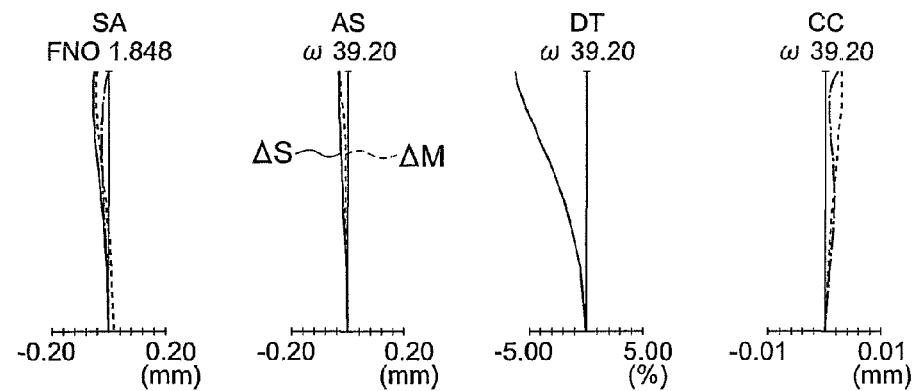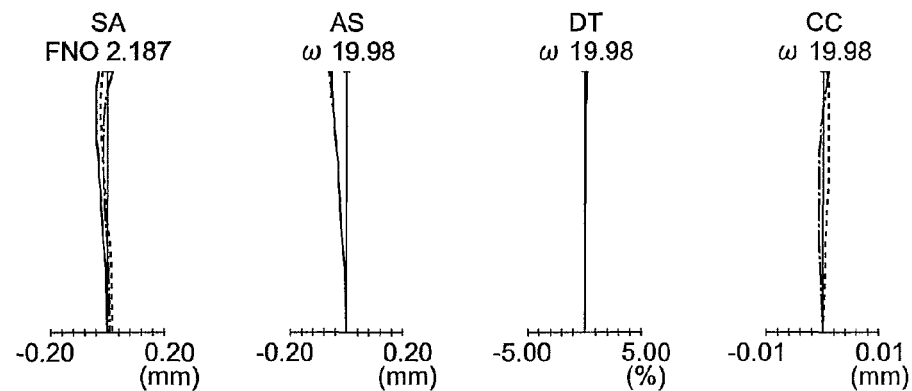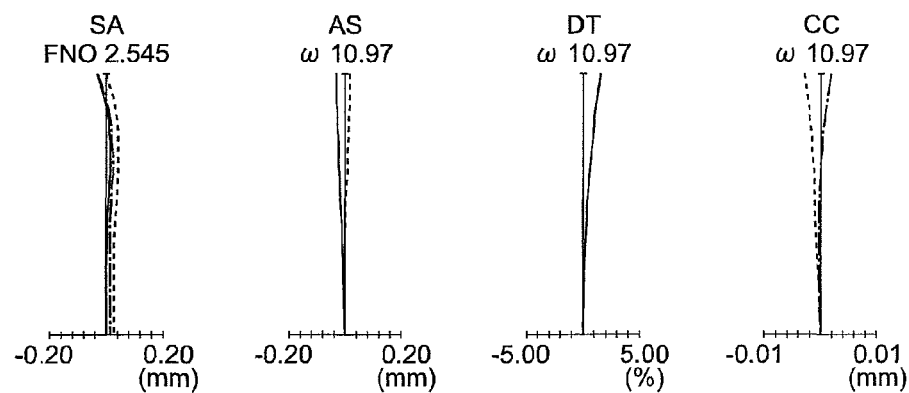

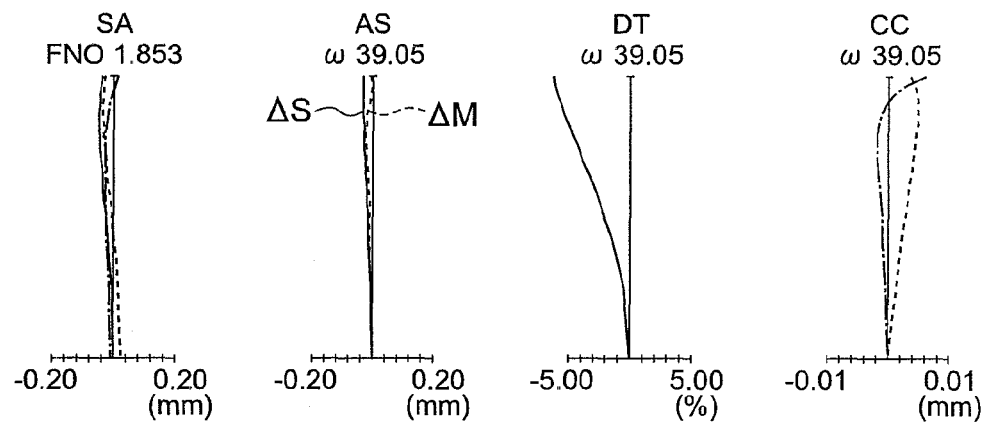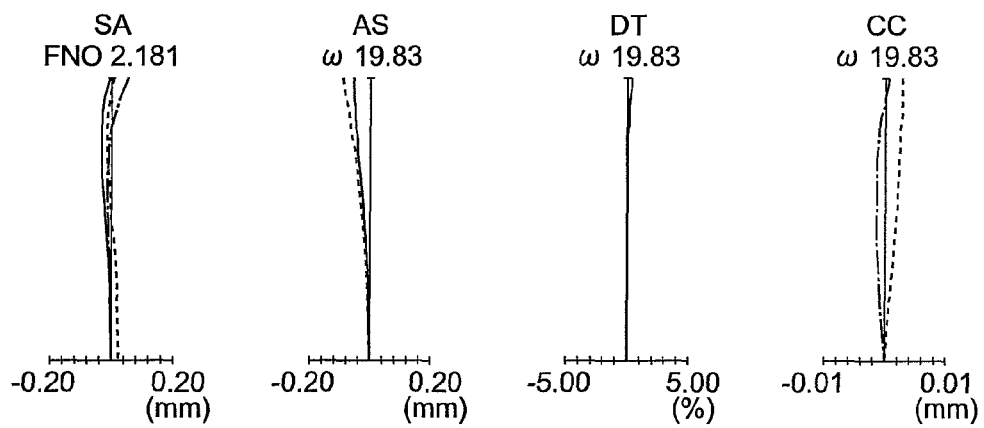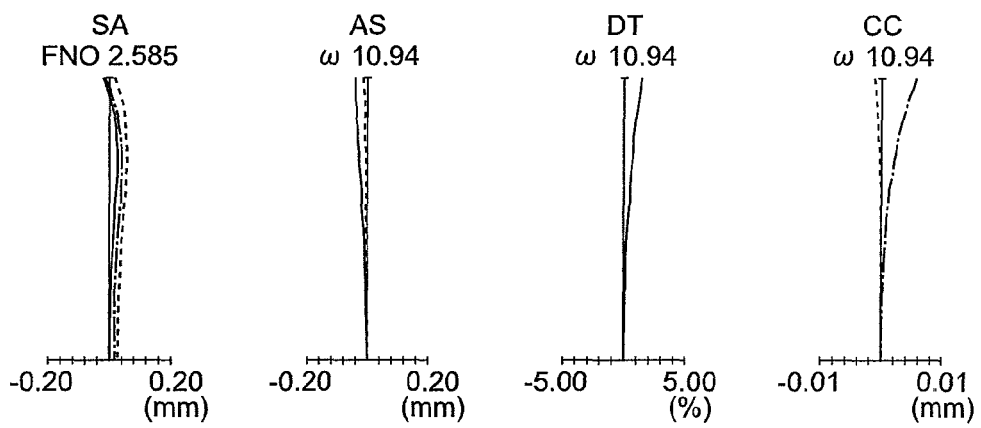

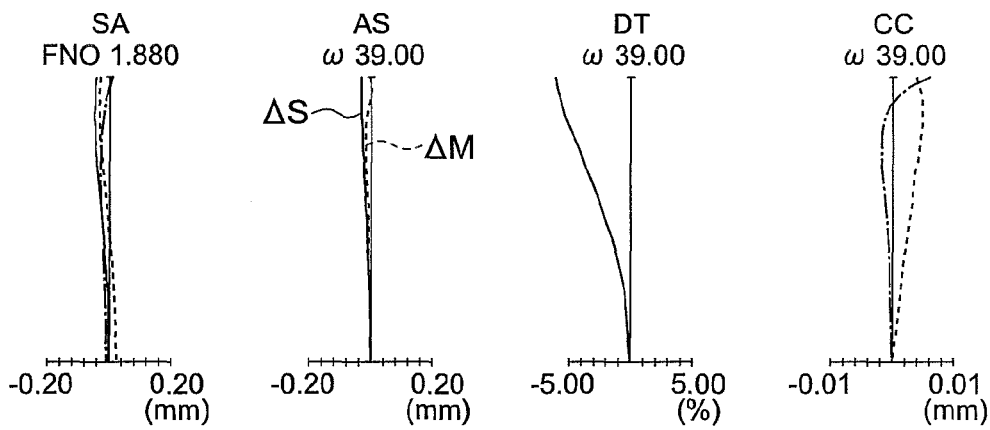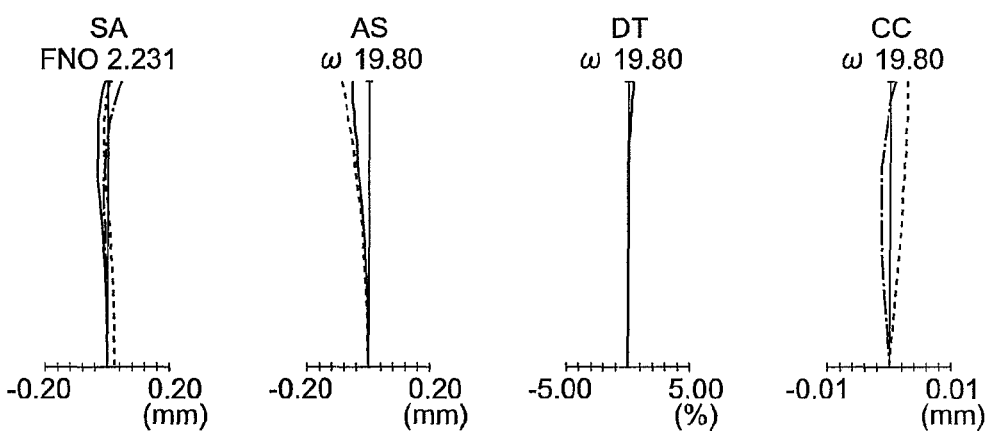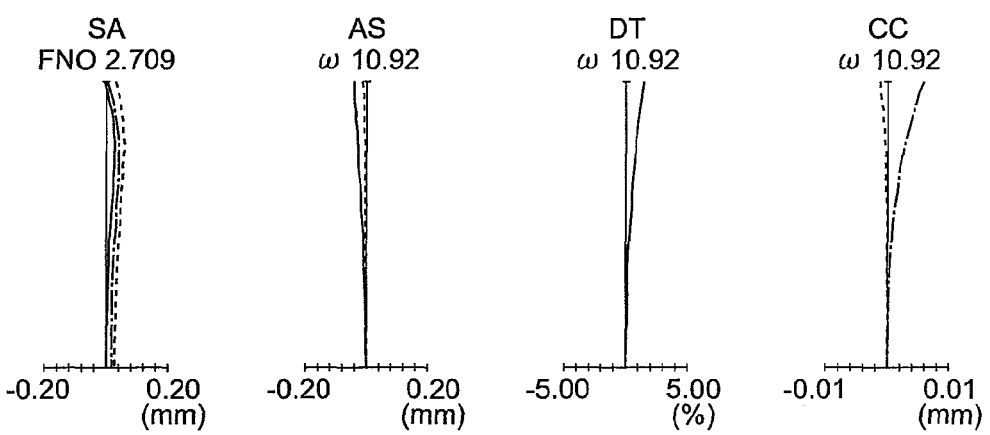

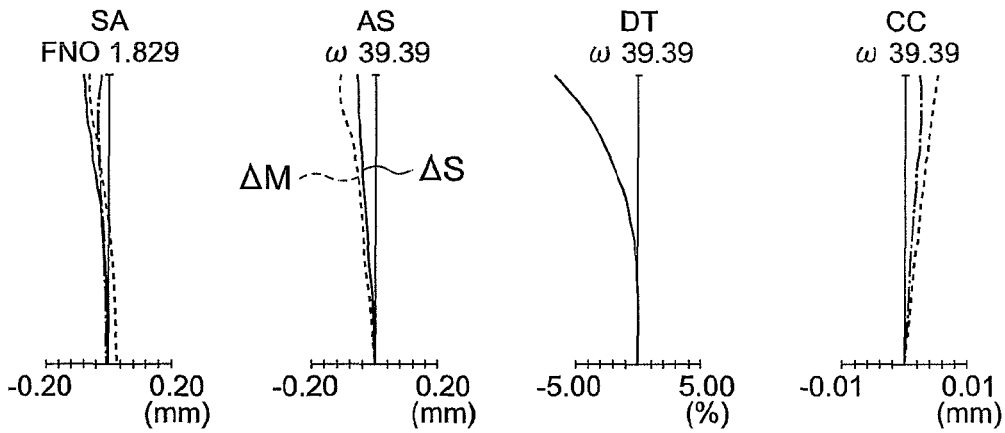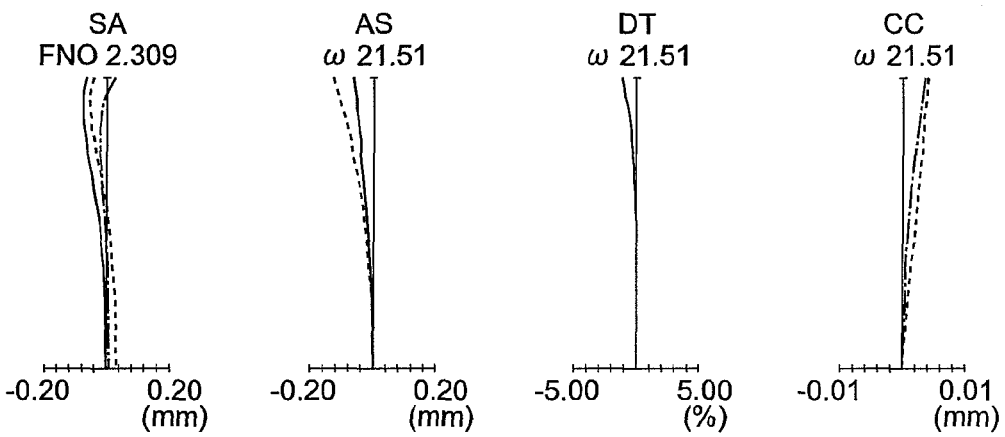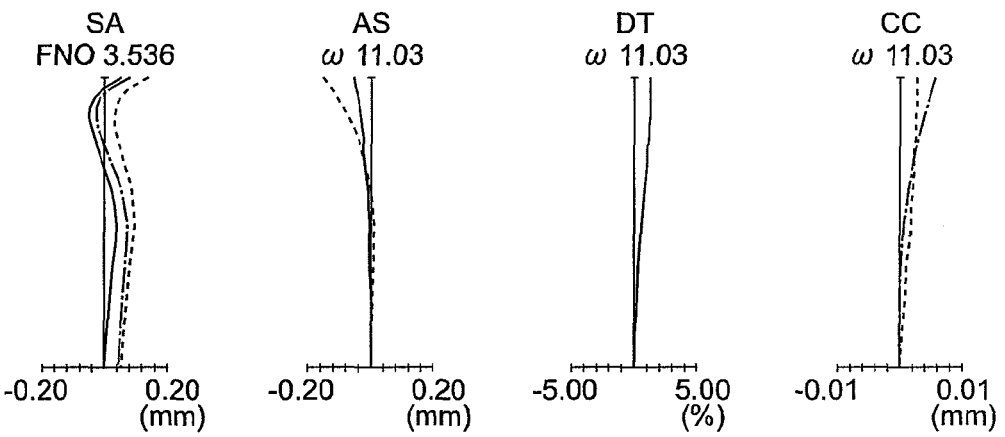

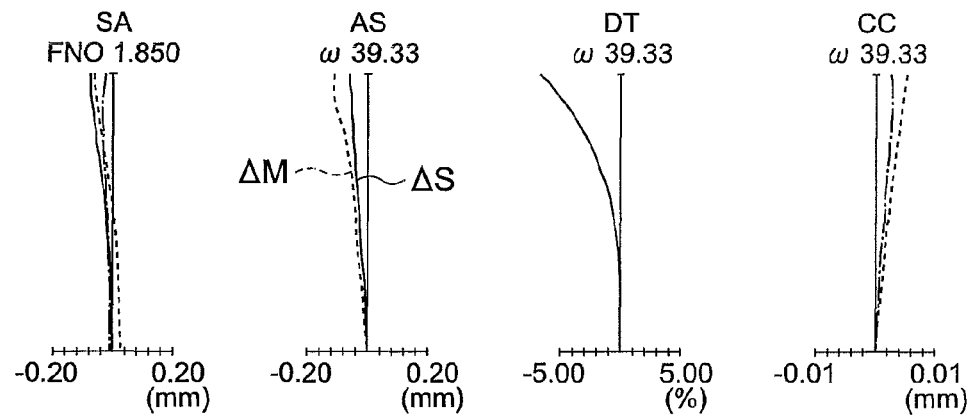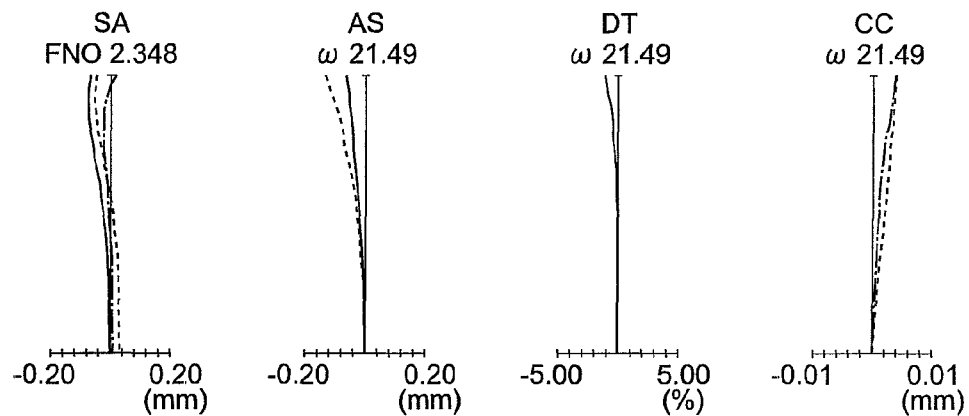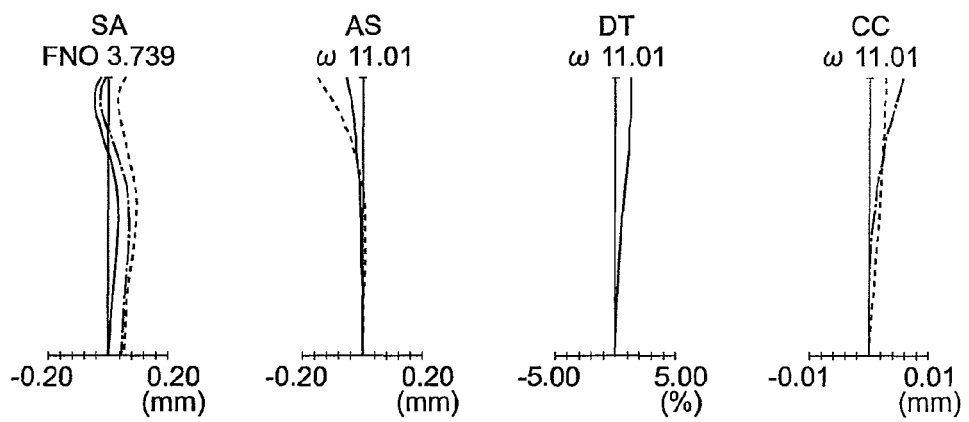

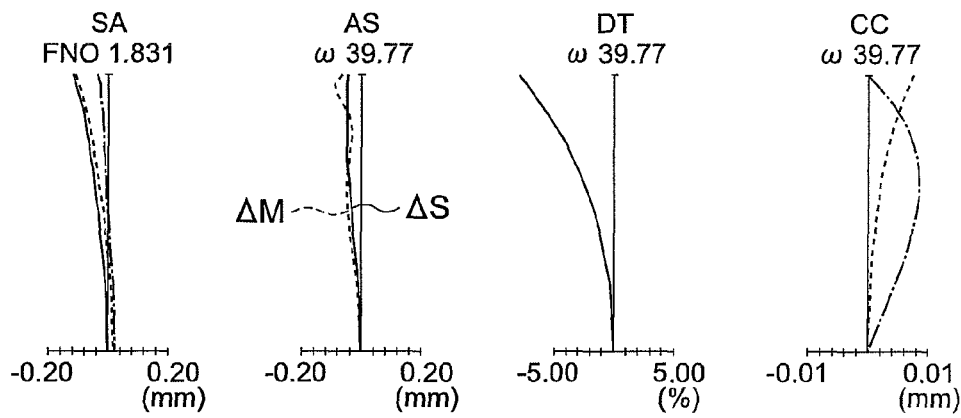
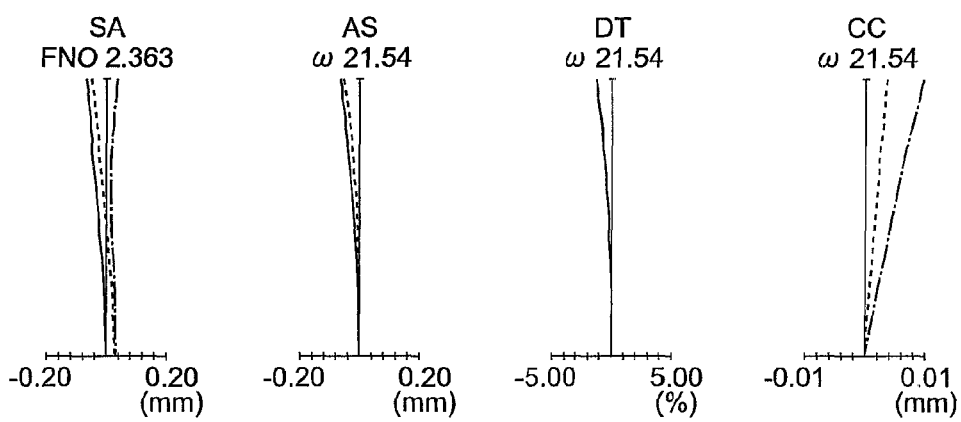
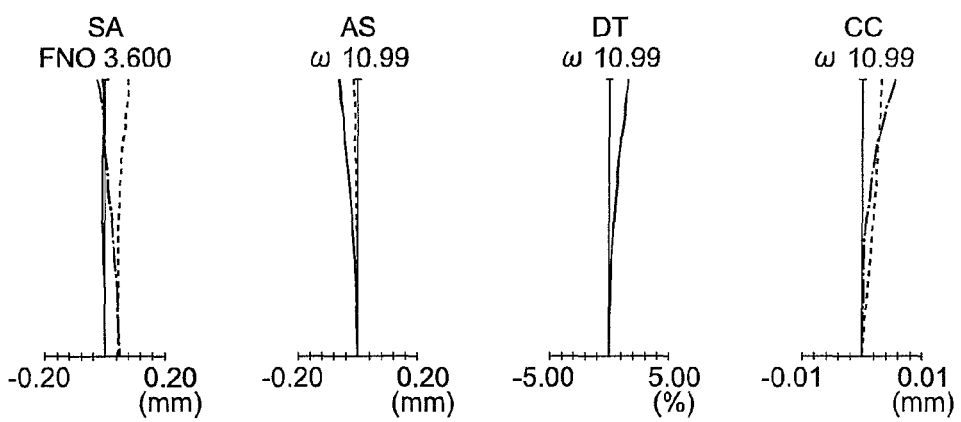

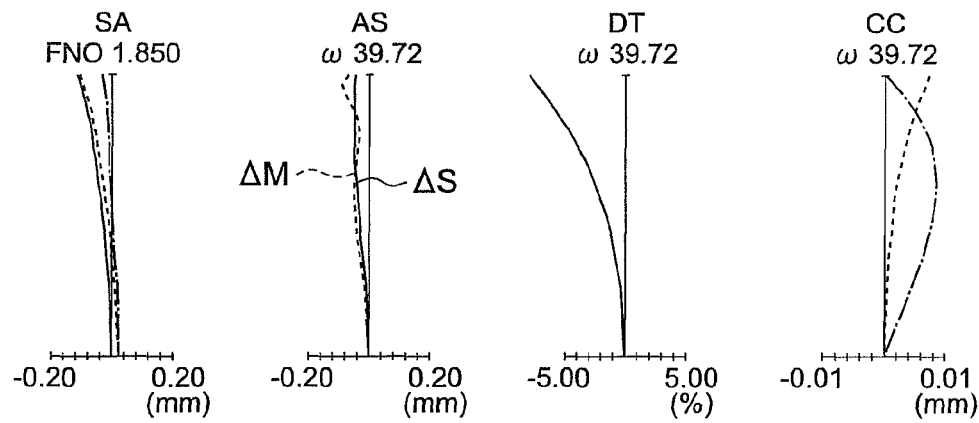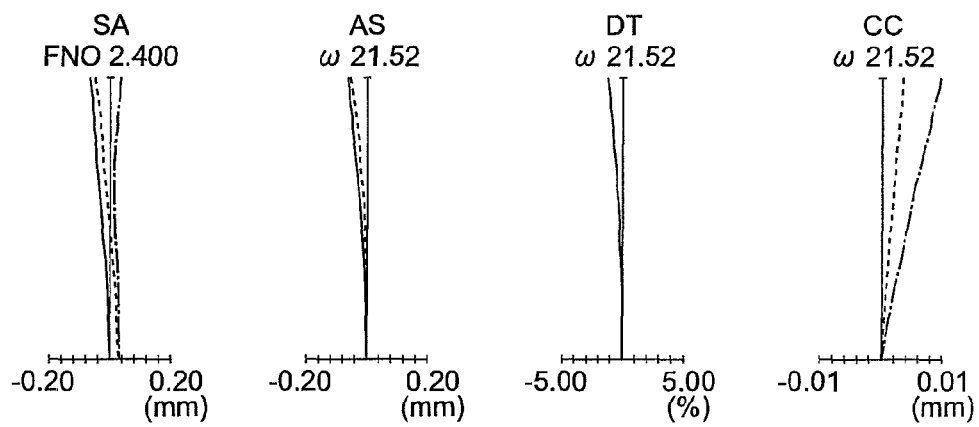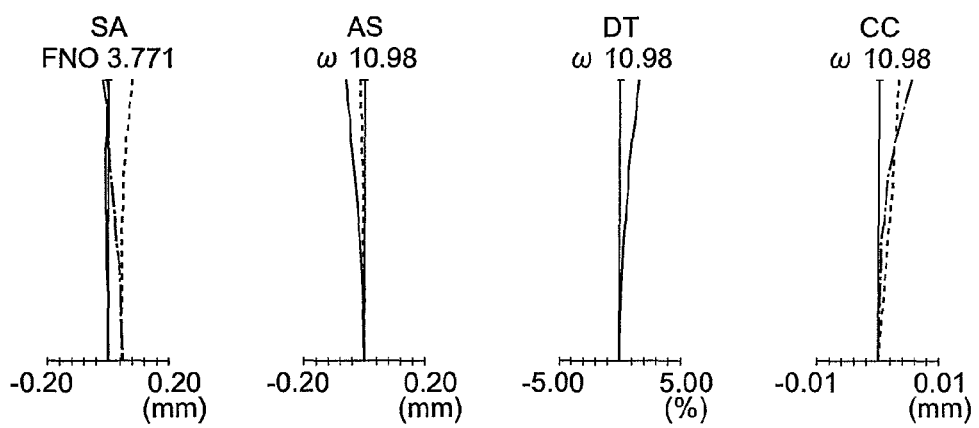

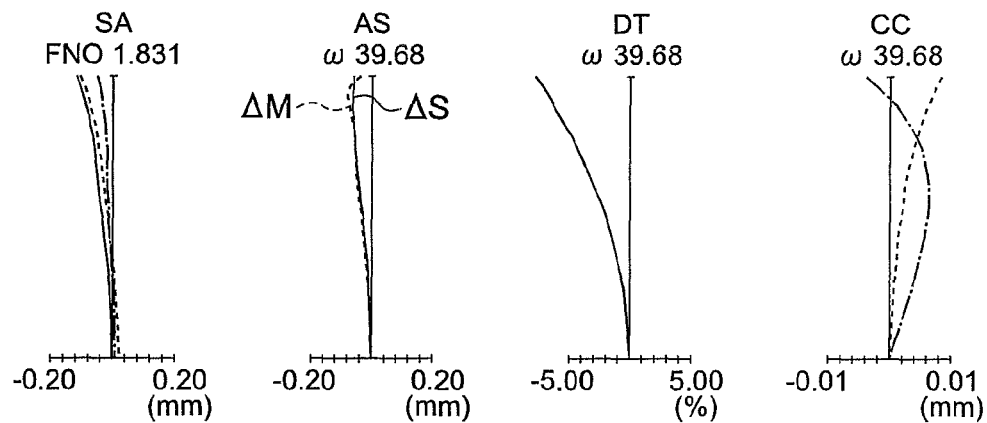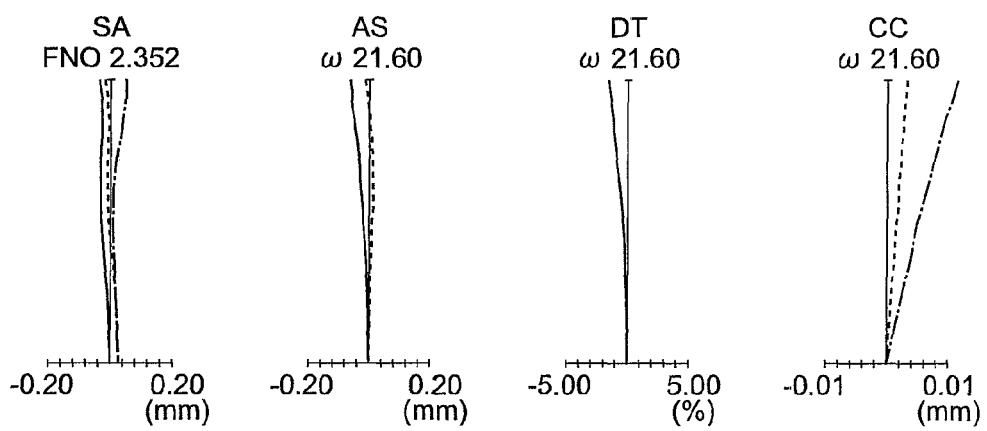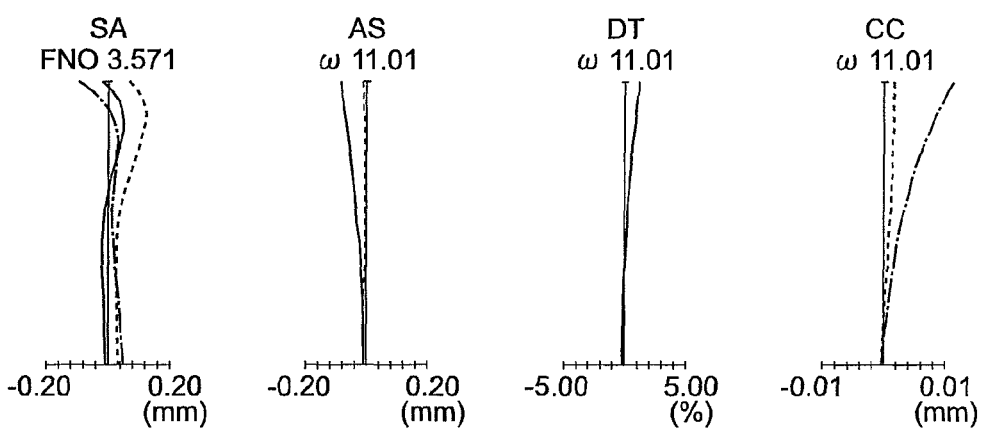

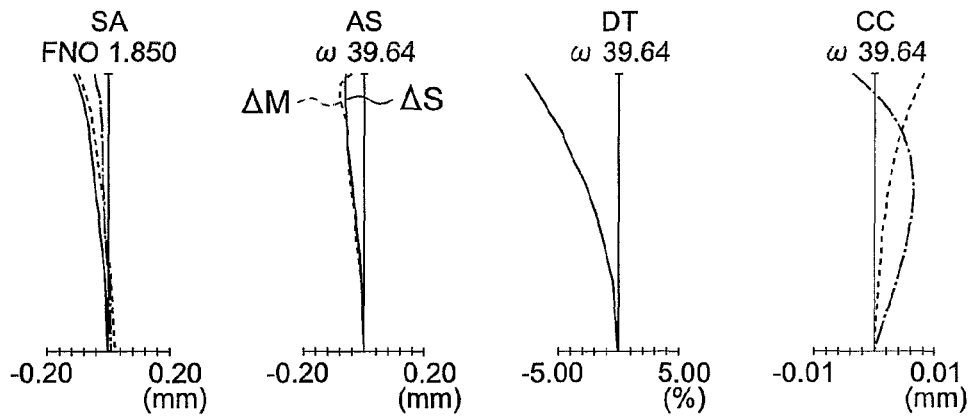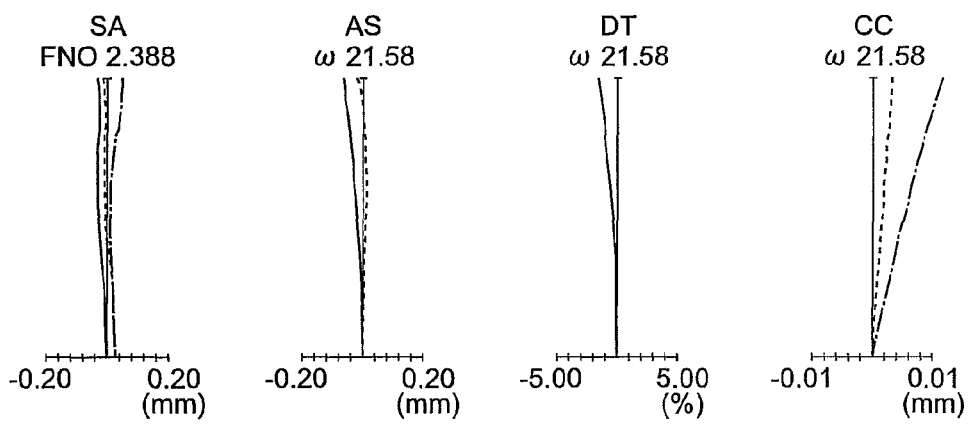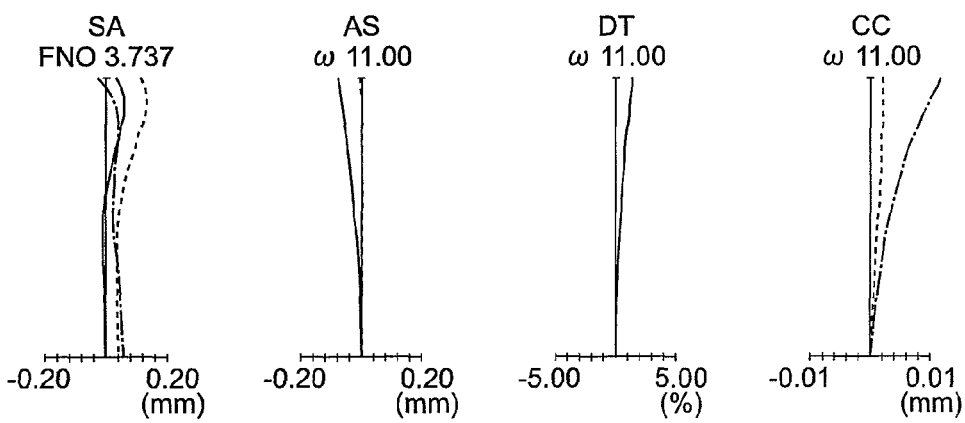

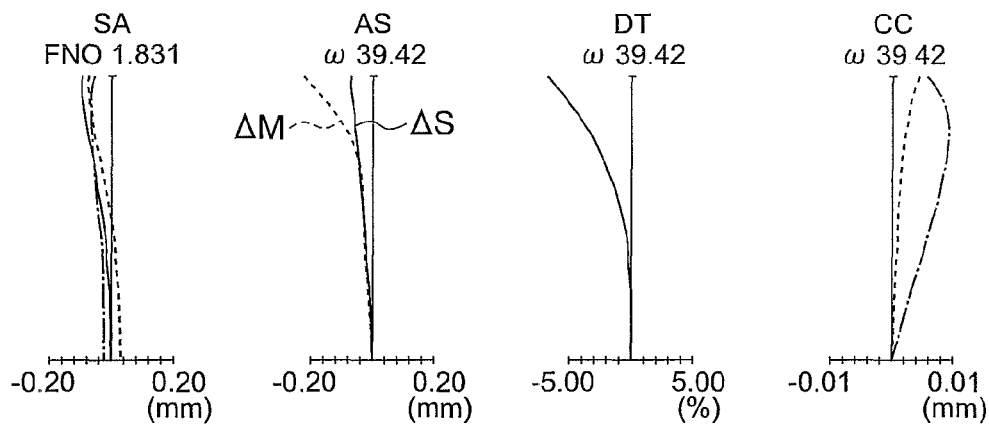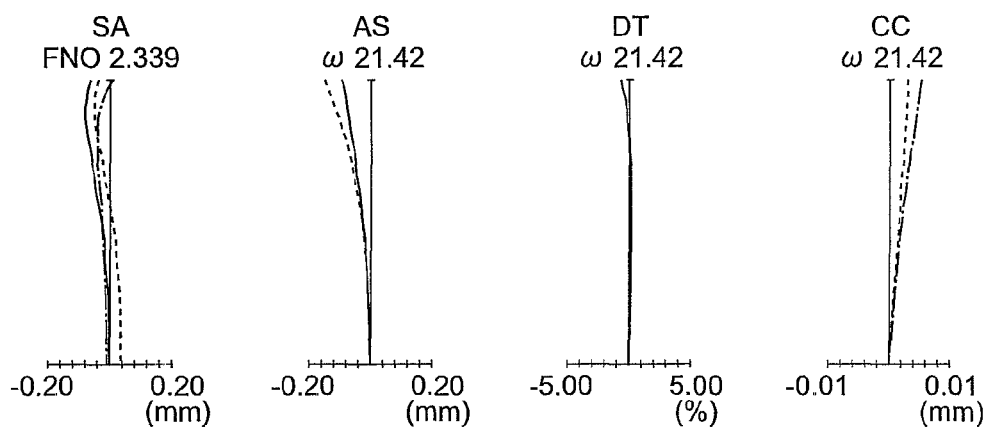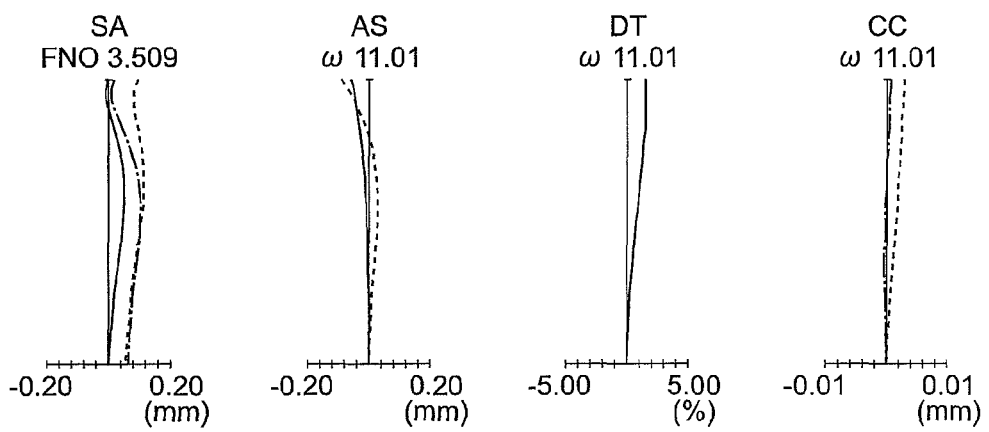

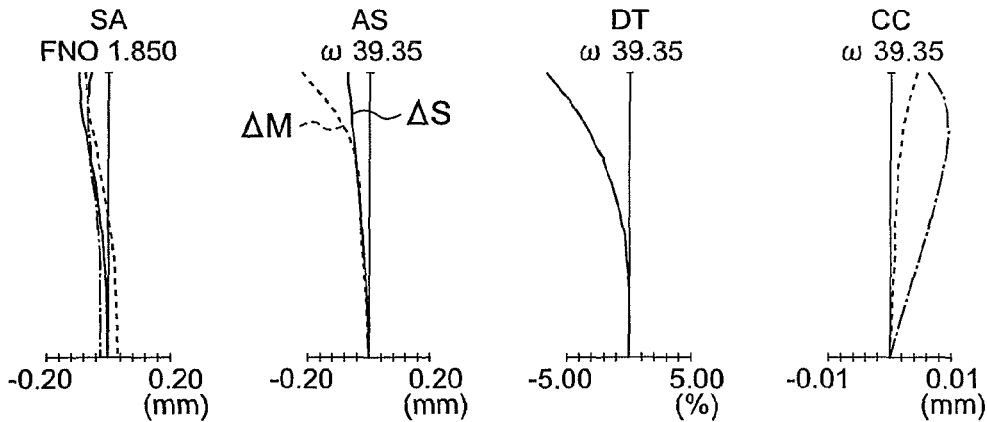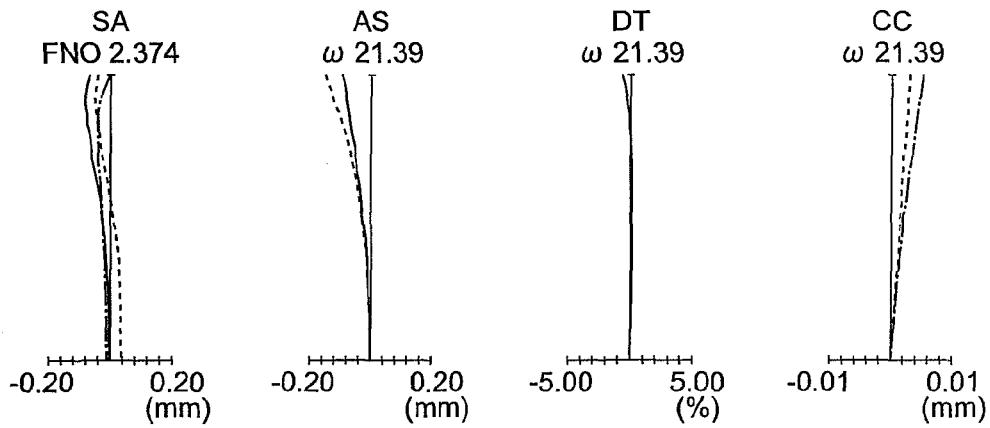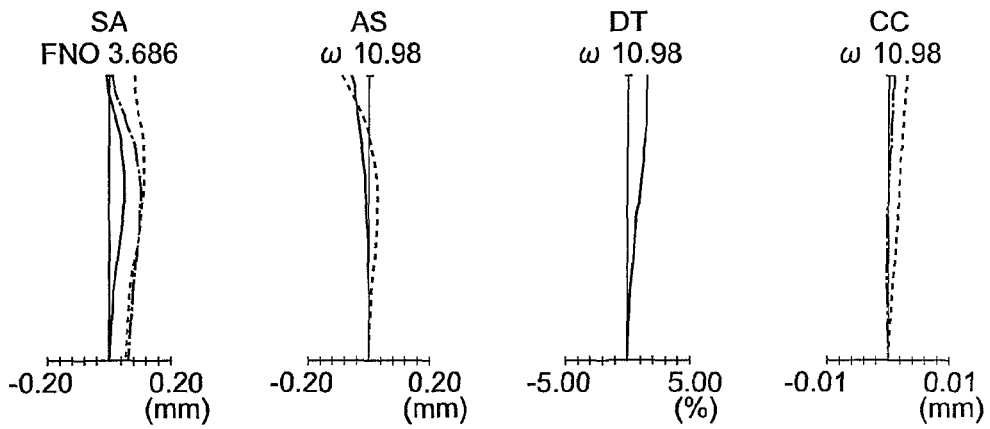

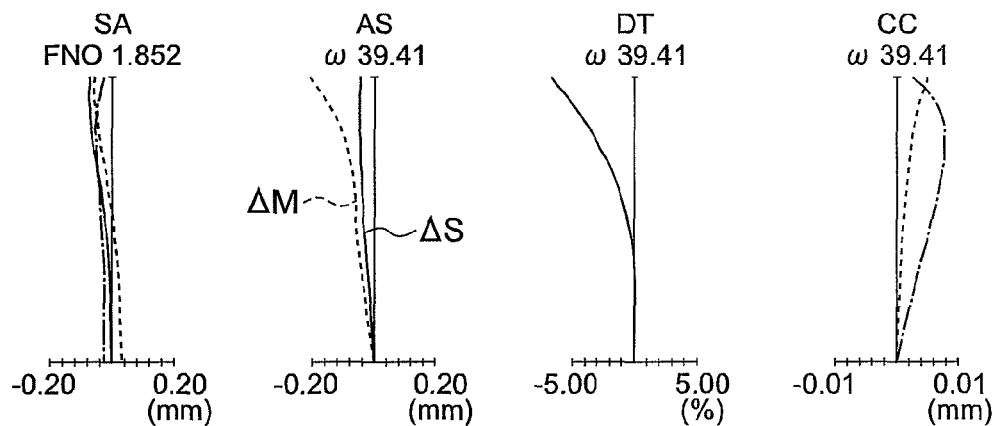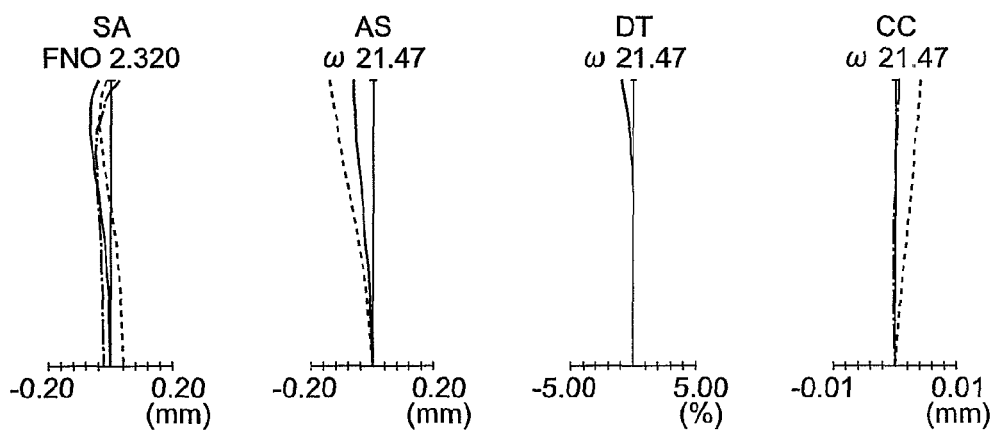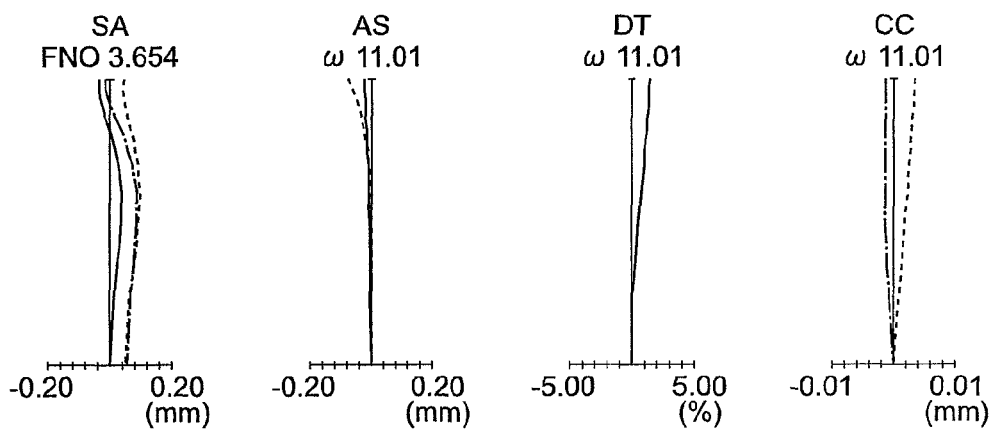

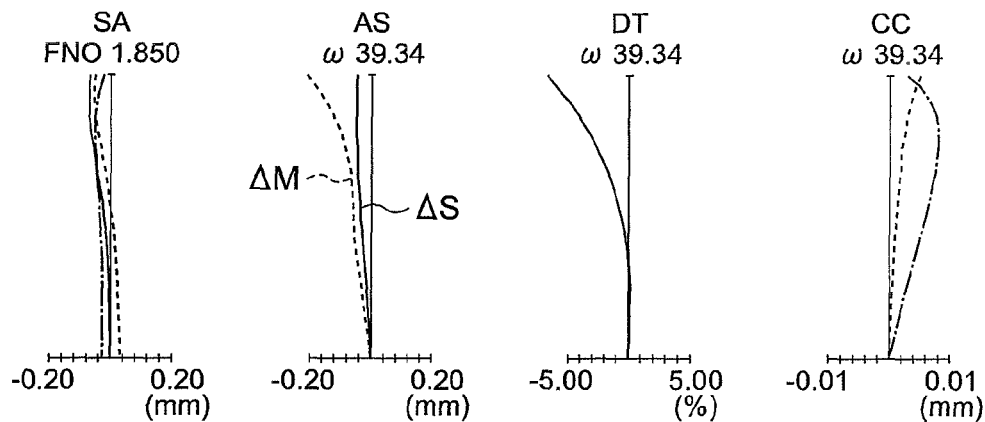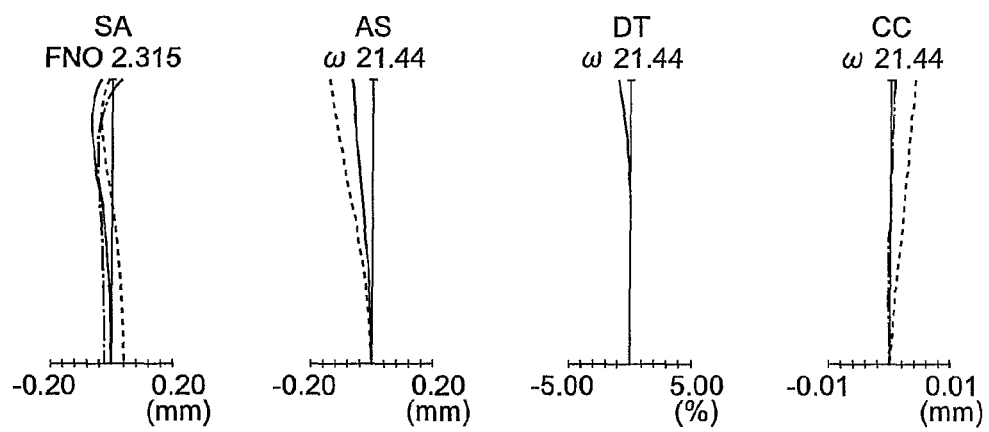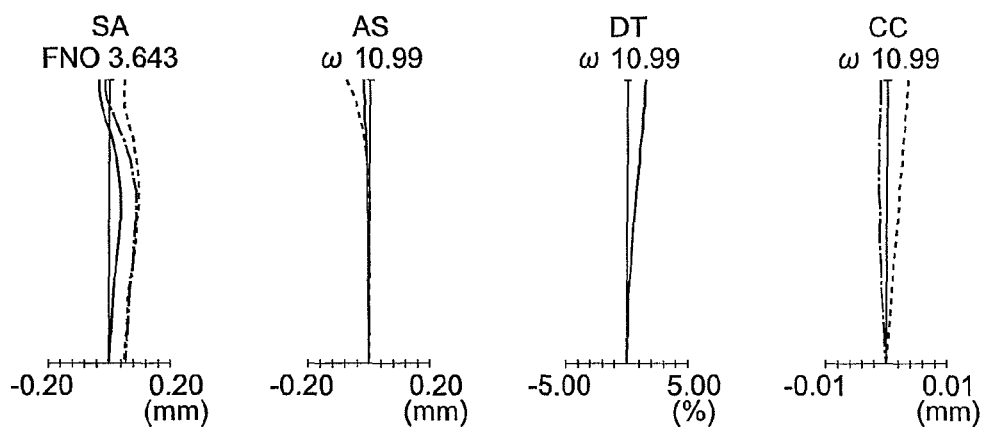

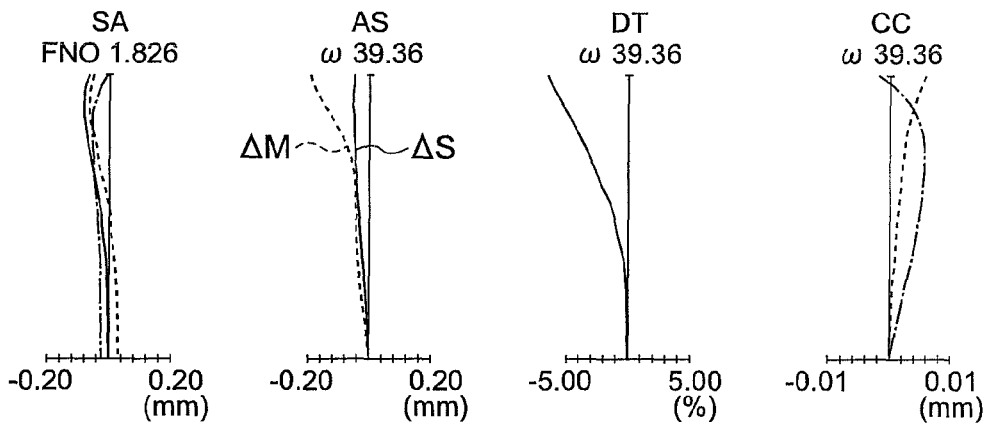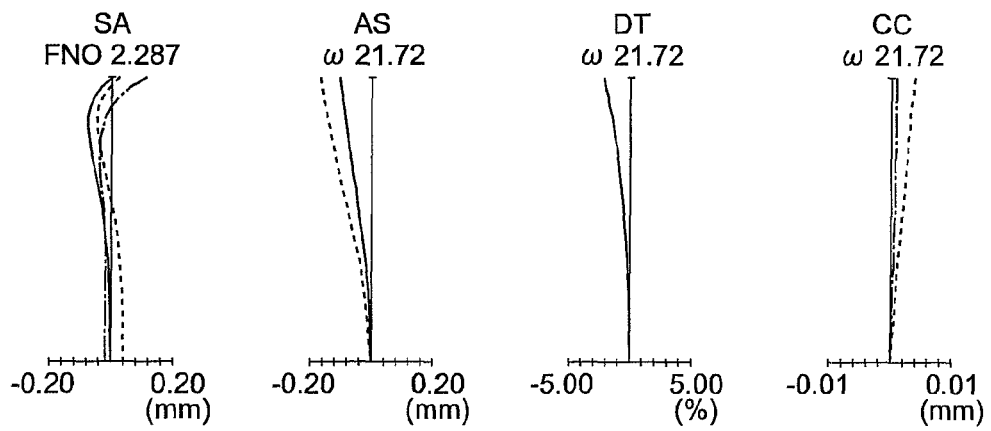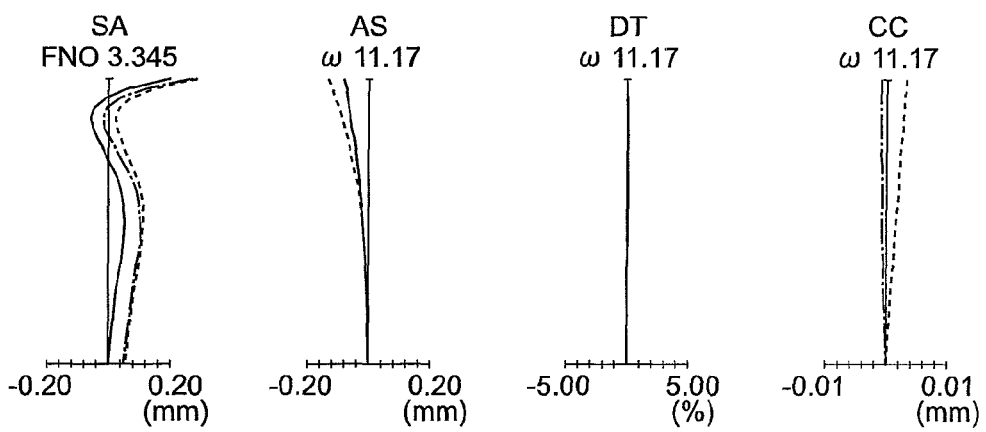

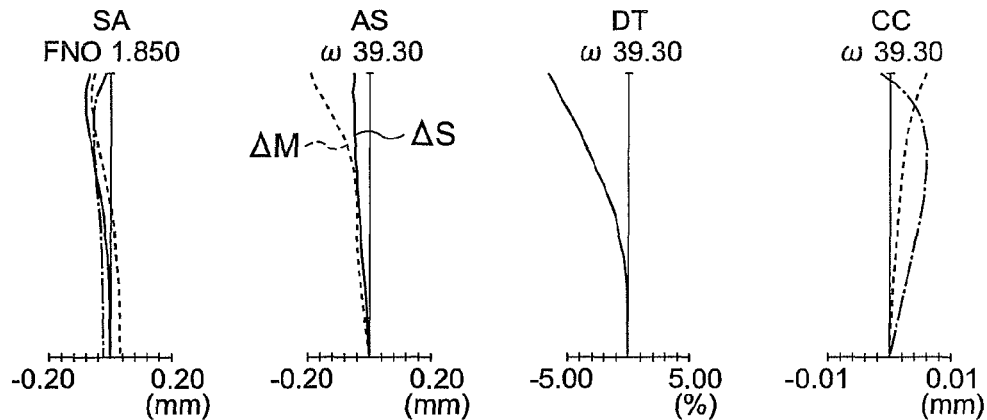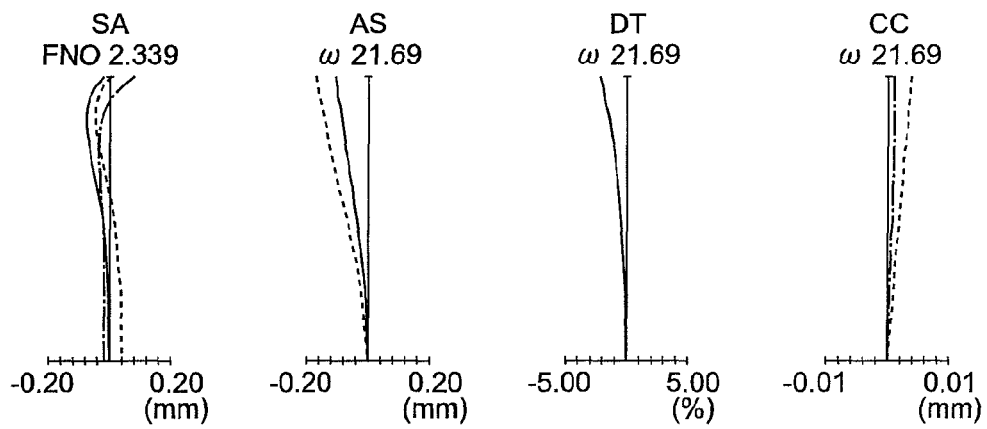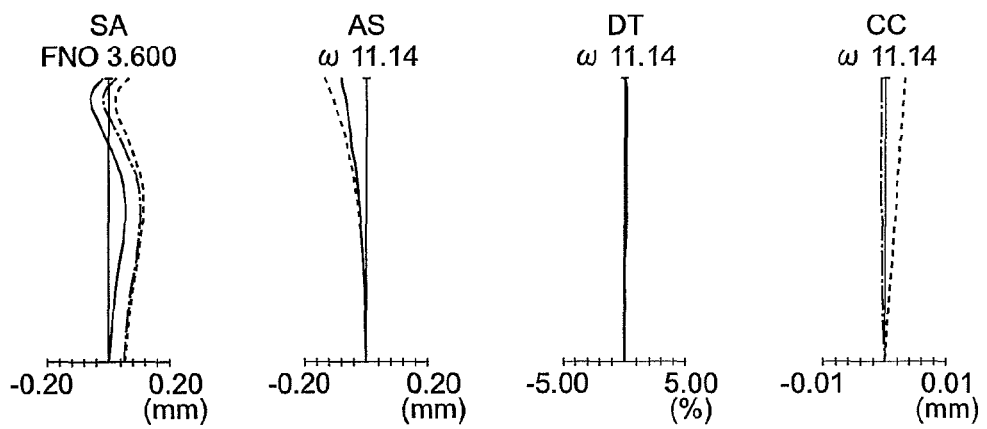

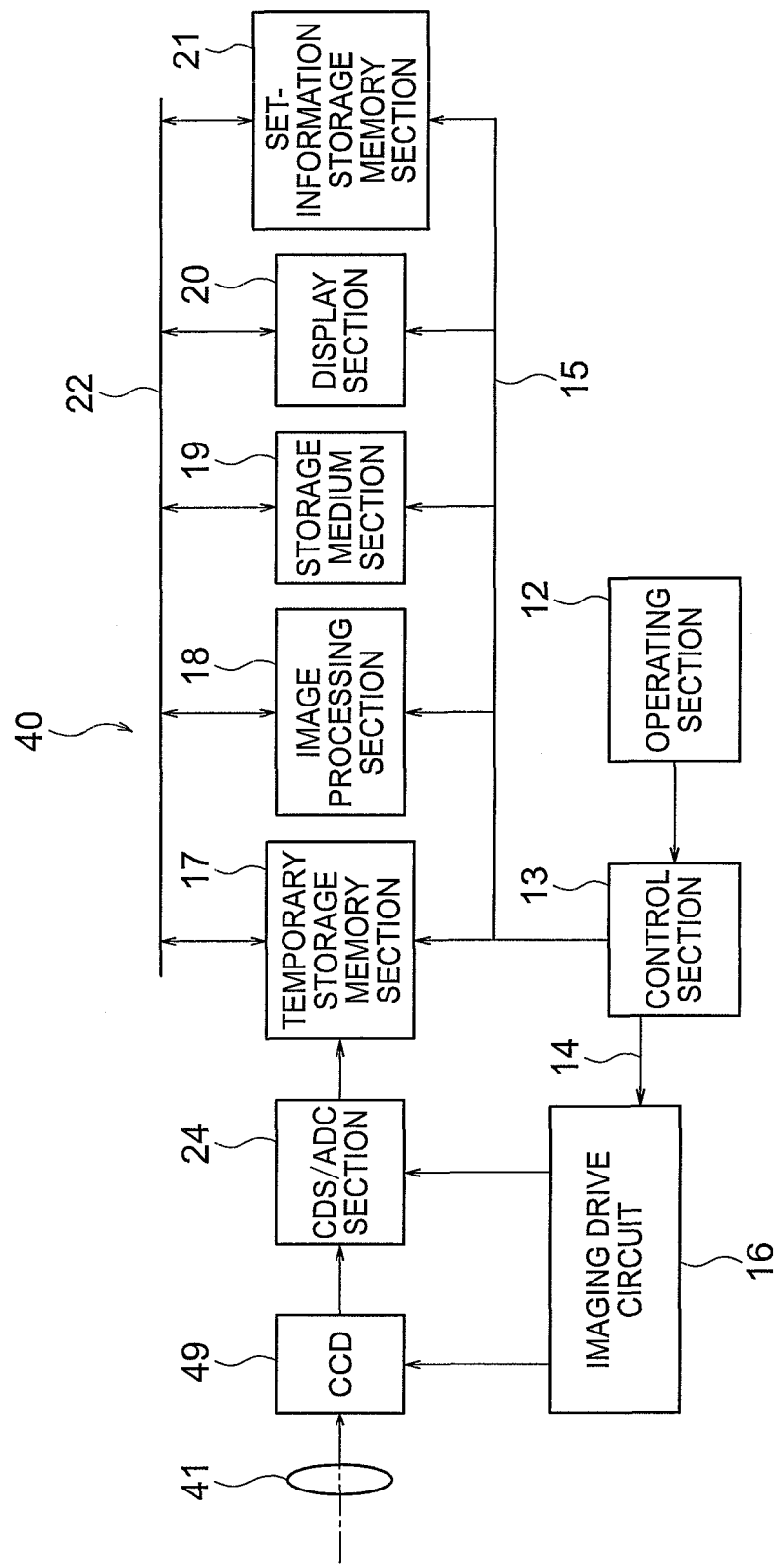

IMAGE PICKUP APPARATUS USING ZOOM LENS

CROSS-REFERENCE TO RELATED APPLICATION

The present application is based upon and claims the benefit of priority from the prior Japanese Patent Application No. 2011-246425 filed on Nov. 10, 2011; the entire contents of which are incorporated herein by reference.

BACKGROUND OF THE INVENTION

1. Field of the Invention

The present invention relates to an image pickup apparatus using zoom lens.

2. Description of the Related Art

An image pickup apparatus using zoom lens has hitherto been known. A method of controlling an exposure time and an F number of an aperture stop has been widely used as a method for adjusting an exposure at the time of capturing of one frame of the image pickup apparatus.

Moreover, as a method which is widely used for a video application, a method of adjusting by insertion and withdrawal of a light-amount reducing filter in an optical path of a zoom lens has been known from Japanese Patent Application Laid-open Publication No. 2006-267863.

By using such method, it is easy to achieve an appropriate exposure without making an entrance-pupil diameter of the zoom lens excessively small, and to achieve and image with a small depth of field even in a bright environment (an image of an abstract description).

Moreover, even when focal-point detection is any of a TTL phase-difference detection method or a TTL contrast detection method, a predetermined entrance-pupil diameter has to be secured, and even at the time of video photography in the bright environment, the focal-point detection can be carried out with the entrance-pupil diameter secured, and there is a merit particularly at the time of video photography.

In Japanese Patent Application Laid-open Publication No. 2006-267863, a zoom lens in which, the aperture stop is disposed immediately before an object side of a lens unit of a positive refractive power, and the light-amount reducing filter (ND filter) which can be inserted in and withdrawn from is disposed immediately after an image side of the lens unit having positive refractive power, has been disclosed. When the light-amount reducing filter is disposed immediately after the object side of the lens unit having a positive refractive power together with the aperture stop, it becomes difficult to bring a positive lens unit at a telephoto-end close to the lens unit immediately before the object side. However, taking into consideration the abovementioned point, an arrangement which is advantageous for securing a zoom ratio is adapted in a structure of Japanese Patent Application Laid-open Publication No. 2006-267863.

SUMMARY OF THE INVENTION

An image pickup apparatus using zoom lens according to the present invention includes a zoom lens having a first positive lens unit having a positive refractive power, and a first negative lens unit having a negative refractive power disposed on an object side of the first positive lens unit, and in which, a distance between the first positive lens unit and the first negative lens unit decreases at the time of zooming from a wide angle end to a telephoto end, and an electronic image pickup element having image pickup pixel rows which are arranged two-dimensionally at image positions formed by the zoom lens, and the zoom lens includes an aperture stop which is disposed between a lens nearest to an image side in the first negative lens unit and a lens nearest to the image side in the first positive lens unit, and a light-amount reducing filter made of a resin material, which is disposed on the image side of the lens nearest to the image side in the first positive lens unit, and which can be inserted in an optical path and withdrawn from the optical path, and the zoom lens and the electronic image pickup element satisfy the following conditional expressions (1), (2), (3), (4), and (5)

$$(n_1-n_2) \times t < 0.0002 \text{ mm} \tag{1}$$

$$1.4 < FNO_{min} < 2.8 \tag{2}$$

$$2.8 < f_t/f_w \tag{3}$$

$$1 \text{ μm} < P < 3 \text{ μm} \tag{4}$$

$$8 \times 10^6 < N \tag{5}$$

where, $n_1$ denotes the maximum refractive index of the light-amount reducing filter, on an optical axis of the zoom lens, $n_2$ denotes the minimum refractive index of the light-amount reducing filter, on the optical axis of the zoom lens, t denotes a thickness on the optical axis, of the light-amount reducing filter, $FNO_{min}$ denotes the minimum F number at the wide angle end of the zoom lens, $f_t$ denotes a focal length of the zoom lens, at the telephoto end, $f_w$ denotes a focal length of the zoom lens, at the wide angle end, P denotes an image pickup pixel pitch of the electronic image pickup element, and N denotes the maximum value of the number of image pickup pixels in an effective image pickup area of the electronic image pickup element.

Here, $n_1$ and $n_2$ are refractive indices on a d-line (587.56 nm)

BRIEF DESCRIPTION OF THE DRAWINGS

FIG. 1A and FIG. 1B are lens cross-sectional views at a wide angle end at the time of infinite object point focusing of a first embodiment of a zoom lens according to the present invention, and are diagrams in which, a trajectory of movement from the wide angle end to an intermediate state, and a trajectory of movement from the intermediate state to a telephoto end are shown in order, where, FIG. 1A shows a state in which, a light-amount reducing filter F is disposed in an optical path, and FIG. 1B shows a state in which, the light-amount reducing filter F is retracted from the optical path;

FIGS. 2A and 2B are lens cross-sectional views at a wide angle end at the time of infinite object point focusing of a second embodiment of the zoom lens according to the present invention, and are diagrams in which, a trajectory of movement from the wide angle end to an intermediate state, and a trajectory of movement from the intermediate state to a telephoto end are shown in order, where, FIG. 2A shows a state in which, the light-amount reducing filter F is disposed in an optical path, and FIG. 2B shows a state in which, the light-amount reducing filter F is retracted from the optical path;

FIG. 3A and FIG. 3B are lens cross-sectional views at a wide angle end at the time of infinite object point focusing of a third embodiment of the zoom lens according to the present invention, and are diagrams in which, a trajectory of movement from the wide angle end to an intermediate state, and a trajectory of movement from the intermediate state to a telephoto end are shown in order, where, FIG. 3A shows a state in which, the light-amount reducing filter F is disposed in an optical path, and FIG. 3B shows a state in which, the light-amount reducing filter F is retracted from the optical path;

FIG. 4A and FIG. 4B are lens cross-sectional views at a wide angle end at the time of infinite object point focusing of a fourth embodiment of the zoom lens according to the present invention, and are diagrams in which, a trajectory of movement from the wide angle end to an intermediate state, and a trajectory of movement from the intermediate state to a telephoto end are shown in order, where, FIG. 4A shows a state in which, the light-amount reducing filter F is disposed in an optical path, and FIG. 4B shows a state in which, the light-amount reducing filter F is retracted from the optical path;

FIG. 5A and FIG. 5B are lens cross-sectional views at a wide angle end at the time of infinite object point focusing of a fifth embodiment of the zoom lens according to the present invention, and are diagrams in which, a trajectory movement from the wide angle end to an intermediate state, and a trajectory movement from the intermediate state to a telephoto end are shown in order, where, FIG. 5A shows a state in which, the light-amount reducing filter F is disposed in an optical path, and FIG. 5B shows a state in which, the light-amount reducing filter F is retracted from the optical path;

FIG. 6A and FIG. 6B are lens cross-sectional views at a wide angle end at the time of infinite object point focusing of a sixth embodiment of the zoom lens according to the present invention, and are diagrams in which, a trajectory movement from the wide angle end to an intermediate state, and a trajectory movement from the intermediate state to a telephoto end are shown in order, where, FIG. 6A shows a state in which, the light-amount reducing filter F is disposed in an optical path, and FIG. 6B shows a state in which, the light-amount reducing filter F is retracted from the optical path;

FIG. 7A and FIG. 7B are lens cross-sectional views at a wide angle end at the time of infinite object point focusing of a seventh embodiment of the zoom lens according to the present invention, and are diagrams in which, a trajectory movement from the wide angle end to an intermediate state, and a trajectory movement from the intermediate state to a telephoto end are shown in order, where, FIG. 7A shows a state in which, the light-amount reducing filter F is disposed in an optical path, and FIG. 7B shows a state in which, the light-amount reducing filter F is retracted from the optical path;

FIG. 8A and FIG. 8B are lens cross-sectional views at a wide angle end at the time of infinite object point focusing of an eighth embodiment of the zoom lens according to the present invention, and are diagrams in which, a trajectory movement from the wide angle end to an intermediate state, and a trajectory movement from the intermediate state to a telephoto end are shown in order, where, FIG. 8A shows a state in which, the light-amount reducing filter F is disposed in an optical path, and FIG. 8B shows a state in which, the light-amount reducing filter F is retracted from the optical path;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing, of a state in which, the light-amount reducing filter F is retracted from the optical path in the first embodiment;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing, of a state in which, the light-amount reducing filter F is disposed in the optical path in the second embodiment;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing, of a state in which, the light-amount reducing filter F is retracted from the optical path in the second embodiment;

FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams at the time of infinite object point focusing, of a state in which, the light-amount reducing filter F is disposed in the optical path in the third embodiment;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams at the time of infinite object point focusing, of a state in which, the light-amount reducing filter F is retracted from the optical path in the third embodiment;

FIG. 15A, FIG. 15B, FIG. 15C, FIG. 15D, FIG. 15E, FIG. 15F, FIG. 15G, FIG. 15H, FIG. 15I, FIG. 15J, FIG. 15K, and FIG. 15L are aberration diagrams at the time of infinite object point focusing, of a state in which, the light-amount reducing filter F is disposed in the optical path in the fourth embodiment;

FIG. 16A, FIG. 16B, FIG. 16C, FIG. 16D, FIG. 16E, FIG. 16F, FIG. 16G, FIG. 16H, FIG. 16I, FIG. 16J, FIG. 16K, and FIG. 16L are aberration diagrams at the time of infinite object point focusing, of a state in which, the light-amount reducing filter F is retracted from the optical path in the fourth embodiment;

FIG. 17A, FIG. 17B, FIG. 17C, FIG. 17D, FIG. 17E, FIG. 17F, FIG. 17G, FIG. 17H, FIG. 17I, FIG. 17J, FIG. 17K, and FIG. 17L are aberration diagrams at the time of infinite object point focusing, of a state in which, the light-amount reducing filter F is disposed in the optical path in the fifth embodiment;

FIG. 18A, FIG. 18B, FIG. 18C, FIG. 18D, FIG. 18E, FIG. 18F, FIG. 18G, FIG. 18H, FIG. 18I, FIG. 18J, FIG. 18K, and FIG. 18L are aberration diagrams at the time of infinite object point focusing, of a state in which, the light-amount reducing filter F is retracted from the optical path in the fifth embodiment;

FIG. 19A, FIG. 19B, FIG. 19C, FIG. 19D, FIG. 19E, FIG. 19F, FIG. 19G, FIG. 19H, FIG. 19I, FIG. 19J, FIG. 19K, and FIG. 19L are aberration diagrams at the time of infinite object point focusing, of a state in which, the light-amount reducing filter F is disposed in the optical path in the sixth embodiment;

FIG. 20A, FIG. 20B, FIG. 20C, FIG. 20D, FIG. 20E, FIG. 20F, FIG. 20G, FIG. 20H, FIG. 20I, FIG. 20J, FIG. 20K, and FIG. 20L are aberration diagrams at the time of infinite object point focusing, of a state in which, the light-amount reducing filter F is retracted from the optical path in the sixth embodiment;

FIG. 21A, FIG. 21B, FIG. 21C, FIG. 21D, FIG. 21E, FIG. 21F, FIG. 21G, FIG. 21H, FIG. 21I, FIG. 21J, FIG. 21K, and FIG. 21L are aberration diagrams at the time of infinite object point focusing, of a state in which, the light-amount reducing filter F is disposed in the optical path in the seventh embodiment;

FIG. 22A, FIG. 22B, FIG. 22C, FIG. 22D, FIG. 22E, FIG. 22F, FIG. 22G, FIG. 22H, FIG. 22I, FIG. 22J, FIG. 22K, and FIG. 22L are aberration diagrams at the time of infinite object point focusing, of a state in which, the light-amount reducing filter F is retracted from the optical path in the seventh embodiment;

FIG. 23A, FIG. 23B, FIG. 23C, FIG. 23D, FIG. 23E, FIG. 23F, FIG. 23G, FIG. 23H, FIG. 23I, FIG. 23J, FIG. 23K, and FIG. 23L are aberration diagrams at the time of infinite object point focusing, of a state in which, the light-amount reducing filter F is disposed in the optical path in the eighth embodiment;

FIG. 24A, FIG. 24B, FIG. 24C, FIG. 24D, FIG. 24E, FIG. 24F, FIG. 24G, FIG. 24H, FIG. 24I, FIG. 24J, FIG. 24K, and FIG. 24L are aberration diagrams at the time of infinite object point focusing, of a state in which, the light-amount reducing filter F is retracted from the optical path in the eighth embodiment;

FIG. 28 is a block diagram showing an internal circuit of main components of the digital camera according to the present invention.

DETAILED DESCRIPTION OF THE INVENTION

Figure 9A:
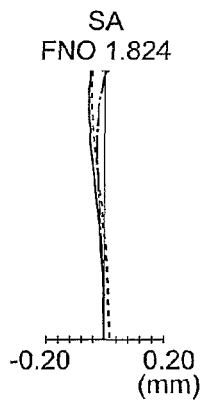
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing, of a state in which, the light-amount reducing filter F is disposed in the optical path in the first embodiment.
Figure 9B:
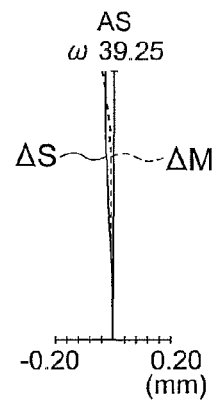
Figure 9C:
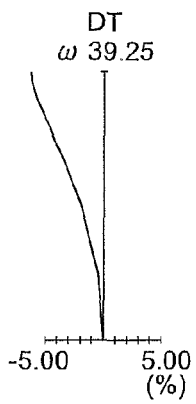
Figure 9D:
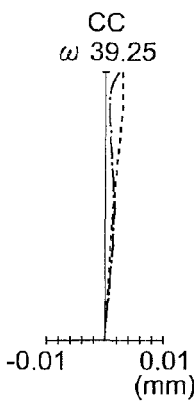
Figure 9E:
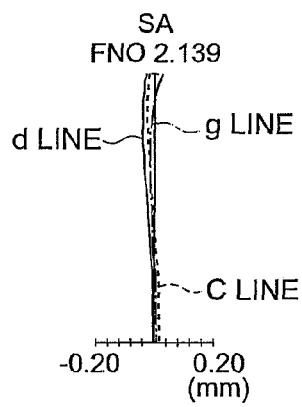
Figure 9F:
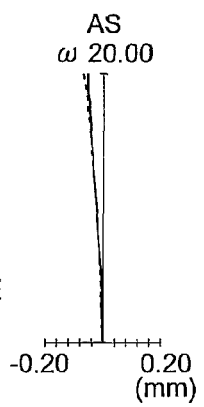
Figure 9G:
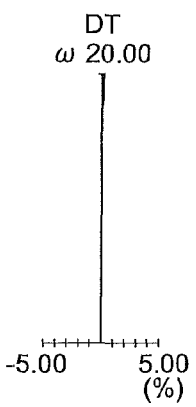
Figure 9H:
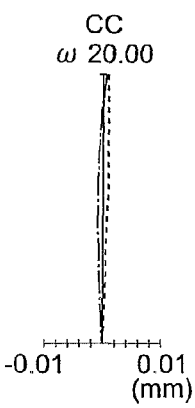
Figure 9I:
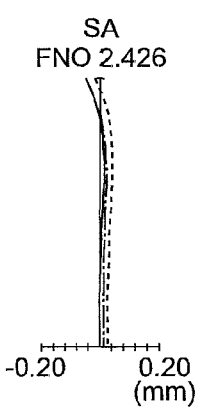
Figure 9J:
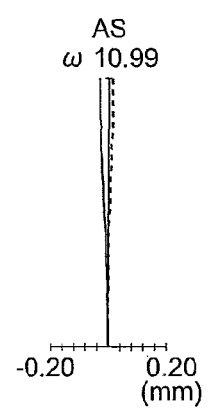
Figure 9K:
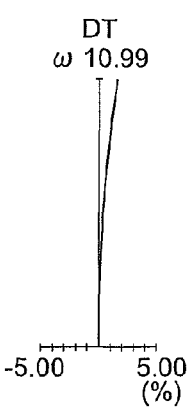
Figure 9L:
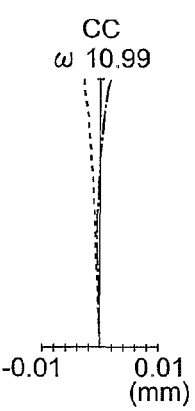

An image pickup apparatus having zoom lens of the present invention includes a zoom lens having a first positive lens unit having a positive refractive power, and a first negative lens unit having a negative refractive power disposed on an object side of the first positive lens unit, and in which, a distance between the first positive lens unit and the first negative lens unit decreases at the time of zooming from a wide angle end to a telephoto end, and an electronic image pickup element having image pickup pixel rows which are arranged two-dimensionally at image positions formed by the zoom lens, and the zoom lens includes an aperture stop which is disposed between a lens nearest to an image side in the first negative lens unit and a lens nearest to the image side in the first positive lens unit, and a light-amount reducing filter made of a resin material, which is disposed on the image side of the lens nearest to the image side in the first positive lens unit, and which can be inserted in and withdrawn from the optical path, and the zoom lens and the electronic image pickup element satisfy the following conditional expressions (1), (2), (3), (4), and (5).

$$(n_1 - n_2) \times t < 0.0002 \text{ mm} \quad (1)$$

$$1.4 < FNO_{min} < 2.8 \quad (2)$$

$$2.8 < f_t/f_w \quad (3)$$

$$1 \text{ μm} < P < 3 \text{ μm} \quad (4)$$

$$8 \times 10^6 < N \quad (5)$$

Where, $n_1$ denotes the maximum refractive index of the light-amount reducing filter, on an optical axis of the zoom lens, $n_2$ denotes the minimum refractive index of the light-amount reducing filter, on the optical axis of the zoom lens, t denotes a thickness on the optical axis, of the light-amount reducing filter, $FNO_{min}$ denotes the minimum F number at the wide angle end of the zoom lens, $f_t$ denotes a focal length of the zoom lens, at the telephoto end, $f_w$ denotes a focal length of the zoom lens, at the wide angle end, P denotes an image pickup pixel pitch of the electronic image pickup element, and N denotes the maximum value of the number of image-pickup pixels in an effective image pickup area of the electronic image pickup element.

Here, $n_1$ and $n_2$ are refractive indices on a d-line (587.56 nm).

On the object side of the zoom lens, an axial light beam is almost parallel, but an effective diameter being large, it is difficult to adapt an arrangement in which an insertion and withdrawal of the light-amount reducing filter is carried out. Whereas, the effective diameter being small near the first positive lens unit, it is possible to let the axial light beam to be parallel, and is suitable for disposing the light-amount reducing filter. However, when the light-amount reducing filter is disposed on the object side of the first positive lens unit, at the telephoto end, it becomes difficult to bring the first positive lens unit closer to the first negative lens unit, and it becomes disadvantageous for securing zoom ratio.

Therefore, in the image pickup apparatus having zoom lens according to the present invention, the light-amount reducing filter is disposed on the image side of the first positive lens unit.

Furthermore, the abovementioned conditional expressions (1), (2), (3), (4), and (5) are satisfied simultaneously.

Conditional expression (1) is an expression which specifies a preferable arrangement of the light-amount reducing filter which indicates a birefringence.

By making an arrangement such that the light-amount reducing filter does not surpass an upper limit value of conditional expression (1), even when used in the image pickup apparatus which satisfies conditional expressions (2) to (5), it is possible to make is susceptible to reduce an effect on birefringence at the time of inserting the light-amount reducing filter.

Conditional expression (2) is an expression which specifies a preferable brightness of the zoom lens.

By suppressing the brightness moderately so as not to surpass a lower limit value of conditional expression (2), it becomes easy to suppress spherical aberration, and it becomes easy to carry out designing in which the effect of birefringence of the light-amount reducing filter is acceptable while suppressing an increase in the number of lenses for aberration correction.

Securing the brightness of the zoom lens by making an arrangement such that an upper limit value of conditional expression (2) is not surpassed becomes advantageous for securing the brightness at the time of withdrawing the light-amount reducing filter. Moreover, it is possible to carry out photography with a shallow depth of field at the time of mounting the light-amount reducing filter.

When the upper limit value of conditional expression (2) is surpassed, securing of an image forming performance of the zoom lens becomes easy, and a significance of conditional expression (1) is reduced to little.

Conditional expression (3) is an expression which specifies a preferable zoom ratio of the zoom lens.

By securing the zoom ratio such that a lower limit value of conditional expression (3) is not surpassed, it is possible to enjoy photography in various situations by a change in an angle of view of capturing.

From a point of view of small-sizing of the image pickup apparatus, it is preferable to let the upper limit value of conditional expression (3) to be 25.0.

Conditional expression (4) is an expression which satisfies a preferable image pickup pixel pitch of the electronic image pickup element.

When an arrangement is made such that a lower limit value of conditional expression (4) is not surpassed, a light receiving area per pixel is secured, which is advantageous for reducing an electrical noise.

When an arrangement is made such that an upper limit value of conditional expression (4) is not surpassed, the image pickup pixel pitch is suppressed, which reduces a degradation of image quality when trimming is carried out.

Conditional expression (5) is an expression which specifies the preferable number of image pickup pixels in an effective image pickup area of the image pickup element.

By securing the number of image pickup pixels so that a lower limit value of conditional expression (5) is not surpassed, the degradation of image quality when trimming has been carried out is reduced.

For making memory capacity for recording susceptible to suppress, it is preferable to let an upper limit value of conditional expression (5) to be $21 \times 10^6$.

The abovementioned arrangement is to be let to be an arrangement in a state in which, when the zoom lens has a focusing mechanism, an object at the farthest distance is focused.

Moreover, it is possible to adjust n1 and n2 of the light-amount reducing filter by a direction of pulling the material, and an arrangement at the time of manufacturing.

The image pickup apparatus having zoom lens according to the present invention includes at least one lens unit on the image side of the light-amount reducing filter, and the zoom lens satisfies the following conditional expressions (6) and (7).

$$1.3 < \Delta_{P1}/f_w < 8 \qquad (6)$$

$$0 \le (h_{max} - h_{min})/P < 0.01 \qquad (7)$$

where, $\Delta_{P1}$ denotes an amount of movement on the object side of the first positive lens unit at the time of zooming from the wide angle end to the telephoto end, $f_w$ denotes a focal length of the overall zoom lens at the wide angle end, $h_{min}$ denotes the minimum value of a distance from an optical axis at a location at which, light rays parallel to an optical axis incident at a light-ray height of $(n_1-n_2) \times t$ on the lens unit on the image side of the light-ray reducing filter reach an image plane, in a zoom range from the wide angle end to the telephoto end, and $h_{max}$ denotes the maximum value of the distance from the optical axis at a location at which, the light rays parallel to the optical axis, which are incident at the light-ray height of $(n_1-n_2) \times t$ on the lens unit on the image side of the light-ray reducing filter reach the image plane, in the zoom range from the wide angle end to the telephoto end.

It is preferable that a change in the effect due to birefringence is small from the wide angle end to the telephoto end even while securing the zoom ratio. For this, it is preferable to secure the zoom ratio at an optical system on the object side rather than at the light-amount reducing filter, and to suppress a change in an effect of the light-amount reducing filter at an optical system on the image side rather than at the light-amount reducing filter.

Conditional expression (6) is an expression for improving a function of increasing magnification of the first positive lens unit.

Securing an amount of movement of the first positive lens unit by making an arrangement, such that a lower limit value of conditional expression (6) is not surpassed leads to securing of zoom ratio and small-sizing.

Suppressing the amount of movement of the first lens unit moderately by making an arrangement such that an upper limit value of conditional expression (6) is not surpassed leads to small-sizing of the overall apparatus.

Conditional expression (7) is an expression which specifies preferable characteristics of the optical system on the image side of the light-amount reducing filter.

There is no surpassing of a lower limit value of conditional expression (7).

It is preferable to design the zoom lens to suppress a change in zooming of the effect of birefringence of the light-amount reducing filter by making an arrangement such that an upper limit value of conditional expression (7) is not surpassed.

In the image pickup apparatus having zoom lens according to the present invention, it is preferable that the first positive lens unit, the aperture stop, and the light-amount reducing filter move integrally to be positioned on the object side at the telephoto end with respect to the wide angle end.

Accordingly, an effective diameter of the light-amount reducing filter and the first positive lens unit are susceptible to be made small, which is advantageous for achieving both, securing brightness and small-sizing.

In the image pickup apparatus having zoom lens according to the present invention, it is preferable that the lens unit on the image side of the light-amount reducing filter has a positive refractive power as a whole, and the zoom lens satisfies the following conditional expression (8) all the time while zooming from the wide angle end to the telephoto end.

$$0.9 < f_{RB}/f_B < 100 \qquad (8)$$

where, $f_{RB}$ denotes a distance up to a focal point only by the lens unit on the image side of the light-amount reducing filter, and $f_B$ denotes a distance from a surface of emergence (exit surface) of the lens nearest to the image side up to an image forming surface of the electronic image pickup element.

Conditional expression (8) is an expression which specifies a preferable structure of the zoom lens when such an arrangement has been made.

Making an arrangement such that a lower limit value of conditional expression (8) is not surpassed is all the more advantageous for reducing the effect of birefringence.

Making an arrangement such that an upper limit value of conditional expression is not surpassed leads to make is susceptible to bring closer to a telecentric arrangement and to an improvement in image quality.

In an image pickup apparatus having zoom lens according to the present invention, it is preferable that the zoom lens includes a second positive lens unit having a positive refractive power, which is disposed on the image side of the light-amount reducing filter, and a distance between the light-amount reducing filter and the second positive lens unit changes at the time of zooming from the wide angle end to the telephoto end.

Accordingly, it is possible to make an arrangement in which, it is susceptible to move away the exit pupil from the image pickup element, and it is susceptible to suppress shading.

In the image pickup apparatus having zoom lens according to the present invention, it is preferable that the abovementioned zoom lens which includes the second positive lens unit having a positive refractive power which is disposed on the image side of the light-amount reducing filter, and in which, the distance between the light-amount reducing filter and the second positive lens unit changes at the time of zooming from the wide angle end to the telephoto end, is a three-unit zoom lens.

In the image pickup apparatus having zoom lens according to the present invention, it is preferable that the zoom lens includes a third positive lens unit having a positive refractive power, which is disposed on the object side of the first negative lens unit, and a distance between the first negative lens unit and the third positive lens unit increases at the time of zooming from the wide angle end to the telephoto end.

Imparting a zooming function to the first negative lens unit is advantageous for securing the zoom ratio. Moreover, imparting the zooming function to the first negative lens unit is advantageous also for securing brightness at the telephoto end.

Furthermore, it is preferable that the above-mentioned zoom lens which includes the third positive lens unit having a positive refractive power which is disposed on the object side of the first negative lens unit, and in which, the distance between the first negative lens unit and the third positive lens unit increases at the time of zooming from the wide angle end to the telephoto end, is a four-unit zoom lens.

In the image pickup apparatus having zoom lens according to the present invention, it is preferable that the zoom lens includes a lens unit on the image side of the second positive lens unit, of which a distance from the second positive lens unit changes.

Such an arrangement is advantageous for securing flatness of an image plane.

Furthermore, it is preferable that the above-mentioned zoom lens which includes the lens unit on the image side of the second positive lens unit, of which, a distance from the second positive lens unit changes, is a four-unit zoom lens.

In the image pickup apparatus having zoom lens according to the present invention, it is preferable that the light-amount reducing filter includes a polyolefin filter material.

In the image pickup apparatus having zoom lens according to the present invention, it is preferable that the light-amount reducing filter includes a polycarbonate filter material.

Regarding conditional expression (1), it is preferable to let the upper limit value to be 0.00016, and 0.00013 is even more preferable, 0.00010 is even more preferable, 0.00005 is even more preferable, 0.00002 is even more preferable, and 0.00001 is even more preferable.

Regarding conditional expression (2), it is preferable to let the lower limit value to be 1.6, and more preferable to let to be 1.8.

It is preferable to let the upper limit value of conditional expression (2) to be 2.4, and more preferable to let to be 2.2.

Regarding conditional expression (3), it is preferable to let the lower limit value to be 3.2, and more preferable to let to be 3.6.

It is preferable to let the upper limit value of conditional expression (3) to be 25.0, and more preferable to let to be 15.0, and even more preferable to let to be 8.0.

Regarding conditional expression (4), it is preferable to let the lower limit value to be 1.3, and more preferable to let to be 1.6.

It is preferable to let the upper limit value of conditional expression (4) to be 2.7, and more preferable to let to be 2.4.

Regarding conditional expression (5), it is preferable to let the lower limit value to be $9\times10^6$, and more preferable to let to be $9.5\times10^6$.

It is preferable to let the upper limit value of conditional expression (5) to be $21\times10^6$, and more preferable to let to be $18\times10^6$, and even more preferable to let to be $16\times10^6$.

Regarding conditional expression (6), it is preferable to let the lower limit value to be 1.4, and more preferable to let to be 1.5.

It is preferable to let the upper limit value of conditional expression (6) to be 6, and more preferable to let to be 5.

Regarding conditional expression (7), it is preferable to let the upper limit value to be 0.008, and more preferable to let to be 0.006.

Regarding conditional expression (8), it is preferable to let the lower limit value to be 1, and more preferable to let to be 2.

It is preferable to let the upper limit value of conditional expression (8) to be 50, and more preferable to let to be 30.

The image pickup apparatus using zoom lens according to the present invention shows an effect that a high-resolution image with less degradation of image quality is achieved at the time of adjusting the amount of light in a zoom lens which is bright, or in other words, which has a small Fno.

Exemplary embodiments of the image pickup apparatus having zoom lens according to the present invention will be described below in detail by referring to the accompanying diagrams. However, the present invention is not restricted to the embodiments described below.

Embodiments

Embodiments from a first embodiment to an eighth embodiment of the zoom lens will be described below. Lens cross-sectional views at the wide angle end at the time of infinite object point focusing of the embodiments from the first embodiment to the eighth embodiment are shown in diagrams from FIG. 1A to FIG. 8B. In diagrams from FIG. 1A to FIG. 8B, a first lens unit is denoted by G1, a second lens unit is denoted by G2, a third lens unit is denoted by G3, an aperture stop is denotes by S, a light-amount reducing filter made of resin which is birefringent is denoted by F, and an image plane is denoted by I. Moreover, FIG. 1A, FIG. 2A, FIG. 3A, FIG. 4A, FIG. 5A, FIG. 6A, FIG. 7A, and FIG. 8A show a state in which, the light-amount reducing filter F is disposed in an optical path, and FIG. 1B, FIG. 2B, FIG. 3B, FIG. 4B, FIG. 5B, FIG. 6B, FIG. 7B, and FIG. 8B show a state in which, the light-amount reducing filter F is retracted from the optical path. The light-amount reducing filter F is inserted in and withdrawn from the optical path alternately by a filter moving portion M.

Moreover, the aperture stop S and the light-amount reducing filter F move integrally with the third lens unit G3 in the first embodiment and the second embodiment, and move integrally with the second lens unit G2 in the embodiments from the third embodiment to the eighth embodiment. A unit of length of each numerical value is mm and a unit of angle is "°" degrees. Focusing is carried out by moving the fourth lens unit G4 in the first embodiment and the second embodiment, and by moving the third lens unit G3 in the embodiments from the third embodiment to the eighth embodiment. Furthermore, zoom data is values at the wide angle end (WE), an intermediate zoom state (ST) defined in the present invention, and the telephoto end (TE).

A zoom lens according to the first embodiment, as shown in FIG. 1A and FIG. 1B, includes in order from an object side, a first lens unit G1 having a positive refractive power, a second lens unit G2 having a negative refractive power, an aperture stop S, a third lens unit G3 having a positive refractive power, a light-amount reducing filter F, and a fourth lens unit G4 having a positive refractive power.

Here, the first lens unit is the third positive lens unit having a positive refractive power, the second lens unit G2 is the first negative lens unit having a negative refractive power, the third lens unit G3 is the first positive lens unit having a positive refractive power, and the fourth lens unit G4 is the second positive lens unit having a positive refractive power.

At the time of zooming from the wide angle end to the telephoto end, the first lens unit G1, after moving toward the image side, moves toward the object side. The second lens unit G2 moves toward the image side. The third lens unit G3 moves toward the object side. The fourth lens unit G4, after moving toward the object side, moves toward the image side.

Focusing operation from a long-distance object point to a short-distance object point is carried out by moving the fourth lens unit G4 toward the object side.

In order from the object side, the first lens unit G1 includes a cemented lens of a negative meniscus lens having a convex surface directed toward the object side and a positive meniscus lens having a convex surface directed toward the object side. The second lens unit G2 includes a negative meniscus lens having a convex surface directed toward the object side, a biconcave negative lens, and a biconvex positive lens. The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens. The fourth lens unit. G4 includes a positive meniscus lens having a convex surface directed toward the object side.

An aspheric surface is provided to six surfaces namely, both surfaces of the biconcave negative lens in the second lens unit G2, both surface of the biconvex positive lens on the object side and a surface on the image side of the biconvex positive lens on the image side in the third lens unit G3, and a surface on the object side of the positive meniscus lens in the fourth lens unit G4.

A zoom lens according to the second embodiment, as shown in FIG. 2A and FIG. 2B, includes in order from an object side, a first lens unit G1 having a positive refractive power, a second lens unit G2 having a negative refractive power, an aperture stop S, a third lens unit G3 having a positive refractive power, a light-amount reducing filter F, and a fourth lens unit G4 having a positive refractive power.

Here, the first lens unit G1 is the third positive lens unit having a positive refractive power, the second lens unit G2 is the first negative lens unit having a negative refractive power, the third lens unit G3 is the first positive lens unit having a positive refractive power, and the fourth lens unit G4 is the second positive lens unit having a positive refractive power.

At the time of zooming from the wide angle end to the telephoto end, the first lens unit G1, after moving toward the image side, moves toward the object side. The second lens unit G2, after moving toward the image side, moves toward the object side. The third lens unit G3 moves toward the object side. The fourth lens unit G4, after moving toward the object side, moves toward the image side.

Focusing operation from a long-distance object point to a short-distance object point is carried out by moving the fourth lens unit G4 toward the object side.

In order from the object side, the first lens unit G1 includes a cemented lens of a negative meniscus lens having a convex surface directed toward the object side and a positive meniscus lens having a convex surface directed toward the object side. The second lens unit G2 includes a negative meniscus lens having a convex surface directed toward the object side, a biconcave negative lens, and a biconvex positive lens. The third lens unit G3 includes a biconvex positive lens, a cemented lens of a positive meniscus lens having a convex surface directed toward the object side and a negative meniscus lens having a convex surface directed toward the object side, and a cemented lens of a biconcave negative lens and biconvex positive lens. The fourth lens unit G4 includes a cemented lens of a biconvex positive lens and a biconcave negative lens.

An aspheric surface is provided to six surfaces namely, both surfaces of the biconcave negative lens in the second lens unit G2, both surfaces of the biconvex positive lens on the object side and a surface on the image side of the biconvex positive lens on the image side in the third lens unit G3, and a surface on the object side of the biconvex positive lens in the fourth lens unit G4.

A zoom lens according to the third embodiment, as shown in FIG. 3A and FIG. 3B, includes in order from an object side, a first lens unit G1 having a negative refractive power, an aperture stop S, a second lens unit G2 having a positive refractive power, a light-amount reducing filter F, a third lens unit G3 having a positive refractive power, and a fourth lens unit G4 having a positive refractive power.

Here, the first lens unit G1 is the first negative lens unit having a negative refractive power, the second lens unit G2 is the first positive lens unit having a positive refractive power, the third lens unit G3 is the second positive lens unit having a positive refractive power, and the fourth lens unit G4 is the lens unit of which, the distance from the second positive lens unit changes.

At the time of zooming from the wide angle end to the telephoto end, the first lens unit G1, after moving toward an image side, moves toward the object side. The second lens unit G2 moves toward the object side. The third lens unit G2, after moving toward the object side, moves toward the image side. The fourth lens unit G4 is fixed.

Focusing operation from a long-distance object point to a short-distance object point is carried out by moving the third lens unit G3 toward the object side.

In order from the object side, the first lens unit G1 includes a negative meniscus lens having a convex surface directed toward the object side, a biconcave negative lens, and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a cemented lens of a biconcave negative lens and a biconvex positive lens. The third lens unit G3 includes a cemented lens of a biconvex positive lens and a negative meniscus lens having a convex surface directed toward the image side. The fourth lens unit G4 includes a positive meniscus lens having a convex surface directed toward the object side.

An aspheric surface is provided to five surfaces namely, a surface on the image side of the negative meniscus lens in the first lens unit G1, both surfaces of the positive meniscus lens on the object side and a surface on the image side of the biconvex positive lens in the second lens unit G2, and a surface on the object side of the positive meniscus lens in the fourth lens unit G4.

A zoom lens according to the fourth embodiment, as shown in FIG. 4A and FIG. 4B, includes in order from an object side, a first lens unit G1 having a negative refractive power, an aperture stop S, a second lens unit G2 having a positive refractive power, a light-amount reducing filter F, a third lens unit G3 having a positive refractive power, and a fourth lens unit G4 having a positive refractive power.

Here, the first lens unit G1 is the first negative lens unit having a negative refractive power, the second lens unit G2 is the first positive lens unit having a positive refractive power, the third lens unit G3 is the second positive lens unit having a positive refractive power, and the fourth lens unit G4 is the lens unit of which, the distance from the second positive lens unit changes.

At the time of zooming from the wide angle end to the telephoto end, the first lens unit G1, after moving toward an image side, moves toward the object side. The second lens unit G2 moves toward the object side. The third lens unit G3, after moving toward the object side, moves toward the image side. The fourth lens unit G4 is fixed.

Focusing operation from a long-distance object point to a short-distance object point is carried out by moving the third lens unit G3 toward the object side.

In order from the object side, the first lens unit G1 includes a biconcave negative lens and a positive meniscus lens having a convex surface directed toward the object side. The second lens unit G2 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens. The third lens unit G3 includes a cemented lens of a biconvex positive lens and a negative meniscus lens having a convex surface directed toward the image side. The fourth lens unit G4 includes a positive meniscus lens having a convex surface directed toward the object side.

An aspheric surface is provided to six surfaces namely, both surfaces of the biconcave negative lens in the first lens unit G1, both surfaces of the biconvex positive lens on the object side and a surface on the image side of the biconvex positive lens on the image side in the second lens unit G2, and a surface on the object side of the positive meniscus lens in the fourth lens unit G4.

A zoom lens according to the fifth embodiment, as shown in FIG. 5A and FIG. 5B, includes in order from an object side, a first lens unit G1 having a negative refractive power, an aperture stop S, a second lens unit G2 having a positive refractive power, a light-amount reducing filter F, a third lens unit G3 having a positive refractive power, and a fourth lens unit G4 having a positive refractive power.

Here, the first lens unit G1 is the first negative lens unit having a negative refractive power, the second lens unit G2 is the first positive lens unit having a positive refractive power, the third lens unit G3 is the second positive lens unit having a positive refractive power, and the fourth lens unit G4 is the lens unit of which, the distance from the second positive lens unit changes.

At the time of zooming from the wide angle end to the telephoto end, the first lens unit G1, after moving toward an image side, moves toward the object side. The second lens unit G2 moves toward the object side. The third lens unit G3, after moving toward the object side, moves toward the image side. The fourth lens unit G4 is fixed.

Focusing operation from a long-distance object point to a short-distance object point is carried out by moving the third lens unit G3 toward the object side.

In order from the object side, the first lens unit G1 includes a biconcave negative lens and a positive meniscus lens having a convex surface directed toward the object side. The second lens unit G2 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens. The third lens unit G3 includes a cemented lens of a biconvex positive lens and a negative meniscus lens having a convex surface directed toward the image side. The fourth lens unit G4 includes a positive meniscus lens having a convex surface directed toward the object side.

An aspheric surface is provided to six surfaces namely, both surfaces of the biconcave negative lens in the first lens unit G1, both surfaces of the biconvex positive lens on the object side and a surface on the image side of the biconvex positive lens on the image side in the second lens unit G2, and a surface on the object side of the positive meniscus lens in the fourth lens unit G4.

A zoom lens according to the sixth embodiment, as shown in FIG. 6A and FIG. 6B, includes in order from an object side, a first lens unit G1 having a negative refractive power, an aperture stop S, a second lens unit G2 having a positive refractive power, a light-amount reducing filter F, a third lens unit G3 having a positive refractive power, and a fourth lens unit G4 having a positive refractive power.

Here, the first lens unit G1 is the first negative lens unit having a negative refractive power, the second lens unit G2 is the first positive lens unit having a positive refractive power, the third lens unit G3 is the second positive lens unit having a positive refractive power, and the fourth lens unit G4 is the lens unit of which, the distance from the second positive lens unit changes.

At the time of zooming from the wide angle end to the telephoto end, the first lens unit G1, after moving toward an image side, moves toward the object side. The second lens unit G2 moves toward the object side. The third lens unit G3, after moving toward the object side, moves toward the image side. The fourth lens unit G4 is fixed.

Focusing operation from a long-distance object point to a short-distance object point is carried out by moving the third lens unit G3 toward the object side.

In order from the object side, the first lens unit G1 includes a negative meniscus lens having a convex surface directed toward the object side, a biconcave negative lens, and a positive meniscus lens having a convex surface directed toward the object side. The second lens unit G2 includes a biconvex positive lens, a cemented lens of a positive meniscus lens having a convex surface directed toward the object side and a negative meniscus lens having a convex surface directed toward the object side, and a cemented lens of a biconcave negative lens and a biconvex positive lens. The third lens unit G3 includes a biconvex positive lens. The fourth lens unit G4 includes a positive meniscus lens having a convex surface directed toward the object side.

An aspheric surface is provided to five surfaces namely, a surface on the image side of the negative meniscus lens in the first lens unit, both surfaces of the biconvex positive lens on the object side and a surface on the image side of the biconvex positive lens on the image side in the second lens unit G2, and a surface on the object side of the positive meniscus lens in the fourth lens unit.

A zoom lens according to the seventh embodiment, as shown in FIG. 7A and FIG. 7B, includes in order from an object side, a first lens unit G1 having a negative refractive power, an aperture stop S, a second lens unit G2 having a positive refractive power, a light-amount reducing filter F, a third lens unit G3 having a positive refractive power, and a fourth lens unit G4 having a negative refractive power.

Here, the first lens unit G1 is the first negative lens unit having a negative refractive power, the second lens unit. G2 is the first positive lens unit having a positive refractive power, the third lens unit G3 is the second positive lens unit having a positive refractive power, and the fourth lens unit G4 is the lens unit of which, the distance from the second positive lens unit changes.

At the time of zooming from the wide angle end to the telephoto end, the first lens unit G1, after moving toward an image side, moves toward the object side. The second lens unit G2 moves toward the object side. The third lens unit G3, after moving toward the object side, moves toward the image side. The fourth lens unit G4 is fixed.

Focusing operation from a long-distance object point to a short-distance object point is carried out by moving the third lens unit G3 toward the object side.

In order from the object side, the first lens unit G1 includes a negative meniscus lens having a convex surface directed toward the object side, a biconcave negative lens, and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a cemented lens of a biconcave negative lens and a biconvex positive lens. The third lens unit G3 includes a biconvex positive lens. The fourth lens unit G4 includes a planoconcave negative lens having a plane surface directed toward the image side.

An aspheric surface is provided to five surfaces namely, a surface on the image side of the negative meniscus lens in the first lens unit G1, both surfaces of the positive meniscus lens on the object side and a surface on the image side of the biconvex positive lens in the second lens unit G2, and a surface on the object side of the planoconcave negative lens in the fourth lens unit G4.

A zoom lens according to the eighth embodiment, as shown in FIG. 8A and FIG. 8B, includes in order from an object side, a first lens unit G1 having a negative refractive power, an aperture stop S, a second lens unit G2 having a positive refractive power, a light-amount reducing filter F, and a third lens unit G3 having a positive refractive power.

Here, the first lens unit G1 is the first negative lens unit having a negative refractive power, the second lens unit G2 is the first positive lens unit having a positive refractive power, and the third lens unit G3 is the second positive lens unit having a positive refractive power.

At the time of zooming from the wide angle end to the telephoto end, the first lens unit G1, after moving toward an image side, moves toward the object side. The second lens unit G2 moves toward the object side. The third lens unit G3, after moving toward the object side, moves toward the image side.

Focusing operation from a long-distance object point to a short distance object point is carried out by moving the third lens unit toward the object side.

In order from the object side, the first lens unit G1 includes a negative meniscus lens having a convex surface directed toward the object side, a negative meniscus lens having a convex surface directed toward the object side, and a positive meniscus lens having a convex surface directed toward the object side. The second lens unit G2 includes a positive meniscus lens having a convex surface directed toward the object side, a cemented lens of a positive meniscus lens having a convex surface directed toward the object side and a negative meniscus lens having a convex surface directed toward the object side, and a cemented lens of a biconcave negative lens and a biconvex positive lens. The third lens unit G3 includes a biconvex positive lens.

An aspheric surface is provided to five surfaces namely, a surface on the image side of the negative meniscus lens on the object side in the first lens unit G1, both surfaces of the positive meniscus lens on the object side and a surface on the image side of the biconvex positive lens in the second lens unit G2, and a surface on the object side of the biconvex positive lens in the third lens unit G3.

Next, numerical data of each of the embodiments will be shown. Apart from the symbols used in the description, f1, f2, . . . denote focal lengths of lens units, FNO denotes an F number, ω denotes a half angle of field, r denotes a radius of curvature of each lens surface, d denotes a distance between two lens surfaces, nd denotes a refractive index of each lens for a d-line, and vd denotes Abbe's number for each lens. An overall length of lenses is a length which is obtained by adding a back focus to a distance from a front lens surface to a last lens surface. fb (back focus) is indicated by a distance from the last lens surface up to a paraxial image plane, as (in terms of) an air conversion length.

Moreover, each aspheric surface shape is expressed by the following expression (I) by using each aspheric surface coefficient in each embodiment.

In the following expression (I), a coordinate in an optical axial direction is let to be Z, and a coordinate in a direction perpendicular to an optical axis is let to be Y.

$$Z=(Y^2/r)/[1+\{1-(1+K)\cdot(Y/r)^2\}^{1/2}]+A_4\times Y^4+A_6\times Y^6+A_8\times Y^8+A_{10}\times Y^{10}+A_{12}\times Y^{12} \quad (I)$$

Where,
r denotes a paraxial radius of curvature,
K denotes a conical coefficient, and
$A_4, A_6, A_8, A_{10}$, and $A_{12}$ are aspheric coefficients of fourth order, sixth order, eighth order, tenth order, and twelfth order respectively.

Moreover, in the aspheric coefficient, 'e-n' (n is an integer) indicates '$10^{-n}$'.

Numerical Example 1

State in which, the Light-Amount Reducing Filter F is Disposed in the Optical Path

| Unit mm | | | | |
|---|---|---|---|---|
| Surface data | | | | |
| Surface no. | r | d | nd | vd |
| Object plane | ∞ | ∞ | | |
| 1 | 32.407 | 1.00 | 1.94595 | 17.98 |
| 2 | 24.711 | 3.71 | 1.81600 | 46.62 |
| 3 | 181.957 | Variable | | |

-continued

| Unit mm | | | | |
|---|---|---|---|---|
| 4 | 62.535 | 1.00 | 1.88300 | 40.76 |
| 5 | 8.539 | 4.99 | | |
| 6* | −35.795 | 0.80 | 1.58313 | 59.38 |
| 7* | 15.195 | 1.40 | | |
| 8 | 23.234 | 2.08 | 2.00069 | 25.46 |
| 9 | −202.836 | Variable | | |
| 10(stop) | ∞ | 0.50 | | |
| 11* | 11.020 | 2.44 | 1.58313 | 59.38 |
| 12* | −53.044 | 0.10 | | |
| 13 | 9.183 | 2.40 | 1.80100 | 34.97 |
| 14 | 17.413 | 0.70 | 1.80518 | 25.42 |
| 15 | 6.265 | 1.80 | | |
| 16 | −40.899 | 0.70 | 1.69895 | 30.13 |
| 17 | 12.775 | 2.64 | 1.49700 | 81.61 |
| 18* | −10.249 | 0.50 | | |
| 19 | ∞ | 0.10 | 1.59000 | 30.00 |
| 20 | ∞ | Variable | | |
| 21* | 12.126 | 2.49 | 1.49700 | 81.54 |
| 22 | 63.255 | Variable | | |
| Image plane (Light receiving surface) | ∞ | | | |

| Aspherical surface data |
|---|

6th surface k = 0.000
A4 = 8.82324e−05, A6 = −3.16588e−06, A8 = 3.95523e−08,
A10 = −3.06841e−10
7th surface k = 0.000
A4 = −2.34654e−05, A6 = −3.40520e−06, A8 = 3.18367e−08,
A10 = −1.86747e−10
11th surface k = 0.000
A4 = −5.09661e−05, A6 = −4.13815e−08, A8 = −5.03716e−09
12th surface k = 0.000
A4 = 1.14214e−04, A6 = 8.07123e−08
18th surface k = 0.000
A4 = −8.26480e−06, A6 = 3.14590e−07, A8 = −8.73720e−08
21st surface k = 0.000
A4 = −2.99323e−05, A6 = 2.94977e−08

| Zoom data | | | |
|---|---|---|---|
| | Wide angle | Intermediate2 | Telephoto |
| Focal length | 6.05 | 12.70 | 23.46 |
| Fno. | 1.82 | 2.14 | 2.43 |
| Angle of field 2ω | 78.50 | 40.00 | 21.98 |
| fb (in air) | 7.37 | 9.00 | 8.30 |
| Lens total length (in air) | 60.49 | 57.99 | 65.85 |
| d3 | 0.30 | 7.62 | 16.02 |
| d9 | 21.11 | 6.50 | 1.10 |
| d20 | 2.36 | 5.53 | 11.09 |
| d22 | 7.37 | 9.00 | 8.30 |

| | Intermediate1 | Intermediate3 |
|---|---|---|
| Focal length | 8.21 | 18.73 |
| Fno. | 1.95 | 2.31 |
| Angle of field 2ω | 59.90 | 27.54 |
| fb (in air) | 8.13 | 9.21 |
| Lens total length(in air) | 57.26 | 62.17 |
| d3 | 2.82 | 12.89 |
| d9 | 13.63 | 2.44 |

-continued

| Unit mm | | |
|---|---|---|
| d20 | 3.33 | 8.27 |
| d22 | 8.13 | 9.21 |

| Unit focal length | | | |
|---|---|---|---|
| f1 = 50.47 | f2 = −11.67 | f3 = 16.15 | f4 = 29.71 |

Numerical Example 1

State in which, the Light-Amount Reducing Filter F is Retracted from the Optical Path In all the numerical examples given below, in the state in which, the light-amount reduction filter is retracted from the optical path, a position at which the light-amount reducing filter had been inserted is indicated as a virtual surface.

| Unit mm | | | | |
|---|---|---|---|---|
| Surface data | | | | |
| Surface no. | r | d | nd | vd |
| Object plane | ∞ | ∞ | | |
| 1 | 32.407 | 1.00 | 1.94595 | 17.98 |
| 2 | 24.711 | 3.71 | 1.81600 | 46.62 |
| 3 | 181.957 | Variable | | |
| 4 | 62.535 | 1.00 | 1.88300 | 40.76 |
| 5 | 8.539 | 4.99 | | |
| 6* | −35.795 | 0.80 | 1.58313 | 59.38 |
| 7* | 15.195 | 1.40 | | |
| 8 | 23.234 | 2.08 | 2.00069 | 25.46 |
| 9 | −202.836 | Variable | | |
| 10(stop) | ∞ | 0.50 | | |
| 11* | 11.020 | 2.44 | 1.58313 | 59.38 |
| 12* | −53.044 | 0.10 | | |
| 13 | 9.183 | 2.40 | 1.80100 | 34.97 |
| 14 | 17.413 | 0.70 | 1.80518 | 25.42 |
| 15 | 6.265 | 1.80 | | |
| 16 | −40.899 | 0.70 | 1.69895 | 30.13 |
| 17 | 12.775 | 2.64 | 1.49700 | 81.61 |
| 18* | −10.249 | 0.50 | | |
| 19 | ∞ | 0.10 | | |
| 20 | ∞ | Variable | | |
| 21* | 12.126 | 2.49 | 1.49700 | 81.54 |
| 22 | 63.255 | Variable | | |
| Image plane (Light receiving surface) | ∞ | | | |

| Aspherical surface data |
|---|

6th surface k = 0.000
A4 = 8.82324e−05, A6 = −3.16588e−06, A8 = 3.95523e−08,
A10 = −3.06841e−10
7th surface k = 0.000
A4 = −2.34654e−05, A6 = −3.40520e−06, A8 = 3.18367e−08,
A10 = −1.86747e−10
11th surface k = 0.000
A4 = −5.09661e−05, A6 = −4.13815e−08, A8 = −5.03716e−09
12th surface k = 0.000
A4 = 1.14214e−04, A6 = 8.07123e−08
18th surface k = 0.000
A4 = −8.26480e−06, A6 = 3.14590e−07, A8 = −8.73720e−08

-continued

Unit mm

21st surface k = 0.000
A4 = −2.99323e−05, A6 = 2.94977e−08

Zoom data

|  | Wide angle | Intermediate2 | Telephoto |
|---|---|---|---|
| Focal length | 6.06 | 12.72 | 23.50 |
| Fno. | 1.85 | 2.19 | 2.54 |
| Angle of field 2ω | 78.40 | 39.95 | 21.95 |
| fb (in air) | 7.33 | 8.97 | 8.27 |
| Lens total length(in air) | 60.49 | 57.99 | 65.85 |
| d3 | 0.30 | 7.62 | 16.02 |
| d9 | 21.11 | 6.50 | 1.10 |
| d20 | 2.40 | 5.55 | 11.12 |

|  | Intermediate1 | Intermediate3 |
|---|---|---|
| Focal length | 8.22 | 18.76 |
| Fno. | 1.97 | 2.39 |
| Angle of field 2ω | 59.82 | 27.50 |
| fb (in air) | 8.10 | 9.19 |
| Lens total length(in air) | 57.26 | 62.17 |
| d3 | 2.82 | 12.89 |
| d9 | 13.63 | 2.44 |
| d20 | 3.36 | 8.30 |
| d22 | 8.10 | 9.19 |

Unit focal length

| f1 = 50.47 | f2 = −11.67 | f3 = 16.15 | f4 = 29.71 |
|---|---|---|---|

Numerical Example 2

State in which, the Light-Amount Reducing Filter F is Disposed in the Optical Path Unit mm Surface data

| Surface no. | r | d | nd | νd |
|---|---|---|---|---|
| Object plane | ∞ | ∞ |  |  |
| 1 | 34.234 | 1.00 | 1.94595 | 17.98 |
| 2 | 26.431 | 3.40 | 1.81600 | 46.62 |
| 3 | 304.697 | Variable |  |  |
| 4 | 58.742 | 1.00 | 1.88300 | 40.76 |
| 5 | 8.027 | 4.28 |  |  |
| 6* | −37.316 | 1.00 | 1.69350 | 53.21 |
| 7* | 27.854 | 1.53 |  |  |
| 8 | 25.275 | 1.91 | 1.92286 | 20.88 |
| 9 | −1287.866 | Variable |  |  |
| 10(stop) | ∞ | 0.50 |  |  |
| 11* | 14.062 | 2.11 | 1.85135 | 40.10 |
| 12* | −229.434 | 0.17 |  |  |
| 13 | 8.396 | 2.43 | 1.58913 | 61.14 |
| 14 | 25.547 | 0.70 | 1.74077 | 27.79 |
| 15 | 6.543 | 1.66 |  |  |
| 16 | −45.415 | 0.70 | 1.76182 | 26.52 |
| 17 | 13.788 | 2.50 | 1.58313 | 59.38 |
| 18* | −12.682 | 0.50 |  |  |
| 19 | ∞ | 0.10 | 1.51000 | 57.00 |
| 20 | ∞ | Variable |  |  |
| 21* | 14.086 | 3.00 | 1.74320 | 49.34 |
| 22 | −61.445 | 0.80 | 1.69895 | 30.13 |
| 23 | 50.317 | Variable |  |  |
| Image plane (Light receiving surface) | ∞ |  |  |  |

-continued

Unit mm

Aspherical surface data

6th surface k = 0.000
A4 = 1.22305e−04, A6 = −3.78786e−06, A8 = 1.63670e−08,
A10 = −3.83663e−10

7th surface k = 0.000
A4 = 4.70833e−05, A6 = −3.49825e−06, A8 = −1.99464e−08,
A10 = 2.89545e−10

11th surface k = −0.862
A4 = 5.16574e−05, A6 = 1.85386e−07

12th surface k = 0.000
A4 = 9.42257e−05

18th surface k = 0.000
A4 = 1.62250e−05, A6 = 1.15230e−07

21st surface k = 0.000
A4 = −5.48767e−06

Zoom data

|  | Wide angle | Intermediate2 | Telephoto |
|---|---|---|---|
| Focal length | 6.05 | 12.72 | 23.46 |
| Fno. | 1.85 | 2.18 | 2.59 |
| Angle of field 2ω | 78.10 | 39.65 | 21.87 |
| fb (in air) | 5.44 | 7.37 | 7.17 |
| Lens total length(in air) | 59.89 | 59.47 | 68.50 |
| d3 | 0.48 | 7.72 | 14.78 |
| d9 | 19.49 | 6.24 | 1.19 |
| d20 | 5.18 | 8.84 | 16.06 |
| d23 | 5.44 | 7.37 | 7.17 |

|  | Intermediate1 | Intermediate3 |
|---|---|---|
| Focal length | 8.17 | 18.76 |
| Fno. | 1.97 | 2.42 |
| Angle of field 2ω | 59.70 | 27.47 |
| fb (in air) | 6.35 | 8.10 |
| Lens total length(in air) | 57.53 | 63.90 |
| d3 | 2.99 | 11.70 |
| d9 | 12.74 | 2.09 |
| d20 | 6.16 | 12.72 |
| d23 | 6.35 | 8.10 |

Unit focal length

| f1 = 49.36 | f2 = −10.76 | f3 = 15.93 | f4 = 24.31 |
|---|---|---|---|

Numerical Example 2

State in which, the Light-Amount Reducing Filter F is Retracted from the Optical Path Unit mm Surface data

| Surface no. | r | d | nd | νd |
|---|---|---|---|---|
| Object plane | ∞ | ∞ |  |  |
| 1 | 34.234 | 1.00 | 1.94595 | 17.98 |

-continued

| Unit mm | | | | |
|---|---|---|---|---|
| 2 | 26.431 | 3.40 | 1.81600 | 46.62 |
| 3 | 304.697 | Variable | | |
| 4 | 58.742 | 1.00 | 1.88300 | 40.76 |
| 5 | 8.027 | 4.28 | | |
| 6* | −37.316 | 1.00 | 1.69350 | 53.21 |
| 7* | 27.854 | 1.53 | | |
| 8 | 25.275 | 1.91 | 1.92286 | 20.88 |
| 9 | −1287.866 | Variable | | |
| 10(stop) | ∞ | 0.50 | | |
| 11* | 14.062 | 2.11 | 1.85135 | 40.10 |
| 12* | −229.434 | 0.17 | | |
| 13 | 8.396 | 2.43 | 1.58913 | 61.14 |
| 14 | 25.547 | 0.70 | 1.74077 | 27.79 |
| 15 | 6.543 | 1.66 | | |
| 16 | −45.415 | 0.70 | 1.76182 | 26.52 |
| 17 | 13.788 | 2.50 | 1.58313 | 59.38 |
| 18* | −12.682 | 0.50 | | |
| 19 | ∞ | 0.10 | | |
| 20 | ∞ | Variable | | |
| 21* | 14.086 | 3.00 | 1.74320 | 49.34 |
| 22 | −61.445 | 0.80 | 1.69895 | 30.13 |
| 23 | 50.317 | Variable | | |
| Image plane (Light receiving surface) | ∞ | | | |

Aspherical surface data

6th surface k = 0.000
A4 = 1.22305e−04, A6 = −3.78786e−06, A8 = 1.63670e−08,
A10 = −3.83663e−10

7th surface k = 0.000
A4 = 4.70833e−05, A6 = −3.49825e−06, A8 = −1.99464e−08,
A10 = 2.89545e−10

11th surface k = −0.862
A4 = 5.16574e−05, A6 = 1.85386e−07

12th surface k = 0.000
A4 = 9.42257e−05

18th surface k = 0.000
A4 = 1.62250e−05, A6 = 1.15230e−07

21st surface k = 0.000
A4 = −5.48767e−06

Zoom data

| | Wide angle | Intermediate 2 | Telephoto |
|---|---|---|---|
| Focal length | 6.06 | 12.73 | 23.49 |
| Fno. | 1.88 | 2.23 | 2.71 |
| Angle of field 2ω | 77.99 | 39.60 | 21.84 |
| fb (in air) | 5.41 | 7.35 | 7.15 |
| Lens total length (in air) | 59.89 | 59.47 | 68.50 |
| d3 | 0.48 | 7.72 | 14.78 |
| d9 | 19.49 | 6.24 | 1.19 |
| d20 | 5.21 | 8.86 | 16.08 |
| d23 | 5.41 | 7.35 | 7.15 |

| | Intermediate 1 | Intermediate 3 |
|---|---|---|
| Focal length | 8.18 | 18.78 |
| Fno. | 2.00 | 2.51 |
| Angle of field 2ω | 59.63 | 27.44 |
| fb (in air) | 6.33 | 8.09 |
| Lens total length (in air) | 57.53 | 63.90 |
| d3 | 2.99 | 11.70 |

-continued

| Unit mm | | |
|---|---|---|
| d9 | 12.74 | 2.09 |
| d20 | 6.18 | 12.74 |
| d23 | 6.33 | 8.09 |

| Unit focal length | | | |
|---|---|---|---|
| f1 = 49.36 | f2 = −10.76 | f3 = 15.93 | f4 = 24.31 |

Numerical Example 3

State in which, the Light-Amount Reducing Filter F is Disposed in the Optical Path

| Unit mm | | | | |
|---|---|---|---|---|
| Surface data | | | | |
| Surface no. | r | d | nd | νd |
| Object plane | ∞ | ∞ | | |
| 1 | 25.291 | 1.30 | 1.69350 | 53.21 |
| 2* | 11.457 | 4.65 | | |
| 3 | −91.230 | 1.20 | 1.88300 | 40.76 |
| 4 | 16.522 | 2.89 | | |
| 5 | 23.937 | 2.50 | 2.00069 | 25.46 |
| 6 | 156.171 | Variable | | |
| 7(stop) | ∞ | 0.34 | | |
| 8* | 14.471 | 2.02 | 1.74320 | 49.34 |
| 9* | 113.908 | 0.10 | | |
| 10 | 8.370 | 2.60 | 1.77250 | 49.60 |
| 11 | 16.442 | 0.80 | 1.78470 | 26.29 |
| 12 | 6.111 | 1.98 | | |
| 13 | −140.383 | 0.70 | 1.60342 | 38.03 |
| 14 | 14.170 | 2.39 | 1.51633 | 64.14 |
| 15* | −17.560 | 0.50 | | |
| 16 | ∞ | 0.10 | 1.59000 | 30.00 |
| 17 | ∞ | Variable | | |
| 18 | 26.031 | 2.90 | 1.72916 | 54.68 |
| 19 | −19.182 | 0.70 | 1.75520 | 27.51 |
| 20 | −109.567 | Variable | | |
| 21* | 30.351 | 1.50 | 1.58313 | 59.38 |
| 22 | 39.738 | Variable | | |
| Image plane (Light receiving surface) | ∞ | | | |

Aspherical surface data

2nd surface k = −1.146
A4 = 4.02045e−05, A6 = 2.51202e−07, A8 = −1.66040e−09,
A10 = −9.07767e−13

8th surface k = −0.729
A4 = 2.32080e−05, A6 = 3.54887e−07

9th surface k = 0.000
A4 = 4.51977e−05, A6 = 3.40776e−07

15th surface k = 0.000
A4 = 2.11001e−05, A6 = −1.23026e−06

21st surface k = 0.000
A4 = −1.27345e−04, A6 = 1.79933e−06

Unit mm

Zoom data

|  | Wide angle | Intermediate 2 | Telephoto |
|---|---|---|---|
| Focal length | 6.05 | 11.89 | 23.46 |
| Fno. | 1.83 | 2.31 | 3.54 |
| Angle of field 2ω | 78.78 | 43.03 | 22.07 |
| fb (in air) | 2.94 | 2.94 | 2.94 |
| Lens total length (in air) | 70.05 | 57.00 | 67.65 |
| d6 | 30.23 | 9.28 | 1.73 |
| d17 | 4.01 | 9.76 | 30.27 |
| d20 | 3.70 | 5.84 | 3.53 |
| d22 | 2.94 | 2.94 | 2.94 |

|  | Intermediate 1 | Intermediate 3 |
|---|---|---|
| Focal length | 8.49 | 16.68 |
| Fno. | 2.02 | 2.70 |
| Angle of field 2ω | 58.65 | 31.16 |
| fb (in air) | 2.94 | 2.94 |
| Lens total length (in air) | 60.31 | 58.19 |
| d6 | 17.55 | 2.94 |
| d17 | 5.73 | 15.39 |
| d20 | 4.91 | 7.75 |
| d22 | 2.94 | 2.94 |

Unit focal length

| f1 = −18.78 | f2 = 18.72 | f3 = 30.11 | f4 = 208.09 |
|---|---|---|---|

Numerical Example 3

State in which, the Light-Amount Reducing Filter F is Retracted from the Optical Path Unit mm Surface data

| Surface no. | r | d | nd | vd |
|---|---|---|---|---|
| Object plane | ∞ | ∞ |  |  |
| 1 | 25.291 | 1.30 | 1.69350 | 53.21 |
| 2* | 11.457 | 4.65 |  |  |
| 3 | −91.230 | 1.20 | 1.88300 | 40.76 |
| 4 | 16.522 | 2.89 |  |  |
| 5 | 23.937 | 2.50 | 2.00069 | 25.46 |
| 6 | 156.171 | Variable |  |  |
| 7(stop) | ∞ | 0.34 |  |  |
| 8* | 14.471 | 2.02 | 1.74320 | 49.34 |
| 9* | 113.908 | 0.10 |  |  |
| 10 | 8.370 | 2.60 | 1.77250 | 49.60 |
| 11 | 16.442 | 0.80 | 1.78470 | 26.29 |
| 12 | 6.111 | 1.98 |  |  |
| 13 | −140.383 | 0.70 | 1.60342 | 38.03 |
| 14 | 14.170 | 2.39 | 1.51633 | 64.14 |
| 15* | −17.560 | 0.50 |  |  |
| 16 | ∞ | 0.10 |  |  |
| 17 | ∞ | Variable |  |  |
| 18 | 26.031 | 2.90 | 1.72916 | 54.68 |
| 19 | −19.182 | 0.70 | 1.75520 | 27.51 |
| 20 | −109.567 | Variable |  |  |
| 21* | 30.351 | 1.50 | 1.58313 | 59.38 |
| 22 | 39.738 | Variable |  |  |
| Image plane (Light receiving surface) | ∞ |  |  |  |

Unit mm

Aspherical surface data

2nd surface k = −1.146
A4 = 4.02045e−05, A6 = 2.51202e−07, A8 = −1.66040e−09,
A10 = −9.07767e−13

8th surface k = −0.729
A4 = 2.32080e−05, A6 = 3.54887e−07

9th surface k = 0.000
A4 = 4.51977e−05, A6 = 3.40776e−07

15th surface k = 0.000
A4 = 2.11001e−05, A6 = −1.23026e−06

21st surface k = 0.000
A4 = −1.27345e−04, A6 = 1.79933e−06

Zoom data

|  | Wide angle | Intermediate 2 | Telephoto |
|---|---|---|---|
| Focal length | 6.06 | 11.90 | 23.50 |
| Fno. | 1.85 | 2.35 | 3.74 |
| Angle of field 2ω | 78.65 | 42.98 | 22.03 |
| fb (in air) | 2.94 | 2.94 | 2.94 |
| Lens total length (in air) | 70.05 | 57.00 | 67.65 |
| d6 | 30.23 | 9.28 | 1.73 |
| d17 | 4.04 | 9.78 | 30.31 |
| d20 | 3.66 | 5.82 | 3.50 |
| d22 | 2.94 | 2.94 | 2.94 |

|  | Intermediate 1 | Intermediate 3 |
|---|---|---|
| Focal length | 8.50 | 16.70 |
| Fno. | 2.04 | 2.76 |
| Angle of field 2ω | 58.58 | 31.13 |
| fb (in air) | 2.94 | 2.94 |
| Lens total length (in air) | 60.31 | 58.19 |
| d6 | 17.55 | 2.94 |
| d17 | 5.76 | 15.41 |
| d20 | 4.88 | 7.73 |
| d22 | 2.94 | 2.94 |

Unit focal length

| f1 = −18.78 | f2 = 18.72 | f3 = 30.11 | f4 = 208.09 |
|---|---|---|---|

Numerical Example 4

State in which, the Light-Amount Reducing Filter F is Disposed in the Optical Path Unit mm Surface data

| Surface no. | r | d | nd | vd |
|---|---|---|---|---|
| Object plane | ∞ | ∞ |  |  |
| 1* | −153.380 | 1.20 | 1.85135 | 40.10 |
| 2* | 10.688 | 6.20 |  |  |
| 3 | 25.676 | 1.97 | 1.94595 | 17.98 |
| 4 | 65.236 | Variable |  |  |
| 5(stop) | ∞ | 0.34 |  |  |

-continued

Unit mm

| | | | | |
|---|---|---|---|---|
| 6* | 19.232 | 2.01 | 1.74320 | 49.34 |
| 7* | −143.531 | 0.10 | | |
| 8 | 7.995 | 2.60 | 1.81600 | 46.62 |
| 9 | 13.368 | 0.86 | 1.80518 | 25.42 |
| 10 | 5.940 | 1.98 | | |
| 11 | −500.000 | 0.70 | 1.72151 | 29.23 |
| 12 | 13.109 | 2.50 | 1.51633 | 64.14 |
| 13* | −18.855 | 0.50 | | |
| 14 | ∞ | 0.10 | 1.51000 | 57.00 |
| 15 | ∞ | Variable | | |
| 16 | 27.081 | 2.90 | 1.72916 | 54.68 |
| 17 | −22.521 | 0.70 | 1.75520 | 27.51 |
| 18 | −85.481 | Variable | | |
| 19* | 42.501 | 1.50 | 1.58313 | 59.38 |
| 20 | 5293.592 | Variable | | |
| Image plane (Light receiving surface) | ∞ | | | |

Aspherical surface data

1st surface k = 0.000
A4 = 6.37238e−05, A6 = −6.54835e−07, A8 = 4.03157e−09,
A10 = −1.09254e−11

2nd surface k = −0.946
A4 = 5.66356e−05, A6 = −2.14616e−07

6th surface k = −1.084
A4 = −1.19254e−05, A6 = −5.23897e−07

7th surface k = 0.000
A4 = 1.80444e−06, A6 = −4.52219e−07

13th surface k = 0.000
A4 = 2.49051e−05, A6 = −8.13475e−07

19th surface k = 0.000
A4 = −9.38811e−05

Zoom data

| | Wide angle | Intermediate 2 | Telephoto |
|---|---|---|---|
| Focal length | 6.05 | 11.88 | 23.46 |
| Fno. | 1.83 | 2.36 | 3.60 |
| Angle of field 2ω | 79.55 | 43.09 | 21.99 |
| fb (in air) | 2.66 | 2.66 | 2.66 |
| Lens total length (in air) | 69.63 | 56.63 | 65.92 |
| d4 | 32.23 | 10.76 | 2.04 |
| d15 | 4.94 | 11.98 | 31.53 |
| d18 | 3.64 | 5.07 | 3.53 |
| d20 | 2.66 | 2.66 | 2.66 |

| | Intermediate 1 | Intermediate 3 |
|---|---|---|
| Focal length | 8.49 | 16.70 |
| Fno. | 2.04 | 2.75 |
| Angle of field 2ω | 59.01 | 31.06 |
| fb (in air) | 2.66 | 2.66 |
| Lens total length (in air) | 59.83 | 56.97 |
| d4 | 19.19 | 3.46 |
| d15 | 7.27 | 17.25 |
| d18 | 4.55 | 7.45 |
| d20 | 2.66 | 2.66 |

Unit focal length

| f1 = −19.36 | f2 = 19.39 | f3 = 29.27 | f4 = 73.47 |
|---|---|---|---|

Numerical Example 4

State in which, the Light-Amount Reducing Filter F is Retracted from the Optical Path Unit mm Surface data

| Surface no. | r | d | nd | νd |
|---|---|---|---|---|
| Object plane | ∞ | ∞ | | |
| 1* | −153.380 | 1.20 | 1.85135 | 40.10 |
| 2* | 10.688 | 6.20 | | |
| 3 | 25.676 | 1.97 | 1.94595 | 17.98 |
| 4 | 65.236 | Variable | | |
| 5(stop) | ∞ | 0.34 | | |
| 6* | 19.232 | 2.01 | 1.74320 | 49.34 |
| 7* | −143.531 | 0.10 | | |
| 8 | 7.995 | 2.60 | 1.81600 | 46.62 |
| 9 | 13.368 | 0.86 | 1.80518 | 25.42 |
| 10 | 5.940 | 1.98 | | |
| 11 | −500.000 | 0.70 | 1.72151 | 29.23 |
| 12 | 13.109 | 2.50 | 1.51633 | 64.14 |
| 13* | −18.855 | 0.50 | | |
| 14 | ∞ | 0.10 | | |
| 15 | ∞ | Variable | | |
| 16 | 27.081 | 2.90 | 1.72916 | 54.68 |
| 17 | −22.521 | 0.70 | 1.75520 | 27.51 |
| 18 | −85.481 | Variable | | |
| 19* | 42.501 | 1.50 | 1.58313 | 59.38 |
| 20 | 5293.592 | Variable | | |
| Image plane (Light receiving surface) | ∞ | | | |

Aspherical surface data

1st surface k = 0.000
A4 = 6.37238e−05, A6 = −6.54835e−07, A8 = 4.03157e−09,
A10 = −1.09254e−11

2nd surface k = −0.946
A4 = 5.66356e−05, A6 = −2.14616e−07

6th surface k = −1.084
A4 = −1.19254e−05, A6 = −5.23897e−07

7th surface k = 0.000
A4 = 1.80444e−06, A6 = −4.52219e−07

13th surface k = 0.000
A4 = 2.49051e−05, A6 = −8.13475e−07

19th surface k = 0.000
A4 = −9.38811e−05

Zoom data

| | Wide angle | Intermediate 2 | Telephoto |
|---|---|---|---|
| Focal length | 6.06 | 11.90 | 23.50 |
| Fno. | 1.85 | 2.40 | 3.77 |
| Angle of field 2ω | 79.43 | 43.03 | 21.95 |
| fb (in air) | 2.66 | 2.66 | 2.66 |
| Lens total length (in air) | 69.63 | 56.63 | 65.92 |
| d4 | 32.23 | 10.76 | 2.04 |
| d15 | 4.97 | 12.01 | 31.56 |
| d18 | 3.61 | 5.05 | 3.50 |
| d20 | 2.66 | 2.66 | 2.66 |

-continued

| Unit mm | | |
|---|---|---|
| | Intermediate 1 | Intermediate 3 |
| Focal length | 8.51 | 16.72 |
| Fno. | 2.06 | 2.79 |
| Angle of field 2ω | 58.93 | 31.03 |
| fb (in air) | 2.66 | 2.66 |
| Lens total length (in air) | 59.83 | 56.97 |
| d4 | 19.19 | 3.46 |
| d15 | 7.30 | 17.27 |
| d18 | 4.53 | 7.44 |
| d20 | 2.66 | 2.66 |

| Unit focal length | | | |
|---|---|---|---|
| f1 = −19.36 | f2 = 19.39 | f3 = 29.27 | f4 = 73.47 |

Numerical Example 5

State in which, the Light-Amount Reducing Filter F is Disposed in the Optical Path

| Unit mm | | | | |
|---|---|---|---|---|
| Surface data | | | | |
| Surface no. | r | d | nd | vd |
| Object plane | ∞ | ∞ | | |
| 1* | −282.325 | 1.20 | 1.85135 | 40.10 |
| 2* | 10.755 | 5.86 | | |
| 3 | 22.023 | 1.97 | 1.94595 | 17.98 |
| 4 | 43.142 | Variable | | |
| 5(stop) | ∞ | 0.34 | | |
| 6* | 25.472 | 1.94 | 1.74320 | 49.34 |
| 7* | −61.633 | 0.10 | | |
| 8 | 8.004 | 2.60 | 1.81600 | 46.62 |
| 9 | 13.838 | 0.72 | 1.76182 | 26.52 |
| 10 | 6.145 | 2.10 | | |
| 11 | −100.000 | 0.70 | 1.69895 | 30.13 |
| 12 | 13.741 | 2.50 | 1.51633 | 64.14 |
| 13* | −17.837 | 0.50 | | |
| 14 | ∞ | 0.07 | 1.59000 | 30.00 |
| 15 | ∞ | Variable | | |
| 16 | 28.330 | 2.90 | 1.72916 | 54.68 |
| 17 | −18.314 | 0.70 | 1.75520 | 27.51 |
| 18 | −77.317 | Variable | | |
| 19* | 25.780 | 1.50 | 1.58313 | 59.38 |
| 20 | 69.992 | Variable | | |
| Image plane (Light receiving surface) | ∞ | | | |

Aspherical surface data

1st surface k = 0.000
A4 = 6.30751e−05, A6 = −4.90264e−07, A8 = 2.49616e−09,
A10 = −5.98519e−12
2nd surface k = −0.866
A4 = 6.88861e−05, A6 = −1.04386e−07
6th surface k = −3.859
A4 = −2.73265e−05, A6 = −1.72763e−06
7th surface k = 0.000
A4 = −2.68318e−05, A6 = −1.58231e−06

-continued

| Unit mm |
|---|
| 13th surface | k = 0.000
A4 = 3.51920e−05, A6 = 6.27719e−07
19th surface k = 0.000
A4 = −6.43919e−05

| Zoom data | | | |
|---|---|---|---|
| | Wide angle | Intermediate 2 | Telephoto |
| Focal length | 6.05 | 11.89 | 23.47 |
| Fno. | 1.83 | 2.35 | 3.57 |
| Angle of field 2ω | 79.36 | 43.20 | 22.02 |
| fb (in air) | 2.82 | 2.82 | 2.82 |
| Lens total length (in air) | 69.70 | 56.93 | 66.56 |
| d4 | 32.32 | 10.98 | 2.33 |
| d15 | 5.32 | 12.40 | 32.18 |
| d18 | 3.53 | 5.02 | 3.52 |
| d20 | 2.82 | 2.82 | 2.82 |

| | Intermediate 1 | Intermediate 3 |
|---|---|---|
| Focal length | 8.50 | 16.69 |
| Fno. | 2.04 | 2.73 |
| Angle of field 2ω | 59.21 | 31.13 |
| fb (in air) | 2.82 | 2.82 |
| Lens total length (in air) | 60.02 | 57.40 |
| d4 | 19.36 | 3.75 |
| d15 | 7.65 | 17.65 |
| d18 | 4.48 | 7.48 |
| d20 | 2.82 | 2.82 |

| Unit focal length | | | |
|---|---|---|---|
| f1 = −19.40 | f2 = 19.42 | f3 = 29.74 | f4 = 69.13 |

Numerical Example 5

State in which, the Light-Amount Reducing Filter F is Retracted from the Optical Path

| Unit mm | | | | |
|---|---|---|---|---|
| Surface data | | | | |
| Surface no. | r | d | nd | vd |
| Object plane | ∞ | ∞ | | |
| 1* | −282.325 | 1.20 | 1.85135 | 40.10 |
| 2* | 10.755 | 5.86 | | |
| 3 | 22.023 | 1.97 | 1.94595 | 17.98 |
| 4 | 43.142 | Variable | | |
| 5(stop) | ∞ | 0.34 | | |
| 6* | 25.472 | 1.94 | 1.74320 | 49.34 |
| 7* | −61.633 | 0.10 | | |
| 8 | 8.004 | 2.60 | 1.81600 | 46.62 |
| 9 | 13.838 | 0.72 | 1.76182 | 26.52 |
| 10 | 6.145 | 2.10 | | |
| 11 | −100.000 | 0.70 | 1.69895 | 30.13 |
| 12 | 13.741 | 2.50 | 1.51633 | 64.14 |
| 13* | −17.837 | 0.50 | | |
| 14 | ∞ | 0.07 | | |
| 15 | ∞ | Variable | | |
| 16 | 28.330 | 2.90 | 1.72916 | 54.68 |
| 17 | −18.314 | 0.70 | 1.75520 | 27.51 |
| 18 | −77.317 | Variable | | |

-continued

Unit mm

| | | | | |
|---|---|---|---|---|
| 19* | 25.780 | 1.50 | 1.58313 | 59.38 |
| 20 | 69.992 | Variable | | |
| Image plane (Light receiving surface) | ∞ | | | |

Aspherical surface data

1st surface k = 0.000
A4 = 6.30751e−05, A6 = −4.90264e−07, A8 = 2.49616e−09,
A10 = −5.98519e−12

2nd surface k = −0.866
A4 = 6.88861e−05, A6 = −1.04386e−07

6th surface k = −3.859
A4 = −2.73265e−05, A6 = −1.72763e−06

7th surface k = 0.000
A4 = −2.68318e−05, A6 = −1.58231e−06

13th surface k = 0.000
A4 = 3.51920e−05, A6 = 6.27719e−07

19th surface k = 0.000
A4 = −6.43919e−05

Zoom data

| | Wide angle | Intermediate 2 | Telephoto |
|---|---|---|---|
| Focal length | 6.06 | 11.90 | 23.50 |
| Fno. | 1.85 | 2.39 | 3.74 |
| Angle of field 2ω | 79.28 | 43.16 | 21.99 |
| fb (in air) | 2.82 | 2.82 | 2.82 |
| Lens total length (in air) | 69.70 | 56.93 | 66.56 |
| d4 | 32.32 | 10.98 | 2.33 |
| d15 | 5.35 | 12.41 | 32.21 |
| d18 | 3.51 | 5.01 | 3.50 |
| d20 | 2.82 | 2.82 | 2.82 |

| | Intermediate 1 | Intermediate 3 |
|---|---|---|
| Focal length | 8.51 | 16.70 |
| Fno. | 2.06 | 2.77 |
| Angle of field 2ω | 59.15 | 31.10 |
| fb (in air) | 2.82 | 2.82 |
| Lens total length (in air) | 60.02 | 57.40 |
| d4 | 19.36 | 3.75 |
| d15 | 7.67 | 17.66 |
| d18 | 4.46 | 7.46 |
| d20 | 2.82 | 2.82 |

Unit focal length

| | | | |
|---|---|---|---|
| f1 = −19.40 | f2 = 19.42 | f3 = 29.74 | f4 = 69.13 |

Numerical Example 6

State in which, the Light-Amount Reducing Filter F is Disposed in the Optical Path Unit mm Surface data

| Surface no. | r | d | nd | νd |
|---|---|---|---|---|
| Object plane | ∞ | ∞ | | |
| 1 | 24.314 | 1.30 | 1.58313 | 59.38 |
| 2* | 12.150 | 4.68 | | |
| 3 | −64.321 | 1.20 | 1.81600 | 46.62 |
| 4 | 13.543 | 3.20 | | |
| 5 | 22.750 | 2.51 | 2.00069 | 25.46 |
| 6 | 111.688 | Variable | | |
| 7 (stop) | ∞ | 0.34 | | |
| 8* | 16.371 | 2.09 | 1.74320 | 49.34 |
| 9* | −298.832 | 0.10 | | |
| 10 | 7.995 | 2.66 | 1.73400 | 51.47 |
| 11 | 15.184 | 0.80 | 1.76182 | 26.52 |
| 12 | 5.954 | 2.05 | | |
| 13 | −100.000 | 0.70 | 1.69895 | 30.13 |
| 14 | 15.876 | 2.48 | 1.51633 | 64.14 |
| 15* | −15.347 | 0.50 | | |
| 16 | ∞ | 0.10 | 1.58500 | 30.00 |
| 17 | ∞ | Variable | | |
| 18 | 18.758 | 2.02 | 1.48749 | 70.23 |
| 19 | −478.198 | Variable | | |
| 20* | 38.098 | 1.50 | 1.58313 | 59.38 |
| 21 | 484.097 | Variable | | |
| Image plane (Light receiving surface) | ∞ | | | |

Aspherical surface data

2nd surface k = −1.739
A4 = 5.40475e−05, A6 = −4.01176e−08, A8 = −2.19141e−09,
A10 = −1.10922e−11

8th surface k = −0.988
A4 = 8.30299e−06, A6 = 8.04417e−07

9th surface k = 0.000
A4 = 2.97081e−05, A6 = 8.68368e−07

15th surface k = 0.000
A4 = 2.34582e−05, A6 = −6.75547e−07

20th surface k = 0.000
A4 = −1.60966e−04, A6 = 2.52705e−06

Zoom data

| | Wide angle | Intermediate 2 | Telephoto |
|---|---|---|---|
| Focal length | 6.05 | 11.88 | 23.46 |
| Fno. | 1.83 | 2.34 | 3.51 |
| Angle of field 2ω | 78.83 | 42.85 | 22.01 |
| fb (in air) | 2.68 | 2.68 | 2.68 |
| Lens total length (in air) | 70.12 | 56.99 | 64.56 |
| d6 | 30.94 | 10.33 | 1.86 |
| d17 | 4.14 | 9.90 | 28.22 |
| d19 | 4.12 | 5.84 | 3.55 |
| d21 | 2.68 | 2.68 | 2.68 |

-continued

Unit mm

|  | Intermediate 1 | Intermediate 3 |
|---|---|---|
| Focal length | 8.48 | 16.66 |
| Fno. | 2.04 | 2.75 |
| Angle of field 2ω | 58.53 | 31.08 |
| fb (in air) | 2.68 | 2.68 |
| Lens total length (in air) | 60.66 | 57.39 |
| d6 | 18.60 | 4.06 |
| d17 | 6.01 | 14.91 |
| d19 | 5.14 | 7.51 |
| d21 | 2.68 | 2.68 |

Unit focal length

| f1 = −18.61 | f2 = 18.04 | f3 = 37.08 | f4 = 70.83 |
|---|---|---|---|

Numerical Example 6

State in which, the Light-Amount Reducing Filter F is Retracted from the Optical Path Unit mm Surface data

| Surface no. | r | d | nd | vd |
|---|---|---|---|---|
| Object plane | ∞ | ∞ | | |
| 1 | 24.314 | 1.30 | 1.58313 | 59.38 |
| 2* | 12.150 | 4.68 | | |
| 3 | −64.321 | 1.20 | 1.81600 | 46.62 |
| 4 | 13.543 | 3.20 | | |
| 5 | 22.750 | 2.51 | 2.00069 | 25.46 |
| 6 | 111.688 | Variable | | |
| 7 (stop) | ∞ | 0.34 | | |
| 8* | 16.371 | 2.09 | 1.74320 | 49.34 |
| 9* | −298.832 | 0.10 | | |
| 10 | 7.995 | 2.66 | 1.73400 | 51.47 |
| 11 | 15.184 | 0.80 | 1.76182 | 26.52 |
| 12 | 5.954 | 2.05 | | |
| 13 | −100.000 | 0.70 | 1.69895 | 30.13 |
| 14 | 15.876 | 2.48 | 1.51633 | 64.14 |
| 15* | −15.347 | 0.50 | | |
| 16 | ∞ | 0.10 | | |
| 17 | ∞ | Variable | | |
| 18 | 18.758 | 2.02 | 1.48749 | 70.23 |
| 19 | −478.198 | Variable | | |
| 20* | 38.098 | 1.50 | 1.58313 | 59.38 |
| 21 | 484.097 | Variable | | |
| Image plane (Light receiving surface) | ∞ | | | |

Aspherical surface data

2nd surface k = −1.739
A4 = 5.40475e−05, A6 = −4.01176e−08, A8 = −2.19141e−09,
A10 = −1.10922e−11
8th surface k = −0.988
A4 = 8.30299e−06, A6 = 8.04417e−07
9th surface k = 0.000
A4 = 2.97081e−05, A6 = 8.68368e−07
15th surface k = 0.000
A4 = 2.34582e−05, A6 = −6.75547e−07

-continued

Unit mm

20th surface k = 0.000
A4 = −1.60966e−04, A6 = 2.52705e−06

Zoom data

|  | Wide angle | Intermediate 2 | Telephoto |
|---|---|---|---|
| Focal length | 6.06 | 11.90 | 23.50 |
| Fno. | 1.85 | 2.37 | 3.69 |
| Angle of field 2ω | 78.70 | 42.79 | 21.97 |
| fb (in air) | 2.68 | 2.68 | 2.68 |
| Lens total length (in air) | 70.12 | 56.99 | 64.56 |
| d6 | 30.94 | 10.33 | 1.86 |
| d17 | 4.19 | 9.94 | 28.27 |
| d19 | 4.07 | 5.80 | 3.50 |
| d21 | 2.68 | 2.68 | 2.68 |

|  | Intermediate 1 | Intermediate 3 |
|---|---|---|
| Focal length | 8.49 | 16.68 |
| Fno. | 2.05 | 2.80 |
| Angle of field 2ω | 58.45 | 31.04 |
| fb (in air) | 2.68 | 2.68 |
| Lens total length (in air) | 60.66 | 57.39 |
| d6 | 18.60 | 4.06 |
| d17 | 6.05 | 14.94 |
| d19 | 5.10 | 7.48 |
| d21 | 2.68 | 2.68 |

Unit focal length

| f1 = −18.61 | f2 = 18.04 | f3 = 37.08 | f4 = 70.83 |
|---|---|---|---|

Numerical Example 7

State in which, the Light-Amount Reducing Filter F is Disposed in the Optical Path Unit mm Surface data

| Surface no. | r | d | nd | vd |
|---|---|---|---|---|
| Object plane | ∞ | ∞ | | |
| 1 | 24.308 | 1.30 | 1.58313 | 59.38 |
| 2* | 12.456 | 4.68 | | |
| 3 | −73.175 | 1.20 | 1.81600 | 46.62 |
| 4 | 12.817 | 2.87 | | |
| 5 | 19.872 | 2.63 | 2.00069 | 25.46 |
| 6 | 70.108 | Variable | | |
| 7 (stop) | ∞ | 0.34 | | |
| 8* | 15.669 | 1.99 | 1.74320 | 49.34 |
| 9* | 336.460 | 0.10 | | |
| 10 | 8.306 | 2.54 | 1.73400 | 51.47 |
| 11 | 16.309 | 0.80 | 1.76182 | 26.52 |
| 12 | 6.314 | 2.02 | | |
| 13 | −100.000 | 0.70 | 1.69895 | 30.13 |
| 14 | 19.390 | 2.50 | 1.51633 | 64.14 |
| 15* | −14.108 | 0.32 | | |
| 16 | ∞ | 0.10 | 1.59000 | 30.00 |
| 17 | ∞ | Variable | | |
| 18 | 18.851 | 2.70 | 1.48749 | 70.23 |
| 19 | −36.406 | Variable | | |
| 20* | −38.875 | 1.00 | 1.58313 | 59.38 |
| 21 | ∞ | Variable | | |
| Image plane (Light receiving surface) | ∞ | | | |

-continued

Unit mm

Aspherical surface data

2nd surface k = −1.898
A4 = 4.94412e−05, A6 = 5.12783e−08, A8 = −3.52831e−09,
A10 = −2.63880e−12
8th surface k = −0.869
A4 = 1.24216e−05, A6 = 1.18371e−06
9th surface k = 0.000
A4 = 4.55665e−05, A6 = 1.32355e−06
15th surface k = 0.000
A4 = 2.41865e−05, A6 = −8.36542e−07
20th surface k = 0.000
A4 = −1.81199e−04, A6 = 2.47633e−06

Zoom data

|  | Wide angle | Intermediate 2 | Telephoto |
| --- | --- | --- | --- |
| Focal length | 6.05 | 11.88 | 23.45 |
| Fno. | 1.85 | 2.32 | 3.65 |
| Angle of field 2ω | 78.81 | 42.95 | 22.03 |
| fb (in air) | 2.65 | 2.65 | 2.64 |
| Lens total length (in air) | 69.68 | 56.02 | 64.50 |
| d6 | 30.78 | 9.72 | 2.00 |
| d17 | 4.50 | 10.25 | 28.52 |
| d19 | 3.95 | 5.60 | 3.53 |
| d21 | 2.65 | 2.65 | 2.64 |

|  | Intermediate 1 | Intermediate 3 |
| --- | --- | --- |
| Focal length | 8.48 | 16.67 |
| Fno. | 2.03 | 2.70 |
| Angle of field 2ω | 58.63 | 31.16 |
| fb (in air) | 2.65 | 2.65 |
| Lens total length (in air) | 59.93 | 56.53 |
| d6 | 18.19 | 3.25 |
| d17 | 6.47 | 15.64 |
| d19 | 4.82 | 7.20 |
| d21 | 2.65 | 2.65 |

Unit focal length

| f1 = −18.42 | f2 = 18.01 | f3 = 25.89 | f4 = −66.67 |

Numerical Example 7

State in which, the Light-Amount Reducing Filter F is Retracted from the Optical Path Unit mm Surface data

| Surface no. | r | d | nd | vd |
| --- | --- | --- | --- | --- |
| Object plane | ∞ | ∞ |  |  |
| 1 | 24.308 | 1.30 | 1.58313 | 59.38 |
| 2* | 12.456 | 4.68 |  |  |
| 3 | −73.175 | 1.20 | 1.81600 | 46.62 |
| 4 | 12.817 | 2.87 |  |  |
| 5 | 19.872 | 2.63 | 2.00069 | 25.46 |
| 6 | 70.108 | Variable |  |  |
| 7 (stop) | ∞ | 0.34 |  |  |
| 8* | 15.669 | 1.99 | 1.74320 | 49.34 |
| 9* | 336.460 | 0.10 |  |  |
| 10 | 8.306 | 2.54 | 1.73400 | 51.47 |
| 11 | 16.309 | 0.80 | 1.76182 | 26.52 |
| 12 | 6.314 | 2.02 |  |  |
| 13 | −100.000 | 0.70 | 1.69895 | 30.13 |
| 14 | 19.390 | 2.50 | 1.51633 | 64.14 |
| 15* | −14.108 | 0.32 |  |  |
| 16 | ∞ | 0.10 |  |  |
| 17 | ∞ | Variable |  |  |
| 18 | 18.851 | 2.70 | 1.48749 | 70.23 |
| 19 | −36.406 | Variable |  |  |
| 20* | −38.875 | 1.00 | 1.58313 | 59.38 |
| 21 | ∞ | Variable |  |  |
| Image plane (Light receiving surface) | ∞ |  |  |  |

Aspherical surface data

2nd surface k = −1.898
A4 = 4.94412e−05, A6 = 5.12783e−08, A8 = −3.52831e−09,
A10 = −2.63880e−12
8th surface k = −0.869
A4 = 1.24216e−05, A6 = 1.18371e−06
9th surface k = 0.000
A4 = 4.55665e−05, A6 = 1.32355e−06
15th surface k = 0.000
A4 = 2.41865e−05, A6 = −8.36542e−07
20th surface k = 0.000
A4 = −1.81199e−04, A6 = 2.47633e−06

Zoom data

|  | Wide angle | Intermediate 2 | Telephoto |
| --- | --- | --- | --- |
| Focal length | 6.06 | 11.90 | 23.50 |
| Fno. | 1.85 | 2.32 | 3.64 |
| Angle of field 2ω | 78.68 | 42.89 | 21.98 |
| fb (in air) | 2.65 | 2.65 | 2.64 |
| Lens total length (in air) | 69.68 | 56.02 | 64.50 |
| d6 | 30.78 | 9.72 | 2.00 |
| d17 | 4.54 | 10.27 | 28.55 |
| d19 | 3.92 | 5.58 | 3.50 |
| d21 | 2.65 | 2.65 | 2.64 |

|  | Intermediate 1 | Intermediate 3 |
| --- | --- | --- |
| Focal length | 8.49 | 16.69 |
| Fno. | 2.03 | 2.69 |
| Angle of field 2ω | 58.54 | 31.13 |
| fb (in air) | 2.65 | 2.65 |
| Lens total length (in air) | 59.93 | 56.53 |
| d6 | 18.19 | 3.25 |
| d17 | 6.49 | 15.65 |
| d19 | 4.79 | 7.18 |
| d21 | 2.65 | 2.65 |

Unit focal length

| f1 = −18.42 | f2 = 18.01 | f3 = 25.89 | f4 = −66.67 |

Numerical Example 8

State in which, the Light-Amount Reducing Filter F is Disposed in the Optical Path Unit mm Surface data

| Surface no. | r | d | nd | vd |
|---|---|---|---|---|
| Object plane | ∞ | ∞ | | |
| 1 | 34.112 | 1.30 | 1.58313 | 59.38 |
| 2* | 12.368 | 3.95 | | |
| 3 | 286.673 | 1.20 | 1.81600 | 46.62 |
| 4 | 12.508 | 3.05 | | |
| 5 | 18.860 | 2.54 | 2.00069 | 25.46 |
| 6 | 49.543 | Variable | | |
| 7 (stop) | ∞ | 0.34 | | |
| 8* | 14.246 | 2.08 | 1.74320 | 49.34 |
| 9* | 110.904 | 0.10 | | |
| 10 | 8.707 | 2.65 | 1.73400 | 51.47 |
| 11 | 20.338 | 0.80 | 1.76182 | 26.52 |
| 12 | 6.410 | 2.05 | | |
| 13 | −100.000 | 0.70 | 1.69895 | 30.13 |
| 14 | 27.183 | 2.47 | 1.51633 | 64.14 |
| 15* | −13.747 | 0.50 | | |
| 16 | ∞ | 0.10 | 1.59000 | 30.00 |
| 17 | ∞ | Variable | | |
| 18* | 18.255 | 2.02 | 1.48749 | 70.23 |
| 19 | −964.851 | Variable | | |
| Image plane (Light receiving surface) | ∞ | | | |

Aspherical surface data

2nd surface $k = -1.932$
$A4 = 5.68534e-05, A6 = 1.77166e-07, A8 = -5.32735e-09,$
$A10 = 1.25988e-11$ 8th surface $k = -0.653$
$A4 = 3.98657e-05, A6 = 1.08666e-06$ 9th surface $k = 0.000$
$A4 = 8.14027e-05, A6 = 1.11740e-06$ 15th surface $k = 0.000$
$A4 = 1.52141e-05, A6 = -7.78466e-07$ 18th surface $k = 0.000$
$A4 = -1.29499e-05, A6 = 2.77388e-07$ Zoom data

| | Wide angle | Intermediate 2 | Telephoto |
|---|---|---|---|
| Focal length | 6.05 | 11.88 | 23.45 |
| Fno. | 1.83 | 2.29 | 3.35 |
| Angle of field 2ω | 78.72 | 43.45 | 22.34 |
| fb (in air) | 8.00 | 9.37 | 6.41 |
| Lens total length (in air) | 70.52 | 55.99 | 61.89 |
| d6 | 32.62 | 11.03 | 2.22 |
| d17 | 4.05 | 9.74 | 27.42 |
| d19 | 8.00 | 9.37 | 6.41 |

| | Intermediate 1 | Intermediate 3 |
|---|---|---|
| Focal length | 8.49 | 16.68 |
| Fno. | 2.01 | 2.66 |
| Angle of field 2ω | 59.20 | 31.49 |
| fb (in air) | 8.86 | 10.75 |
| Lens total length (in air) | 60.32 | 55.63 |
| d6 | 19.68 | 4.45 |
| d17 | 5.93 | 14.58 |
| d19 | 8.86 | 10.75 |

Unit focal length

| f1 = −18.82 | f2 = 18.01 | f3 = 36.78 |
|---|---|---|

Numerical Example 8

State in which, the Light-Amount Reducing Filter F is Retracted from the Optical Path Unit mm Surface data

| Surface no. | r | d | nd | vd |
|---|---|---|---|---|
| Object plane | ∞ | ∞ | | |
| 1 | 34.112 | 1.30 | 1.58313 | 59.38 |
| 2* | 12.368 | 3.95 | | |
| 3 | 286.673 | 1.20 | 1.81600 | 46.62 |
| 4 | 12.508 | 3.05 | | |
| 5 | 18.860 | 2.54 | 2.00069 | 25.46 |
| 6 | 49.543 | Variable | | |
| 7 (stop) | ∞ | 0.34 | | |
| 8* | 14.246 | 2.08 | 1.74320 | 49.34 |
| 9* | 110.904 | 0.10 | | |
| 10 | 8.707 | 2.65 | 1.73400 | 51.47 |
| 11 | 20.338 | 0.80 | 1.76182 | 26.52 |
| 12 | 6.410 | 2.05 | | |
| 13 | −100.000 | 0.70 | 1.69895 | 30.13 |
| 14 | 27.183 | 2.47 | 1.51633 | 64.14 |
| 15* | −13.747 | 0.50 | | |
| 16 | ∞ | 0.10 | | |
| 17 | ∞ | Variable | | |
| 18* | 18.255 | 2.02 | 1.48749 | 70.23 |
| 19 | −964.851 | Variable | | |
| Image plane (Light receiving surface) | ∞ | | | |

Aspherical surface data

2nd surface $k = -1.932$
$A4 = 5.68534e-05, A6 = 1.77166e-07, A8 = -5.32735e-09,$
$A10 = 1.25988e-11$ 8th surface $k = -0.653$
$A4 = 3.98657e-05, A6 = 1.08666e-06$ 9th surface $k = 0.000$
$A4 = 8.14027e-05, A6 = 1.11740e-06$ 15th surface $k = 0.000$
$A4 = 1.52141e-05, A6 = -7.78466e-07$ 18th surface $k = 0.000$
$A4 = -1.29499e-05, A6 = 2.77388e-07$ -continued Unit mm Zoom data

|  | Wide angle | Intermediate 2 | Telephoto |
|---|---|---|---|
| Focal length | 6.06 | 11.90 | 23.50 |
| Fno. | 1.85 | 2.34 | 3.60 |
| Angle of field 2ω | 78.60 | 43.38 | 22.29 |
| fb (in air) | 7.95 | 9.34 | 6.35 |
| Lens total length (in air) | 70.52 | 55.99 | 61.89 |
| d6 | 32.62 | 11.03 | 2.22 |
| d17 | 4.10 | 9.78 | 27.48 |
| d19 | 7.95 | 9.34 | 6.35 |

|  | Intermediate 1 | Intermediate 3 |
|---|---|---|
| Focal length | 8.50 | 16.70 |
| Fno. | 2.04 | 2.74 |
| Angle of field 2ω | 59.11 | 31.45 |
| fb (in air) | 8.82 | 10.72 |
| Lens total length (in air) | 60.32 | 55.63 |
| d6 | 19.68 | 4.45 |
| d17 | 5.97 | 14.61 |
| d19 | 8.82 | 10.72 |

Unit focal length

| f1 = −18.82 | f2 = 18.01 | f3 = 36.78 |
|---|---|---|

Aberration diagrams at the time of infinite object point focusing of the embodiments from the first embodiment to the eighth embodiment are shown in FIG. 9A to FIG. 24L respectively. In the diagrams, 'ω' denotes a half angle of field.

FIG. 9A, FIG. 9B, FIG. 9C, and FIG. 9D show a spherical aberration (SA), an astigmatism (AS), a distortion (DT), and a chromatic aberration of magnification (CC) respectively, at a wide angle end in a state in which, the light-amount reducing filter F is disposed in the optical path in the first embodiment.

FIG. 9E, FIG. 9F, FIG. 9G, and FIG. 9H show a spherical aberration (SA), an astigmatism (AS), a distortion (DT), and a chromatic aberration of magnification (CC) respectively, at an intermediate focal length state in the state in which, the light-amount reducing filter F is disposed in the optical path in the first embodiment.

FIG. 9I, FIG. 9J, FIG. 9K, and FIG. 9L show a spherical aberration (SA), an astigmatism (AS), a distortion (DT), and a chromatic aberration of magnification (CC) respectively, at a telephoto end in a state in which, the light-amount reducing filter F is disposed in the optical path in the first embodiment.

FIG. 10A, FIG. 10B, FIG. 100C, and FIG. 10D show a spherical aberration (SA), an astigmatism (AS), a distortion (DT), and a chromatic aberration of magnification (CC) at the wide angle end in a state in which, the light-amount reducing filter F is retracted from the optical path in the first embodiment.

FIG. 10E, FIG. 10F, FIG. 10G, and FIG. 10H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the first embodiment.

FIG. 10I, FIG. 10J, FIG. 10K, and FIG. 10L show a spherical aberration (SA), an astigmatism (AS), a distortion (DT), and a chromatic aberration of magnification (CC) respectively at the telephoto end in the state in which, the light-amount reducing filter F is retracted from the optical path in the first embodiment.

FIG. 11A, FIG. 11B, FIG. 11C, and FIG. 11E show a spherical aberration (SA), an astigmatism (AS), a distortion (DT), and a chromatic aberration of magnification (CC) respectively, at a wide angle end in a state in which, the light-amount reducing filter F is disposed in the optical path in the second embodiment.

FIG. 11E, FIG. 11F, FIG. 11G, and FIG. 11H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the second embodiment.

FIG. 11I, FIG. 11J, FIG. 11K, and FIG. 11L show a spherical aberration (SA), an astigmatism (AS), a distortion (DT), and a chromatic aberration of magnification (CC) respectively, at a telephoto end in a state in which, the light-amount reducing filter F is disposed in the optical path in the second embodiment.

FIG. 12A, FIG. 12B, FIG. 12C, and FIG. 12D show a spherical aberration (SA), an astigmatism (AS), a distortion (DT), and a chromatic aberration of magnification (CC) at the wide angle end in a state in which, the light-amount reducing filter F is retracted from the optical path in the second embodiment.

FIG. 12E, FIG. 12F, FIG. 12G, and FIG. 12H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the second embodiment.

FIG. 12I, FIG. 12J, FIG. 12K, and FIG. 12L show a spherical aberration (SA), an astigmatism (AS), a distortion (DT), and a chromatic aberration of magnification (CC) respectively, at the telephoto end in the state in which, the light-amount reducing filter F is retracted from the optical path in the second embodiment.

FIG. 13A, FIG. 13B, FIG. 13C, and FIG. 13E show a spherical aberration (SA), an astigmatism (AS), a distortion (DT), and a chromatic aberration of magnification (CC) respectively, at a wide angle end in a state in which, the light-amount reducing filter F is disposed in the optical path in the third embodiment.

FIG. 13E, FIG. 13F, FIG. 13G, and FIG. 13H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the second embodiment.

FIG. 13I, FIG. 13J, FIG. 13K, and FIG. 13L show a spherical aberration (SA), an astigmatism (AS), a distortion (DT), and a chromatic aberration of magnification (CC) respectively, at a telephoto end in a state in which, the light-amount reducing filter F is disposed in the optical path in the third embodiment.

FIG. 14A, FIG. 14B, FIG. 14C, and FIG. 14D show a spherical aberration (SA), an astigmatism (AS), a distortion (DT), and a chromatic aberration of magnification (CC) at the wide angle end in a state in which, the light-amount reducing filter F is retracted from the optical path in the third embodiment.

FIG. 14E, FIG. 14F, FIG. 14G, and FIG. 14H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the third embodiment.

FIG. 14I, FIG. 14J, FIG. 14K, and FIG. 14L show a spherical aberration (SA), an astigmatism (AS), a distortion (DT), and a chromatic aberration of magnification (CC) respectively at the telephoto end in the state in which, the light-amount reducing filter F is retracted from the optical path in the third embodiment.

FIG. 15A, FIG. 15B, FIG. 15C, and FIG. 15D show a spherical aberration (SA), an astigmatism (AS), a distortion (DT), and a chromatic aberration of magnification (CC) respectively, at a wide angle end in a state in which, the light-amount reducing filter F is disposed in the optical path in the fourth embodiment.

FIG. 15E, FIG. 15F, FIG. 15G, and FIG. 15H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the fourth embodiment.

FIG. 15I, FIG. 15J, FIG. 15K, and FIG. 15L show a spherical aberration (SA), an astigmatism (AS), a distortion (DT), and a chromatic aberration of magnification (CC) respectively, at a telephoto end in a state in which, the light-amount reducing filter F is disposed in the optical path in the fourth embodiment.

FIG. 16A, FIG. 16B, FIG. 16C, and FIG. 16D show a spherical aberration (SA), an astigmatism (AS), a distortion (DT), and a chromatic aberration of magnification (CC) at the wide angle end in a state in which, the light-amount reducing filter F is retracted from the optical path in the fourth embodiment.

FIG. 16E, FIG. 16F, FIG. 16G, and FIG. 16H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the fourth embodiment.

FIG. 16I, FIG. 16J, FIG. 16K, and FIG. 16L show a spherical aberration (SA), an astigmatism (AS), a distortion (DT), and a chromatic aberration of magnification (CC) respectively, at the telephoto end in the state in which, the light-amount reducing filter F is retracted from the optical path in the fourth embodiment.

FIG. 17A, FIG. 17B, FIG. 17C, and FIG. 17D show a spherical aberration (SA), an astigmatism (AS), a distortion (DT), and a chromatic aberration of magnification (CC) respectively, at a wide angle end in a state in which, the light-amount reducing filter F is disposed in the optical path in the fifth embodiment.

FIG. 17E, FIG. 17F, FIG. 17G, and FIG. 17H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the fifth embodiment.

FIG. 17I, FIG. 17J, FIG. 17K, and FIG. 17L show a spherical aberration (SA), an astigmatism (AS), a distortion (DT), and a chromatic aberration of magnification (CC) respectively, at a telephoto end in a state in which, the light-amount reducing filter F is disposed in the optical path in the fifth embodiment.

FIG. 18A, FIG. 18B, FIG. 18C, and FIG. 18D show a spherical aberration (SA), an astigmatism (AS), a distortion (DT), and a chromatic aberration of magnification (CC) at the wide angle end in a state in which, the light-amount reducing filter F is retracted from the optical path in the fifth embodiment.

FIG. 18E, FIG. 18F, FIG. 18G, and FIG. 18H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the fifth embodiment.

FIG. 18I, FIG. 18J, FIG. 18K, and FIG. 18L show a spherical aberration (SA), an astigmatism (AS), a distortion (DT), and a chromatic aberration of magnification (CC) respectively, at the telephoto end in a state in which, the light-amount reducing filter F is retracted from the optical path in the fifth embodiment.

FIG. 19A, FIG. 19B, FIG. 19C, and FIG. 19D show a spherical aberration (SA), an astigmatism (AS), a distortion (DT), and a chromatic aberration of magnification (CC) respectively, at a wide angle end in a state in which, the light-amount reducing filter F is disposed in the optical path in the sixth embodiment.

FIG. 19E, FIG. 19F, FIG. 19G, and FIG. 19H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the sixth embodiment.

FIG. 19I, FIG. 19J, FIG. 19K, and FIG. 19L show a spherical aberration (SA), an astigmatism (AS), a distortion (DT), and a chromatic aberration of magnification (CC) respectively, at a telephoto end in a state in which, the light-amount reducing filter F is disposed in the optical path in the sixth embodiment.

FIG. 20A, FIG. 20B, FIG. 20C, and FIG. 20D show a spherical aberration (SA), an astigmatism (AS), a distortion (DT), and a chromatic aberration of magnification (CC) at the wide angle end in a state in which, the light-amount reducing filter F is retracted from the optical path in the sixth embodiment.

FIG. 20E, FIG. 20F, FIG. 20G, and FIG. 20H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the sixth embodiment.

FIG. 20I, FIG. 20J, FIG. 20K, and FIG. 20L show a spherical aberration (SA), an astigmatism (AS), a distortion (DT), and a chromatic aberration of magnification (CC) respectively, at the telephoto end in a state in which, the light-amount reducing filter F is retracted from the optical path in the sixth embodiment.

FIG. 21A, FIG. 21B, FIG. 21C, and FIG. 21D show a spherical aberration (SA), an astigmatism (AS), a distortion (DT), and a chromatic aberration of magnification (CC) respectively, at a wide angle end in a state in which, the light-amount reducing filter F is disposed in the optical path in the seventh embodiment.

FIG. 21E, FIG. 21F, FIG. 21G, and FIG. 21H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the seventh embodiment.

FIG. 21I, FIG. 21J, FIG. 21K, and FIG. 21L show a spherical aberration (SA), an astigmatism (AS), a distortion (DT), and a chromatic aberration of magnification (CC) respectively, at a telephoto end in a state in which, the light-amount reducing filter F is disposed in the optical path in the seventh embodiment.

FIG. 22A, FIG. 22B, FIG. 22C, and FIG. 22D show a spherical aberration (SA), an astigmatism (AS), a distortion (DT), and a chromatic aberration of magnification (CC) at the wide angle end in a state in which, the light-amount reducing filter F is retracted from the optical path in the seventh embodiment.

FIG. 22E, FIG. 22F, FIG. 22G, and FIG. 22H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the seventh embodiment.

FIG. 22I, FIG. 22J, FIG. 22K, and FIG. 22L show a spherical aberration (SA), an astigmatism (AS), a distortion (DT), and a chromatic aberration of magnification (CC) respectively, at the telephoto end in a state in which, the light-amount reducing filter F is retracted from the optical path in the seventh embodiment.

FIG. 23A, FIG. 23B, FIG. 23C, and FIG. 23D show a spherical aberration (SA), an astigmatism (AS), a distortion (DT), and a chromatic aberration of magnification (CC) respectively, at a wide angle end in a state in which, the light-amount reducing filter F is disposed in the optical path in the eighth embodiment.

FIG. 23E, FIG. 23F, FIG. 23G, and FIG. 23H show a spherical aberration (SA), an astigmatism (AS), a distortion (DT), and a chromatic aberration of magnification (CC) respectively, at an intermediate focal length state in a state in which, the light-amount reducing filter F is disposed in the optical path in the eighth embodiment.

FIG. 23I, FIG. 23J, FIG. 23K, and FIG. 23L show a spherical aberration (SA), an astigmatism (AS), a distortion (DT), and a chromatic aberration of magnification (CC) respectively, at a telephoto end in a state in which, the light-amount reducing filter F is disposed in the optical path in the eighth embodiment.

FIG. 24A, FIG. 24B, FIG. 24C, and FIG. 24D show a spherical aberration (SA), an astigmatism (AS), a distortion (DT), and a chromatic aberration of magnification (CC) at the wide angle end in a state in which, the light-amount reducing filter F is retracted from the optical path in the eighth embodiment.

FIG. 24E, FIG. 24F, FIG. 24G, and FIG. 24H show a spherical aberration (SA), an astigmatism (AS), a distortion (DT), and a chromatic aberration of magnification (CC) respectively, at the intermediate focal length state in a state in which, the light-amount reducing filter F is retracted from the optical path in the eighth embodiment.

FIG. 24I, FIG. 24J, FIG. 24K, and FIG. 24L show a spherical aberration (SA), an astigmatism (AS), a distortion (DT), and a chromatic aberration if magnification (CC) respectively, at the telephoto end in a state in which, the light-amount reducing filter F is retracted from the optical path in the eighth embodiment.

Next, values of conditional expressions (1) to (8) in each embodiment will be enumerated.

In the following tables, 'E-n' (n is an integer) expresses (indicates) '$10^{-n}$'. Moreover, numerical values corresponding to items from 'nd of embodiment' to 'material' are numerical values corresponding to the light-amount reducing filter.

|  | Example 1 | Example 2 | Example 3 |
|---|---|---|---|
| fw | 6.06 | 6.06 | 6.06 |
| ft | 23.50 | 23.49 | 23.50 |
| Zoom ratio | 3.88 | 3.88 | 3.88 |
| Fno. (W) | 1.85 | 1.88 | 1.85 |
| Fno. (T) | 2.55 | 2.71 | 3.74 |
| f1 | 50.47 | 49.36 | −18.78 |
| f2 | −11.67 | −10.76 | 18.72 |
| f3 | 16.15 | 15.93 | 30.11 |
| f4 | 29.71 | 24.31 | 208.10 |
| Conditional expression (1) | 1.00E−04 | 1.00E−05 | 1.00E−04 |
| Conditional expression (2) | 1.85 | 1.88 | 1.85 |
| Conditional expression (3) | 3.88 | 3.88 | 3.88 |
| Conditional expression (4) | 2 µm | 2 µm | 2 µm |
| Conditional expression (5) | $10 \times 10^6$ | $10 \times 10^6$ | $10 \times 10^6$ |
| Conditional expression (6) | 1.594 | 2.081 | 4.307 |
| Conditional expression (7) | 3.11E−03 | 5.48E−04 | 6.77E−03 |
| Conditional expression (8) | 3.76 | 3.95 | 6.99 |
| nd in example | 1.59 | 1.51 | 1.59 |
| n1 | 1.5905 | 1.51005 | 1.5905 |
| n2 | 1.5895 | 1.50995 | 1.5895 |
| t | 0.1 | 0.1 | 0.1 |
| material | PC (Polycarbonate) | polyolefin material | PC |

|  | Example 4 | Example 5 | Example 6 |
|---|---|---|---|
| fw | 6.06 | 6.06 | 6.06 |
| ft | 23.50 | 23.50 | 23.50 |
| Zoom ratio | 3.88 | 3.88 | 3.88 |
| Fno. (W) | 1.85 | 1.85 | 1.85 |
| Fno. (T) | 3.77 | 3.74 | 3.69 |
| f1 | −19.36 | −19.40 | −18.61 |
| f2 | 19.39 | 19.42 | 18.04 |
| f3 | 29.27 | 29.74 | 37.08 |
| f4 | 73.47 | 69.13 | 70.83 |
| Conditional expression (1) | 1.00E−05 | 7.00E−05 | 1.00E−04 |
| Conditional expression (2) | 1.85 | 1.85 | 1.85 |
| Conditional expression (3) | 3.88 | 3.88 | 3.88 |
| Conditional expression (4) | 2 µm | 2 µm | 2 µm |
| Conditional expression (5) | $10 \times 10^6$ | $10 \times 10^6$ | $10 \times 10^6$ |
| Conditional expression (6) | 4.370 | 4.431 | 3.881 |
| Conditional expression (7) | 6.37E−04 | 4.36E−03 | 5.06E−03 |
| Conditional expression (8) | 6.45 | 6.01 | 7.80 |
| nd in example | 1.51 | 1.59 | 1.585 |
| n1 | 1.51005 | 1.5905 | 1.5855 |
| n2 | 1.50995 | 1.5895 | 1.5845 |
| t | 0.1 | 0.07 | 0.1 |
| material | polyolefin material | PC | PC |

|  | Example 7 | Example 8 |
|---|---|---|
| fw | 6.06 | 6.06 |
| ft | 23.50 | 23.50 |
| Zoom ratio | 3.88 | 3.88 |
| Fno. (W) | 1.85 | 1.85 |
| Fno. (T) | 3.64 | 3.60 |
| f1 | −18.42 | −18.82 |
| f2 | 18.01 | 18.01 |
| f3 | 25.89 | 36.78 |
| f4 | −66.67 | — |
| Conditional expression (1) | 1.00E−04 | 1.00E−04 |
| Conditional expression (2) | 1.85 | 1.85 |
| Conditional expression (3) | 3.88 | 3.88 |
| Conditional expression (4) | 2 µm | 2 µm |
| Conditional expression (5) | $10 \times 10^6$ | $10 \times 10^6$ |
| Conditional expression (6) | 3.892 | 3.594 |
| Conditional expression (7) | 7.42E−03 | 5.89E−03 |
| Conditional expression (8) | 11.10 | 4.43 |
| nd in example | 1.59 | 1.59 |
| n1 | 1.5905 | 1.5905 |
| n2 | 1.5895 | 1.5895 |
| t | 0.1 | 0.1 |
| material | PC | PC |

Figure 25:
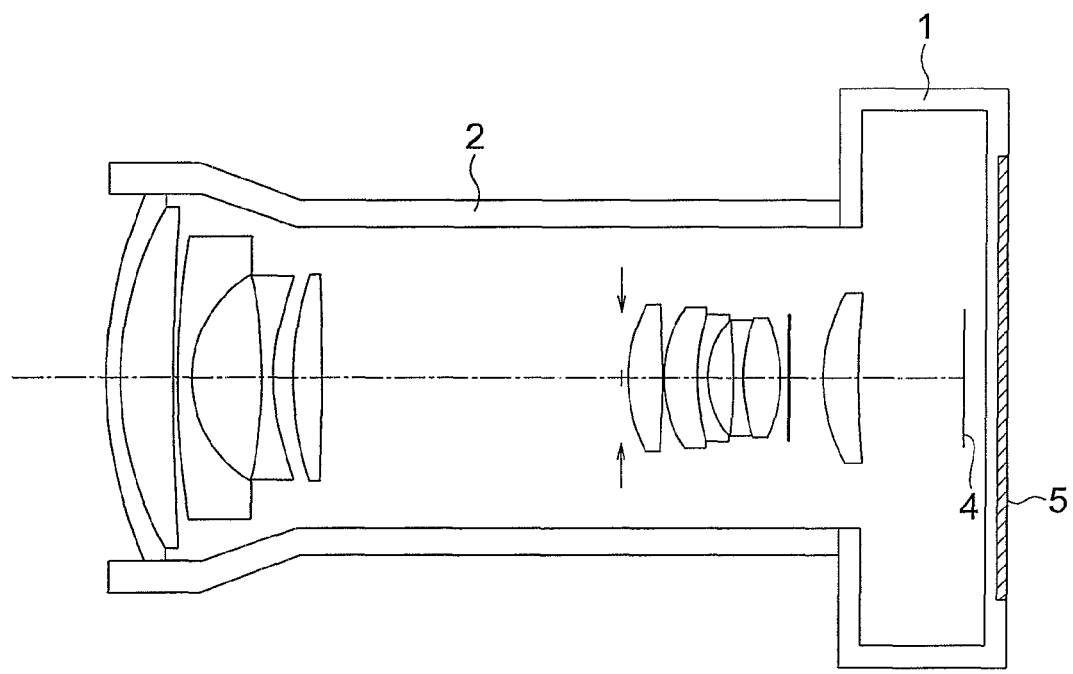
FIG. 25 is a cross-sectional view of an image pickup apparatus in which the zoom lens according to the present invention is incorporated.

FIG. 25 is a cross-sectional view of a single-lens mirrorless camera 1 as an image pickup apparatus in which, the zoom lens according to the present invention is used, and a smallsize CCD (charge coupled device) or a CMOS (complementary metal oxide semiconductor) is used. An image pickup lens system 2 is disposed inside a lens barrel of the single-lens mirrorless camera 1, and an image pickup element surface 4, a back monitor 5, and a cover glass (flat and parallel plate) C are disposed inside a (camera) body.

Here, it is also possible to let the image pickup lens system 2 to be detachable from the single-lens mirrorless camera 1 by providing a mounting portion to the lens barrel.

The zoom lens described in the embodiments from the first embodiment to the eighth embodiment is to be used as the image pickup lens system 2 of the single-lens mirrorless camera 1 having such structure.

Figure 26:
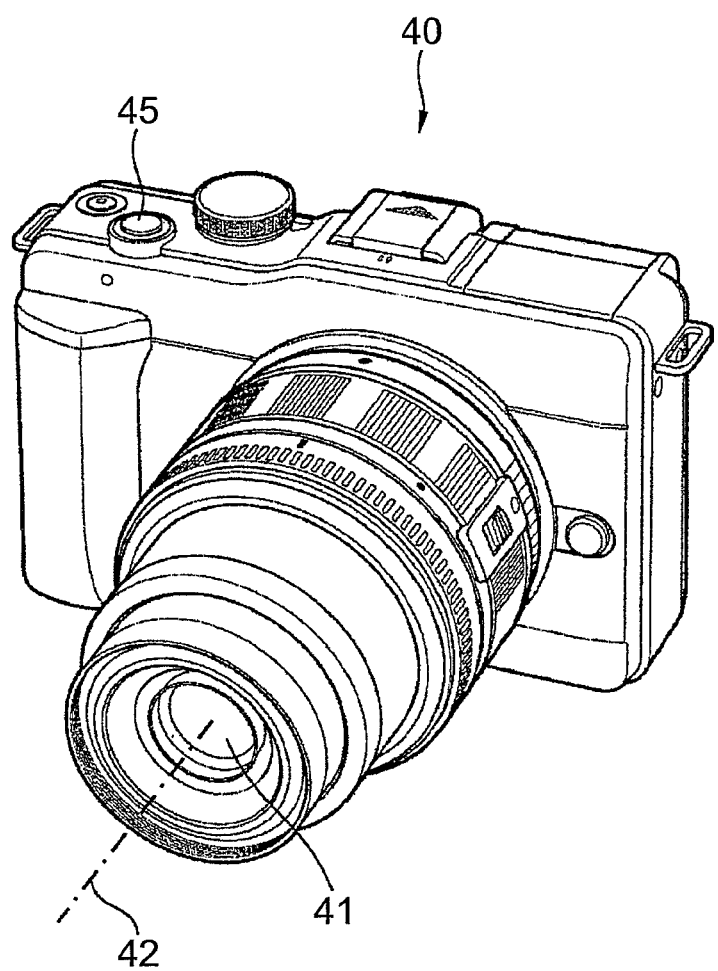
FIG. 26 is a front perspective view showing an appearance of a digital camera according to the present invention.
Figure 27:
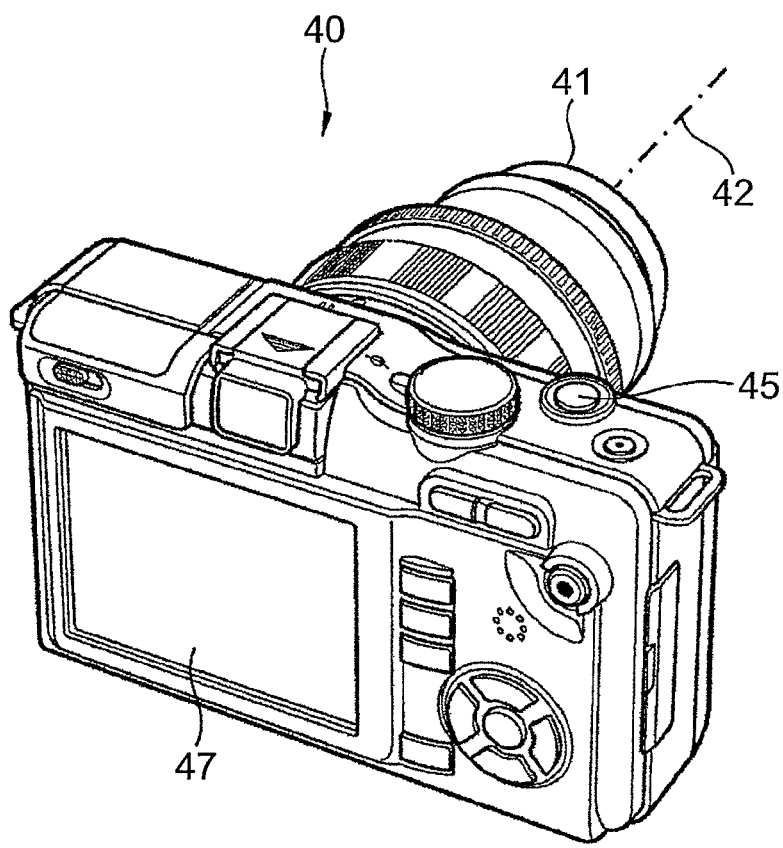
FIG. 27 is a rear perspective view showing an appearance of the digital camera according to the present invention.

FIG. 26 and FIG. 27 show conceptual diagrams of a structure of the image pickup apparatus according to the present invention in which, the zoom lens has been incorporated in a photographic optical system 41. FIG. 26 is a front perspective view showing an appearance of a digital camera 40 as an image pickup apparatus, and FIG. 27 is a rear perspective view showing an appearance of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the zoom lens according to the first embodiment. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera 40 by a processing unit 51. Moreover, it is possible to record the electronic image which has been captured in a recording unit.

FIG. 28 is a block diagram showing an internal circuit of main components of the digital camera 40. In the following description, the processing unit 51 mentioned above includes components such as CDS/ADC section 24, a temporary storage memory section 17, and an image processing section 18. A storage unit 52 includes a storage medium As shown in FIG. 28, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera 40 according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the zoom lens according to the present invention as the photographic optical system 41, enables zooming, and enables setting of a first mode which enables focusing including up to infinity and a second mode in which it is possible to achieve substantial (high) magnification, thereby making it possible to let to be an image pickup apparatus which is advantageous for both small-sizing and improved performance. As it has been described above, the image pickup apparatus having zoom lens according to the present invention is useful for achieving a high-resolution image with less degradation of image quality at the time of adjusting the amount of light in a zoom lens which is bright, or in other words, which has a small Fno.

What is claimed is:

1. An image pickup apparatus having zoom lens comprising:
    a zoom lens having a first positive lens unit having a positive refractive power, and a first negative lens unit having a negative refractive power disposed on an object side of the first positive lens unit, and in which, a distance between the first positive lens unit and the first negative lens unit decreases at the time of zooming from a wide angle end to a telephoto end; and
    an electronic image pickup element having image pickup pixel rows which are arranged two-dimensionally at image positions formed by the zoom lens,
    wherein the zoom lens comprises:
    an aperture stop which is disposed between a lens nearest to an image side in the first negative lens unit and a lens nearest to the image side in the first positive lens unit; and
    a light-amount reducing filter made of a resin material, which is disposed on the image side of the lens nearest to the image side in the first positive lens unit, and which can be inserted in and withdrawn from the optical path, wherein the zoom lens and the electronic image pickup element satisfy the following conditional expressions (1), (2), (3), (4), and (5)

$$(n_1-n_2) \times t < 0.0002 \text{ mm} \quad (1)$$

$$1.4 < FNO_{min} < 2.8 \quad (2)$$

$$2.8 < f_t/f_w \quad (3)$$

$$1 \text{ μm} < P < 3 \text{ μm} \quad (4)$$

$$8 \times 10^6 < N \quad (5)$$

where, $n_1$ denotes the maximum refractive index of the light-amount reducing filter, on an optical axis of the zoom lens, $n_2$ denotes the minimum refractive index of the light-amount reducing filter, on the optical axis of the zoom lens, t denotes a thickness on the optical axis, of the light-amount reducing filter, $FNO_{min}$ denotes the minimum F number at the wide angle end of the zoom lens, $f_t$ denotes a focal length of the zoom lens, at the telephoto end, $f_w$ denotes a focal length of the zoom lens, at the wide angle end, P denotes an image pickup pixel pitch of the electronic image pickup element, and N denotes the maximum value of the number of image pickup pixels in an effective image pickup area of the electronic image pickup element.

2. The image pickup apparatus having zoom lens according to claim 1, comprising:

at least one lens unit on the image side of the light-amount reducing filter, wherein the zoom lens satisfies the following conditional expressions (6) and (7)

$$1.3 < \Delta_{P1}/f_w < 8 \quad (6)$$

$$0 \le (h_{max} - h_{min})/P < 0.01 \quad (7)$$

where, $\Delta_{P1}$ denotes an amount of movement on the object side of the first positive lens unit at the time of zooming from the wide angle end to the telephoto end, $f_w$ denotes a focal length of the overall zoom lens at the wide angle end, $h_{min}$ denotes the minimum value of a distance from an optical axis at a location at which, light rays parallel to an optical axis incident at a light-ray height of $(n_1-n_2) \times t$ on the lens unit on the image side of the light-ray reducing filter reach an image plane, in a zoom range from the wide angle end to the telephoto end, and $h_{max}$ denotes the maximum value of the distance from the optical axis at a location at which, the light rays parallel to the optical axis incident at the light-ray height of $(n_1-n_2) \times t$ on the lens unit on the image side of the light-ray reducing filter reach the image plane, in the zoom range from the wide angle end to the telephoto end.

3. The image pickup apparatus having zoom lens according to claim 1, wherein the first positive lens unit, the aperture stop, and the light-amount reducing filter move integrally to be positioned on the object side at the telephoto end with respect to the wide angle end.

4. The image pickup apparatus having zoom lens according to claim 1, wherein the lens unit on the image side of the light-amount reducing filter has a positive refractive power as a whole, and the zoom lens satisfies the following conditional expression (8) all the time while zooming from the wide angle end to the telephoto end $$0.9 < f_{RB}/f_B < 100 \quad (8)$$

where, $f_{RB}$ denotes a distance up to a focal point only by the lens unit on the image side of the light-amount reducing filter, and $f_B$ denotes a distance from a surface of emergence of the lens nearest to the image side up to an image forming surface of the electronic image pickup element.

5. The image pickup apparatus having zoom lens according to the claim 4, wherein the zoom lens includes a second positive lens unit having a positive refractive power, which is disposed on the image side of the light-amount reducing filter, and a distance between the light-amount reducing filter and the second positive lens unit changes at the time of zooming from the wide angle end to the telephoto end.

6. The image pickup apparatus having zoom lens according to claim 5, wherein the zoom lens is a three-unit zoom lens.

7. The image pickup apparatus having zoom lens according to claim 5, wherein the zoom lens includes a third positive lens unit having a positive refractive power, which is disposed on the object side of the first negative lens unit, and a distance between the first negative lens unit and the third positive lens unit increases at the time of zooming from the wide angle end to the telephoto end.

8. The image pickup apparatus having zoom lens according to claim 7, wherein the zoom lens is a four-unit zoom lens.

9. The image pickup apparatus having zoom lens according to claim 5, wherein the zoom lens includes a lens unit on the image side of the second positive lens unit, of which a distance from the second positive lens unit changes.

10. The image pickup apparatus having zoom lens according to claim 9, wherein the zoom lens is a four-unit zoom lens.

11. The image pickup apparatus having zoom lens according to claim 1, wherein the light-amount reducing filter includes a polyolefin filter material.

12. The image pickup apparatus having zoom lens according to claim 1, wherein the light-amount reducing filter includes a polycarbonate filter material.

* * * * *